US012772161B2

(12) United States Patent
Ishii

(10) Patent No.: US 12,772,161 B2
(45) Date of Patent: Oct. 20, 2026

(54) NOTIFICATION MESSAGE FOR BACKHAUL RADIO LINK FAILURE IN WIRELESS RELAY NETWORKS

(71) Applicant: SHARP KABUSHIKI KAISHA, Sakai (JP)

(72) Inventor: Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 483 days.

(21) Appl. No.: 17/910,309

(22) PCT Filed: Mar. 2, 2021

(86) PCT No.: PCT/JP2021/007807
§ 371 (c)(1),
(2) Date: Sep. 8, 2022

(87) PCT Pub. No.: WO2021/182165
PCT Pub. Date: Sep. 16, 2021

(65) Prior Publication Data

US 2023/0139323 A1 May 4, 2023

Related U.S. Application Data

(60) Provisional application No. 62/988,246, filed on Mar. 11, 2020.

(51) Int. Cl.
*H04W 48/20* (2009.01)
*H04W 48/02* (2009.01)
(Continued)

(52) U.S. Cl.
CPC ........... *H04W 48/20* (2013.01); *H04W 48/02* (2013.01); *H04W 48/08* (2013.01); *H04W 84/047* (2013.01)

(58) Field of Classification Search
None
See application file for complete search history.

(56) References Cited

U.S. PATENT DOCUMENTS 11,252,641 B2 * 2/2022 Cheng .................. H04W 48/12
2015/0173089 A1 6/2015 Baghel et al.
(Continued)

FOREIGN PATENT DOCUMENTS

WO 2020/039824 A1 2/2020

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 15)", 3GPP TS 36.331 V15.8.0 (Dec. 2019).
(Continued)

*Primary Examiner* — Adolf Dsouza
(74) *Attorney, Agent, or Firm* — ScienBiziP, P.C.

(57) ABSTRACT

An integrated access and backhaul (IAB) parent node that includes a first radio interface a second radio interface, processor circuitry, and transmitter circuitry is provided. The first radio interface is configured to establish an RRC connection with a donor node. The second radio interface is configured to serve a cell to communicate with a wireless terminal, such as a UE or a child IAB node. The processor circuitry is configured to detect a radio link failure (RLF) on an upstream path to the donor node, provide updated system information, such as a cell status, based on the RLF, and generate a notification message including information indicating whether the wireless terminal is to initiate an acquisition procedure to acquire the system information immediately, or after a next modification period boundary. The
(Continued)

transmitter circuitry is configured to transmit the notification message and the updated system information to the wireless terminal.

9 Claims, 29 Drawing Sheets

(51) Int. Cl.
*H04W 48/08* (2009.01)
*H04W 84/04* (2009.01)

(56) References Cited

U.S. PATENT DOCUMENTS

2021/0243683 A1 8/2021 Harada
2022/0029694 A1* 1/2022 Ishii ...................... H04W 48/12
2022/0110179 A1* 4/2022 Sheng .................. B65D 5/4204

OTHER PUBLICATIONS

"3rd Generation Partnership Project; Technical Specification Group Radio Access Network; E-UTRA and NR; Service Data Adaptation Protocol (SDAP) specification(Release 15)", 3GPP TS 37.324 V15.1.0 (Sep. 2018).
"3rd Generation Partnership Project; Technical Specification Group Radio Access Network; NG-RAN; F1 application protocol (F1AP)(Release 16)", 3GPP TS 38.473 V16.0.0 (Dec. 2019).
"3rd Generation Partnership Project; Technical Specification Group Radio Access Network; NR; Backhaul Adaptation Protocol (BAP) specification(Release 16)", 3GPP TS 38.340 V0.1.1 (Nov. 2019).
"3rd Generation Partnership Project; Technical Specification Group Radio Access Network; NR; Radio Resource Control (RRC) protocol specification(Release 15)", 3GPP TS 38.331 V15.8.0 (Dec. 2019).
"3rd Generation Partnership Project; Technical Specification Group Radio Access Network; NR; Packet Data Convergence Protocol (PDCP) specification(Release 15)", 3GPP TS 38.323 V15.6.0 (Jun. 2019).
"3rd Generation Partnership Project; Technical Specification Group Radio Access Network; NR; Radio Link Control (RLC) protocol specification(Release 15)", 3GPP TS 38.322 V15.5.0 (Mar. 2019).
"3rd Generation Partnership Project; Technical Specification Group Radio Access Network; NR; User Equipment (UE) procedures in Idle mode and RRC Inactive state(Release 15)", 3GPP TS 38.304 V15.5.0 (Sep. 2019).
"3rd Generation Partnership Project; Technical Specification Group Services and System Aspects; Service requirements for the 5G system; Stage 1(Release 17)", 3GPP TS 22.261 V17.1.0 (Dec. 2019).
"3rd Generation Partnership Project; Technical Specification Group Radio Access Network; NR; NR and NG-RAN Overall Description; Stage 2(Release 16)", 3GPP TS 38.300 V16.0.0 (Dec. 2019).
Samsung (Rapporteur), "IAB IP address allocation—Proposals for discussion and approval", R2-2002164, 3GPP TSG-RAN WG2 #109-e, E-meeting, Feb. 2020.
Ericsson, "Summary of 6.1.5.3: SI Broadcast, cell Restrictions/Reservation and Barring, Initial Access, and Connection Setup", R2-2002058, 3GPP TSG-RAN WG2 #109-e, Online, Feb. 24-Mar. 6, 2020.
Ericsson, "Summary of 6.1.5.2: IAB Configuration except IP address", R2- 2002057, 3GPP TSG-RAN WG2 #109-e, Online, Feb. 24-Mar. 6, 2020.
Samsung (Rapporteur), "Summary on IAB IP address configuration", R2-2002045, 3GPP TSG-RAN WG2 #109-e, E-meeting, Feb. 2020.
Ericsson, "Draft CR to 38.304 on cell reservations for IAB-MTs", R2-2000753, 3GPP TSG-RAN WG2 Meeting #109-e, Online, Feb. 24-Mar. 6, 2020.
Ericsson, "Draft CR to 36.304 on cell reservations for IAB-MTs", R2-2000752, 3GPP TSG-RAN WG2 Meeting #109-e, Online, Feb. 24-Mar. 6, 2020.
Ericsson, "On cell Reservations in MIB and SIB1", R2-2000751, 3GPP TSG-RAN WG2 #109-e, Online, Feb. 24-Mar. 6, 2020.
Ericsson, "IP Address Assignment for IAB Node(s)", R2-2000750, 3GPP TSG-RAN WG2 Meeting #109-e, Online, Feb. 24-Mar. 6, 2020.
Ericsson, "Further details on Backhaul link RLF Notification Types to Downstream Node(s)", R2-2000749, 3GPP TSG-RAN WG2 #109-e, Online, Feb. 24-Mar. 6, 2020.
KDDI Corporation, "Considerations on Intra-CU indication", R2-2000662, 3GPP TSG-RAN WG2 Meeting #109-e, Online, Feb. 24-Mar. 6, 2020.
Huawei et al., "The impacts of IP address management of IAB node to RAN2", R2-2000529, 3GPP TSG-RAN WG2 Meeting #109 electronic, Feb. 24-Mar. 6, 2020.
Huawei et al., "Leftover issue for cell barring", R2-2000523, 3GPP TSG-RAN WG2 Meeting #109 electronic, Feb. 24-Mar. 6, 2020.
Huawei et al., "Backhaul RLF Recovery", R2-2000522, 3GPP TSG-RAN WG2 Meeting #109 electronic, Feb. 24-Mar. 6, 2020.
Kyocera, "Possible issues on Backhaul RLF handling", R2-2000516, 3GPP TSG-RAN WG2 #109-e, Online, Feb. 24-Mar. 6, 2020.
Zte et al., "Consideration on IAB node access control", R2-2000512, 3GPP TSG-RAN WG2#109 electronic, Feb. 24-Mar. 6, 2020.
Zte et al., "Discussion on the RRC signalling for IP address allocation", R2-2000511, 3GPP TSG-RAN WG2#109 electronic, Feb. 24-Mar. 6, 2020.
Zte et al., "Discussion on BAP control PDU for RLF indication", R2-2000510, 3GPP TSG-RAN WG2#109 electronic, Feb. 24-Mar. 6, 2020.
Zte et al., "Discussion on IAB BH RLF handling", R2-2000509, 3GPP TSG-RAN WG2#109 electronic, Feb. 24-Mar. 6, 2020.
Qualcomm Incorporated et al., "IAB access barring", R2-2000484, 3GPP TSG-RAN WG2 Meeting #109-e, Electronic meeting, Feb. 24-Mar. 6, 2020.
Qualcomm Incorporated, "(TP for NR_IAB BL CR to TS 38.331) IP address configuration", R2-2000482, 3GPP TSG-RAN WG2 Meeting #109-e, Electronic meeting, Feb. 24-Mar. 6, 2020.
Intel Corporation, "Parent selection at IAB nodes during Initial Setup (Text proposal)", R2-2000479, 3GPP TSG RAN WG2 Meeting #109, Electronic meeting, Feb. 24-Mar. 6, 2020.
Intel Corporation, "Further discussion on Backhaul RLF handling", R2-2000472, 3GPP TSG RAN WG2 Meeting #109, Electronic meeting, Feb. 24-Mar. 6, 2020.
VIVO, "Cell barring indication for IAB support", R2-2000277, 3GPP TSG-RAN WG2 Meeting #109-e, Electronic meeting, Feb. 24-Mar. 6, 2020.
VIVO, "RLF Notification Messages", R2-2000276, 3GPP TSG-RAN WG2 Meeting #109-e, Electronic meeting, Feb. 24-Mar. 6, 2020.
Kimba et al., "LS on BH RLF notification verification", R2-2000275, 3GPP TSG-RAN WG2 Meeting #109-e, Electronic Meeting, Feb. 28-Mar. 6, 2020.
VIVO, "Verification of BH RLF notification", R2-2000274, 3GPP TSG-RAN WG2 Meeting #109-e, Electronic Meeting, Feb. 28-Mar. 6, 2020.
Itri, "Backhaul RLF handling", R2-1913063, 3GPP TSG-RAN WG2 Meeting #107bis, Chongqing, China, Oct. 14-18, 2019.
Kyocera, "Consideration of RLF recovery in IAB", R2-1817573, 3GPP TSG-RAN WG2 #104, Spokane, USA, Nov. 12-16, 2018.
Sharp, "Issue of loop topology after RLF", R2-1915766, 3GPP TSG RAN WG2 Meeting #108, Reno, NV, U.S.A., Nov. 18-22, 2019.
VIVO, "Discussion on IAB BH RLF report mechanism in case of DC", R2-2000273, 3GPP TSG-RAN WG2 Meeting #109-e, Electronic Meeting, Feb. 28-Mar. 6, 2020.
Ericsson, "IAB-MT Feature Capabilities", R2-2000754, 3GPP TSG-RAN WG2 #109-e, Online, Feb. 24-Mar. 6, 2020.
Samsung, "Remaining issues on IAB RLF", R2-2001633, 3GPP TSG RAN WG2 Meeting #109e, e-Meeting, Feb. 24-Mar. 4, 2020.
Samsung, "F1AP related terminology in NSA IAB", R2-2001625, 3GPP TSG RAN WG2 Meeting #109e, e-Meeting, Feb. 24-Mar. 4, 2020.

(56) References Cited

OTHER PUBLICATIONS

Futurewei, "Differential barring for IAB nodes and UEs", R2-2001605, 3GPP TSG-RAN WG2 meeting #109-e, E-meeting, Feb. 24-Mar. 6, 2020.
LG Electronics, "BH RLF Notification Terminaton Layer", R2-2001525, 3GPP TSG-RAN WG2 Meeting #109, E-meeting, Feb. 24-Mar. 6, 2020.
LG Electronics, "Resolving open issues on BH RLF", R2-2001524, 3GPP TSG-RAN WG2 Meeting #109, E-meeting, Feb. 24-Mar. 6, 2020.
LG Electronics, "Access copntrol in IAB networks", R2-2001523, 3GPP TSG-RAN WG2 Meeting #109, E-meeting, Feb. 24-Mar. 6, 2020.
Futurewei, "Cell Selection for Backhaul RLF Recovery", R2-2001348, 3GPP TSG-RAN WG2 meeting #109-e, E-meeting, Feb. 24-Mar. 6, 2020.
Nokia et al., "IAB-MT features list and capabilities", R2-2001061, 3GPP TSG-RAN WG2 Meeting #109-e, Online, Feb. 24-Mar. 6, 2020.
Nokia et al., "IP address assignment for IAB nodes", R2-2001059, 3GPP TSG-RAN WG2 Meeting #109-e, Online, Feb. 24-Mar. 6, 2020.
Nokia et al., "Remaining aspects of IAB initial access", R2-2001058, 3GPP TSG-RAN WG2 Meeting #109-e, Online, Feb. 24-Mar. 6, 2020.
Nokia et al., "Remaining aspects of F1AP transport in EN-DC", R2-2001057, 3GPP TSG-RAN WG2 Meeting #109-e, Online, Feb. 24-Mar. 6, 2020.
Nokia et al., "BH link failure handling", R2-2001056, 3GPP TSG-RAN WG2 Meeting #109-e, Online, Feb. 24-Mar. 6, 2020.
Lenovo et al., "Cell selection for IAB RLF recovery", R2-2001021, 3GPP TSG-RAN WG2 Meeting #109e, E-meeting, Feb. 24-Mar. 6, 2020.
Samsung, "Remaining details for IAB-MT access", R2-2001016, 3GPP TSG-RAN WG2 #109-e, E-meeting, Feb. 2020.
CATT, "Views on RRC States of IAB nodes", R2-2000895, 3GPP TSG-RAN WG2 Meeting #109 electronic, E-meeting, Feb. 24-Mar. 6, 2020.
CATT, "Views on Cell Barring Mechanism for IAB", R2-2000892, 3GPP TSG-RAN WG2 Meeting #109 electronic, E- meeting, Feb. 24-Mar. 6, 2020.
Sony, "IAB cell barring", R2-2000835, 3GPP TSG RAN WG2 Meeting# 109, Elbonia, Feb. 24-Mar. 3, Feb. 2020.
Sony, "PWS information handling in IAB", R2-2000824, 3GPP TSG RAN WG2 Meeting #109 electronic, Elbonia Feb. 24-Mar. 6, 2020.
Samsung, "IP address configuration for IAB", R2-2000769, 3GPP TSG-RAN WG2 Meeting #109 electronic, Elbonia, Feb .24-Mar. 6, 2020.

* cited by examiner

[Fig. 12]

NOTIFICATION MESSAGE FOR BACKHAUL RADIO LINK FAILURE IN WIRELESS RELAY NETWORKS

CROSS REFERENCE

This Nonprovisional application claims priority under 35 U.S.C. § 119 on provisional Application No. 62,988,246 on Mar. 11, 2020, the entire contents of which are hereby incorporated by reference.

TECHNICAL FIELD

The technology relates to wireless communications, and particularly to radio architecture and operation a wireless relay network.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 32, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ngeNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In 3rd Generation Partnership Project (3GPP), the relay node concept for the fifth generation (5G) cellular system has been discussed and standardized, where the relay nodes may utilize the same 5G radio access technologies (e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes; and additionally, an IAB-node may provide IAB functionality combined with wireless self-backhauling capabilities. IAB-nodes may need to periodically perform inter-IAB-node discovery to detect new IAB-nodes in their vicinity based on cell-specific reference signals (e.g., Synchronization Signal and PBCH block SSB). The cell-specific reference signals may be broadcasted on a Physical Broadcast Channel (PBCH) where packets may be carried or broadcasted on the Master Information Block (MIB) section.

A node in an IAB-based relay network may utilize resources provided by other nodes. It is expected that in some circumstances a portion of the relay network may get congested and therefore some nodes may desire to control use of their resources from others. What is needed, therefore, are apparatus, methods and procedures to handle such a congestion via access restrictions, e.g., access barring or cell barring.

Moreover, an IAB-based relay network may use broadcast signals to convey essential information.

What is also needed, therefore, are apparatus, methods, and procedures to notify nodes and terminals of an IAB-based relay network when some contents of the essential information change and when to implement those changes.

SUMMARY OF INVENTION

In one example, an integrated access and backhaul (IAB) node comprising a first radio interface and a second radio interface, the first radio interface being configured to establish a connection with a donor node, the second radio interface being configured to serve a cell to communicate with a wireless terminal, the IAB node comprising: processor circuitry configured to: detect a radio link failure (RLF) at the first radio interface; generate, based on the RLF, system information comprising at least one cell status indication indicating that the cell is barred and; generate, based on the at least one cell status indication, a notification message comprising notification information configured to instruct the wireless terminal to initiate a system information acquisition procedure immediately; transmitter circuitry configured to transmit, using the second interface, to the wireless terminal: the notification message; and, the system information.

In one example, a wireless terminal that communicates with an integrated access and backhaul (IAB) node via a cell served by the IAB node, the wireless terminal comprising: receiver circuitry configured to receive a notification message comprising notification information, the notification information instructing to initiate a system information acquisition procedure immediately; processor circuitry configured to initiate, based on the notification information, the system information acquisition procedure to acquire system information, the system information comprising at least one cell status indication indicating whether or not the cell is barred, wherein; in a case that the at least cell status indicates that the cell is barred, a cell selection procedure is initiated.

In one example, a method for an integrated access and backhaul (IAB) node comprising a first radio interface and a second radio interface, the first radio interface being configured to establish a connection with a donor node, the second radio interface being configured to serve a cell to communicate with a wireless terminal, the method comprising: detecting a radio link failure (RLF) at the first radio interface; generating, based on the RLF, system information comprising at least one cell status indication indicating that the cell is barred and; generating, based on the at least one cell status indication, a notification message comprising notification information configured to instruct the wireless terminal to initiate a system information acquisition procedure immediately; transmitting, using the second interface, to the wireless terminal: the notification message; and, the system information.

In one example, a method for a wireless terminal that communicate with an integrated access and backhaul (IAB) node, the method comprising: receiving a notification message comprises notification information, the notification information instructing to initiate a system information acquisition procedure immediately; initiating, based on the notification information, a system information acquisition procedure to acquire system information, the system information comprising at least one cell status indication indicating whether or not the cell is barred, wherein; in a case that the at least cell status indicates that the cell is barred, a cell selection procedure is initiated.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1:
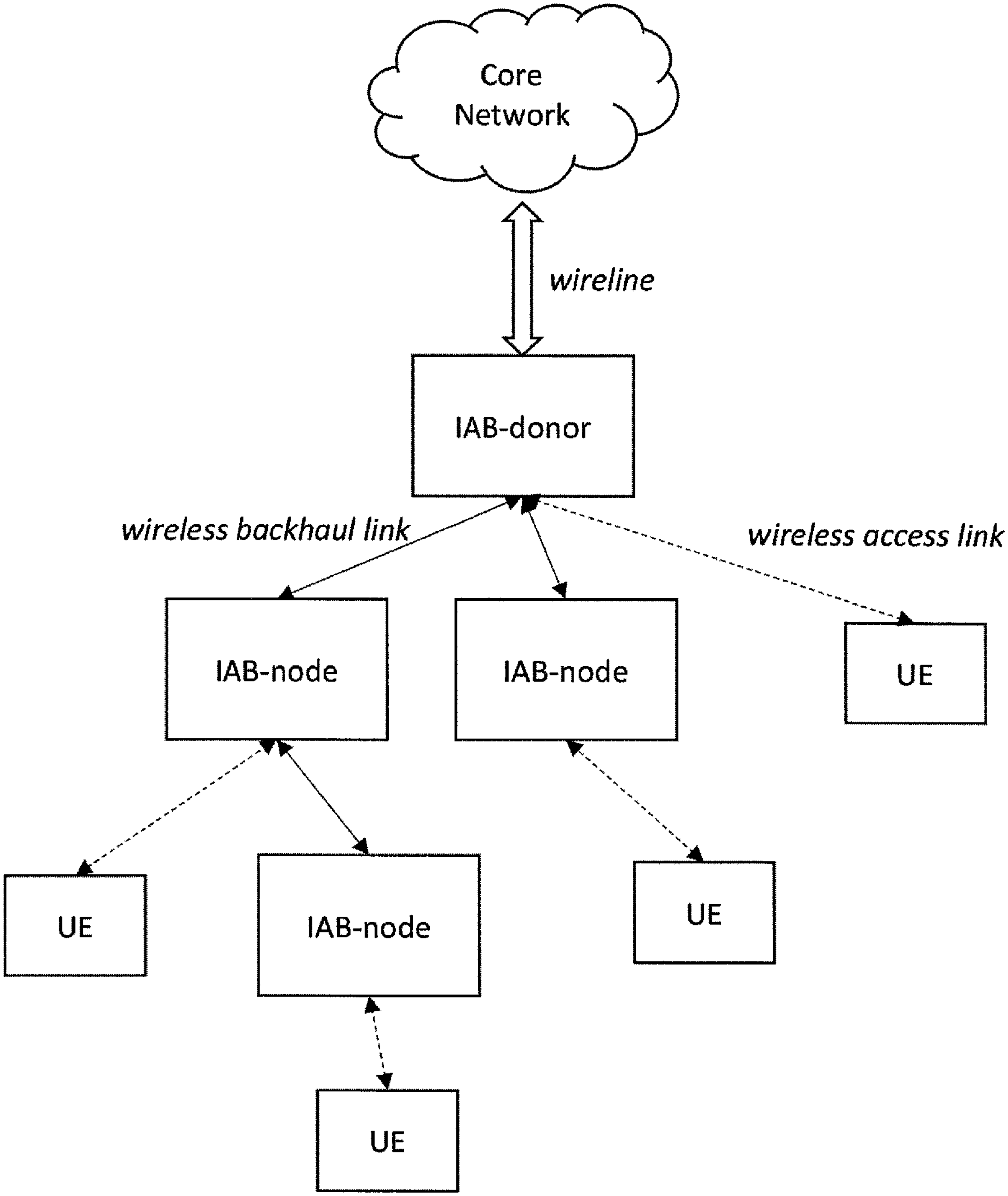
FIG. 1 is a diagrammatic view illustrating a mobile network infrastructure using 5G signals and 5G base stations.

In one of its example aspects the technology disclosed herein concerns an integrated access and backhaul (IAB) parent node which comprises a first radio interface and a radio second interface. The first radio interface is configured to establish a radio resource control (RRC) connection with a donor node; the second radio interface is configured to serve a cell to communicate with a wireless terminal. The wireless terminal may be a user equipment (UE) or a child IAB node. The IAB parent node comprises processor circuitry and transmitter circuitry. The processor circuitry is configured to: detect a radio link failure (RLF) on an upstream path to the donor node, provide updated system information based on the RLF, the updated system information comprising at least one cell status indicating that the cell is not allowed to camp on; and, generate a notification message comprising notification information configured to indicate whether the wireless terminal is to initiate an acquisition procedure to acquire the system information (a) immediately, or (b) after a next modification period boundary. The transmitter circuitry is configured to transmit, using the second interface, to the wireless terminal: the notification message and the updated system information. In another of its aspects the technology disclosed herein concerns a method of operating such a node.

In yet another of its aspects the technology disclosed herein concerns a wireless terminal that communicates with an integrated access and backhaul (IAB) parent node. The wireless terminal comprises receiver circuitry and processor circuitry. The receiver circuitry is configured to receive a notification message. The processor circuitry is configured when camping on a cell served by the IAB parent node, to obtain from the notification message information indicating whether to initiate an acquisition procedure (a) immediately or (b) after a next modification period boundary; to initiate, based on the notification message, an acquisition procedure to acquire system information, the system information comprising at least one cell status, the at least one cell status indicating whether or not the cell is allowed to camp on, and; to initiate, based on the at least one cell status, a cell selection procedure. In another of its aspects the technology disclosed herein concerns a method of operating such a wireless terminal.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference. A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

In some aspects of the embodiments for handling of radio link failures in wireless relay networks, disclosed is a Mobile Termination (MT) functionality—typically provided by the User Equipment (UE) terminals—that may be implemented by Base Transceiver Stations (BTSs or BSs) nodes, for example, IAB nodes. In one embodiment, the MT functions may comprise common functions such as: radio transmission and reception, encoding and decoding, error detection and correction, signaling, and access to a SIM.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

Embodiments of the present system disclose methods and devices for an IAB-node to inform child nodes and/or UEs of upstream radio conditions and accordingly, the term IAB-node may be used to represent either a parent IAB-node or a child IAB-node, depending on where the IAB-node is in the network communication with the IAB-donor which is responsible for the physical connection with the core network. Embodiments are disclosed where an IAB-node (child IAB-node) may follow the same initial access procedure as a UE, including cell search, system information acquisition, and random access, in order to initially set up a connection to a parent IAB-node or an IAB-donor. That is, when an IAB base station (eNB/gNB) needs to establish a backhaul connection to, or camp on, a parent IAB-node or an IAB-donor, the IAB-node may perform the same procedures and steps as a UE, where the IAB-node may be treated as a UE but distinguished from a UE by the parent IAB-node or the IAB-donor.

In the disclosed embodiments for handling radio link failures in wireless relay networks, MT functionality—typically offered by a UE—may be implemented on an IAB-node. In some examples of the disclosed systems, methods, and device embodiments, consideration may be made in order for a child IAB-node to monitor a radio condition on a radio link to a parent IAB-node—where the parent IAB-node may itself be a child IAB-node in communication with an IAB-donor.

With reference to FIG. 1, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, the IAB nodes may be referred to as IAB relay nodes. The IAB-node may be a Radio Access Network (RAN) node that supports wireless access to UEs and wirelessly backhauls the access traffic. The IAB-donor may be a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 1, a number of UEs are depicted as in communication with IAB nodes, for example, IAB nodes and IAB donor node, via wireless access link. Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

Figure 2:
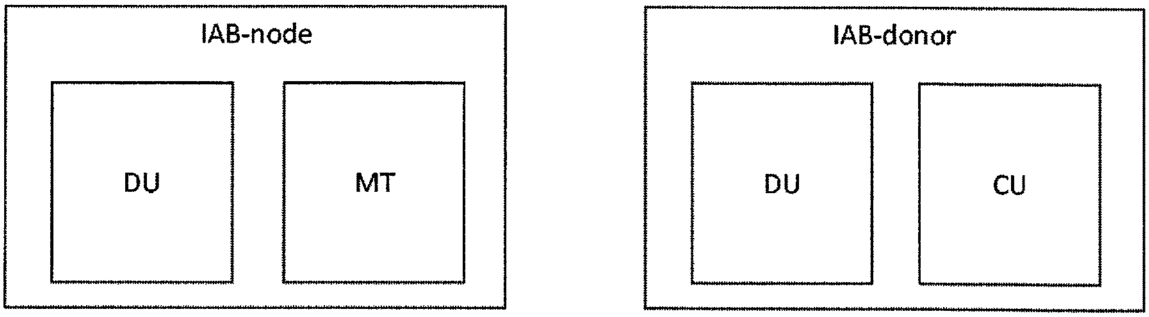
FIG. 2 is a diagrammatic view depicting an example of functional block diagrams for the IAB-donor and the IAB-node.

FIG. 2 depicts an example of functional block diagrams for the IAB-donor and the IAB-node (see FIG. 1). The IAB-donor may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). An IAB-node may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-APS') which is a wireless backhaul protocol that provides signaling services between the DU of an IAB-node and the CU of an IAB-donor. That is, as further described below, the protocol stack configuration may be interchangeable, and different mechanism may be used.

Figure 3:
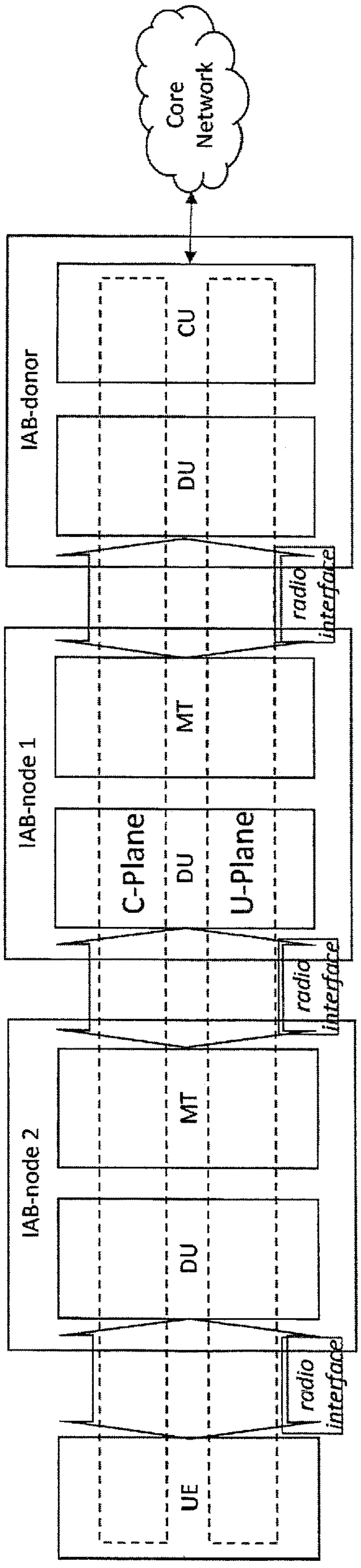
FIG. 3 is a diagrammatic view illustrating Control Plane (C-Plane) and User Plane (U-Plane) protocols among the UE, IAB-nodes, and IAB-donor.

As illustrated by the diagram shown in FIG. 3, the protocols among the UE, IAB-nodes, and IAB donor are grouped into Control Plane (C-Plane) and User Plane (U-Plane). C-Plane carries control signals (signaling data), whereas the U-Plane carries user data. FIG. 3 shows an example of the embodiment where there are two IAB-nodes, IAB-node 1 and IAB-node 2, between the UE and the IAB-donor (two hops). Other embodiments may comprise a network with a single hop or multiple hops where there may be more than two IAB-nodes present.

Figure 4:
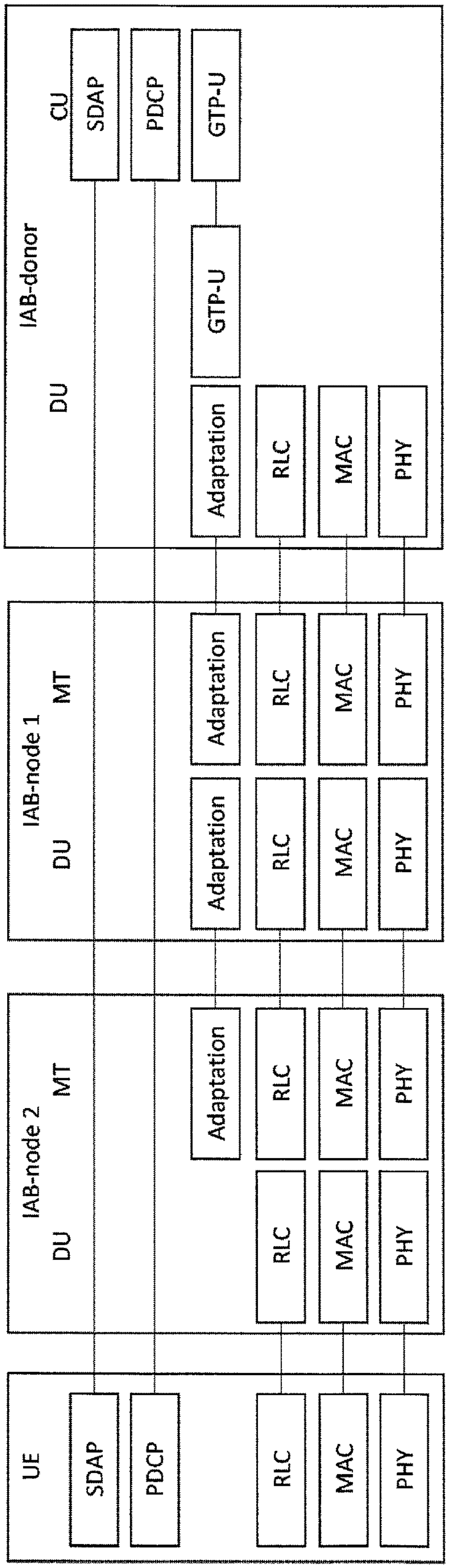
FIG. 4 is a functional block diagram of an example protocol stack configuration for the U-Plane.

FIG. 4 depicts a functional block diagram of an example protocol stack configuration for the U-Plane, the stack comprising Service Data Protocol (e.g., SDAP, 3GPP TS 37.324) which may carry user data (e.g., via IP packets). In one embodiment, the SDAP runs on top of PDCP (3GPP TS 38.323) and the L2/Physical layers. In one embodiment, an Adaptation Layer (e.g. Backhaul Adaptation Protocol per 3GPP TS 38.340) is introduced between the IAB-node and the IAB-node/donor, where the Adaptation Layer carries relay-specific information, such as IAB-node/donor addresses, QoS information, UE identifiers, and potentially other information. In this embodiment, RLC (3GPP TS 38.322) may provide reliable transmission in a hop-by-hop manner while PDCP may perform end-to-end (UE-CU) error recovery. GTP-U (GPRS Tunneling Protocol User Plane) may be used for routing user data between CU and DU inside the IAB-donor.

Figure 5A:
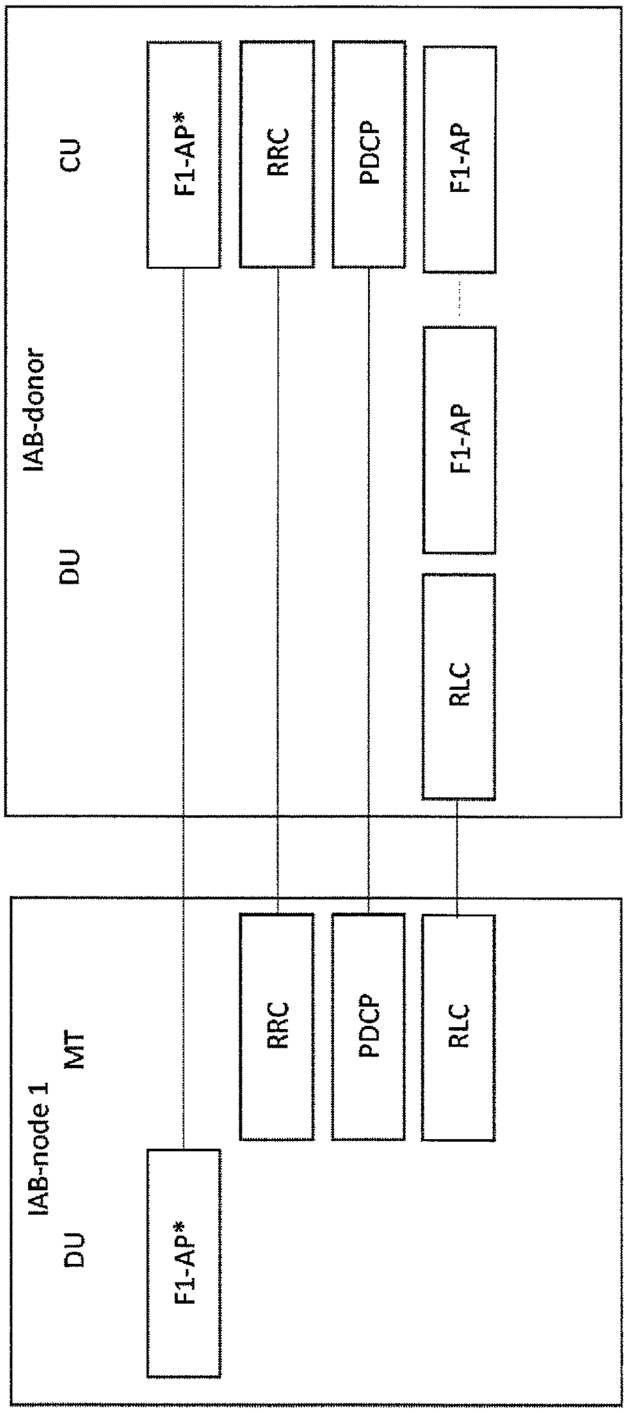
FIG. 5A depicts a functional block diagram of an example protocol stack configuration for the C-Plane between an IAB-node connected to an IAB-donor.

FIG. 5A is a functional block diagram of an example protocol stack configuration for the C-Plane between an IAB-node (IAB-node 1) directly connected to the IAB-donor (via a single hop). In this embodiment, the MT component of IAB-node 1 may establish an RRC connection with the CU component of the IAB-donor. In parallel, RRC may be used for carrying another signaling protocol in order for CU/IAB-donor to control the DU component resident in the IAB-node 1. In one embodiment, such a signaling protocol may be referred to as F1 Application Protocol* (F1-AP*), either the protocol referred as F1-AP specified in 3GPP TS 38.473 or a protocol based on the F1-AP with potential extended features to accommodate wireless backhauls (the original F1-AP is designed for wirelines). In other embodiments, F1-AP may be used for CU-DU connection inside the IAB-donor. It is assumed that below RLC, MAC/PHY layers are shared with the U-Plane.

Figure 5B:
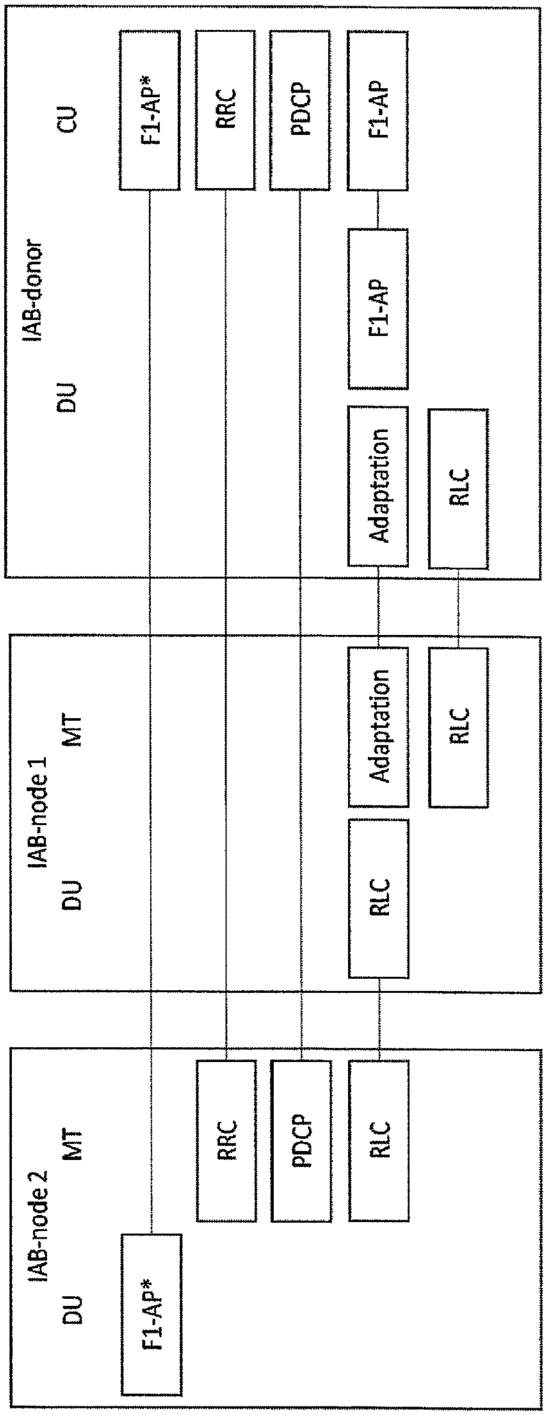
FIG. 5B depicts a functional block diagram of an example configuration of the C-Plane protocol stack for an IAB-node connected to another IAB-node which is connected to an IAB-donor.

FIG. 5B depicts a functional block diagram of an example configuration of the C-Plane protocol stack for IAB-node 2, an IAB-node connected to the aforementioned IAB-node 1 (2 hops). In one embodiment, it may be assumed that the IAB-node 1 has already established RRC/F1-AP* connections with the IAB-donor as shown in FIG. 5A. In IAB-node 1 the signaling bearer for IAB-node 2 RRC/PDCP may be carried by the Adaptation Layer to the IAB-donor. Similar to FIG. 5A, the F1-AP* signaling is carried by the RRC of IAB-node 2.

Figure 5C:
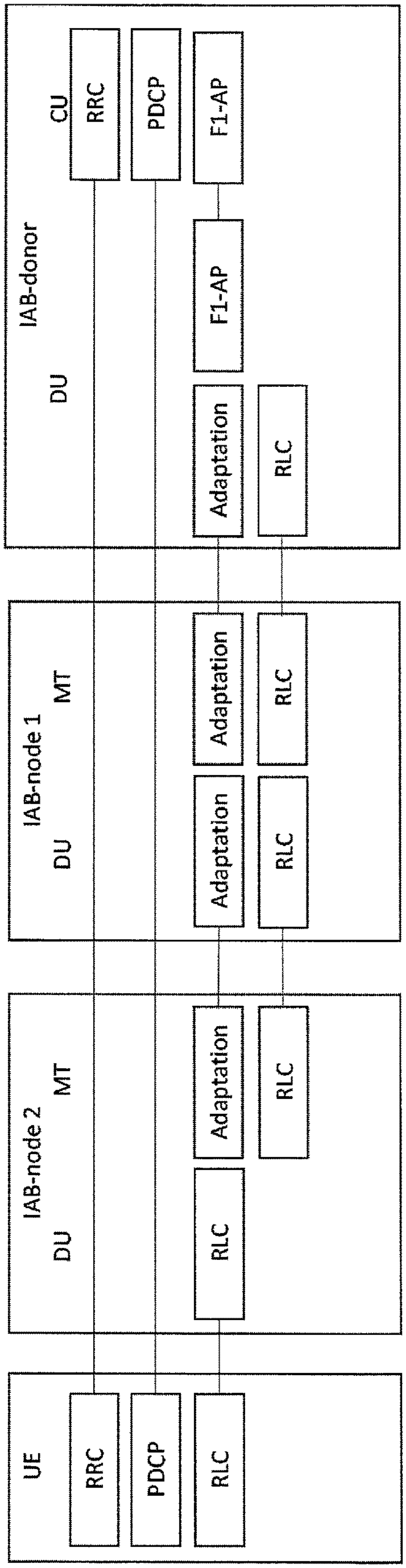
FIG. 5C depicts a functional block diagram of an example configuration of the C-Plane protocol stack for a UE's RRC signaling.

FIG. 5C depicts yet another functional block diagram of an example configuration of the C-Plane protocol stack for UE's RRC signaling under the 2-hop relay configuration shown in FIG. 5B. Accordingly, the UE having an MT component and functionality, via the C-Plane, may be connected to the CU of the IAB-donor. Though traffic is routed through IAB-node 2 and IAB-node 1, as depicted, the two nodes are passive nodes in that the data is passed to the next node(s) without manipulation. That is, data is transmitted by the UE to the node it is connected to, e.g., IAB-node 2, and then IAB-node 2 transmits the data to the node that is connected to, e.g., IAB-node 1, and then IAB-node 1 transmits the data (without manipulation) to the IAB-donor.

FIGS. 5A, 5B, and 5C illustrate that the MT of each IAB-node or UE has its own end-to-end RRC connection with the CU of the IAB-donor. Likewise, the DU of each IAB-node has an end-to-end F1-APS' connection with the CU of the IAB-donor. Any IAB nodes present between such end points transparently convey RRC or F1-AP signaling traffic.

Figure 6A:
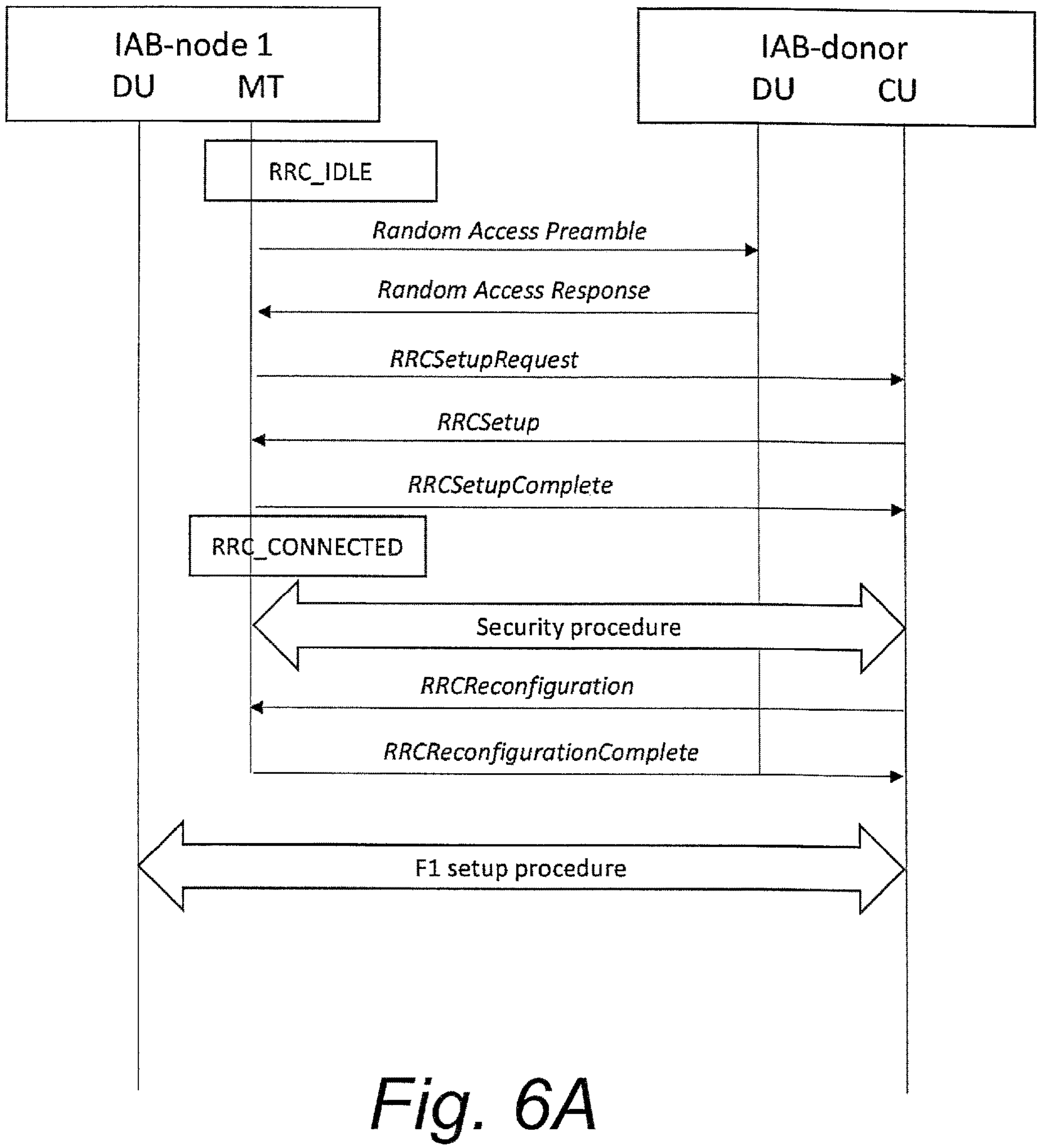
FIG. 6A depicts an example message sequence for an IAB-node to establish an RRC connection, followed by F1-AP* connection.
Figure 6B:
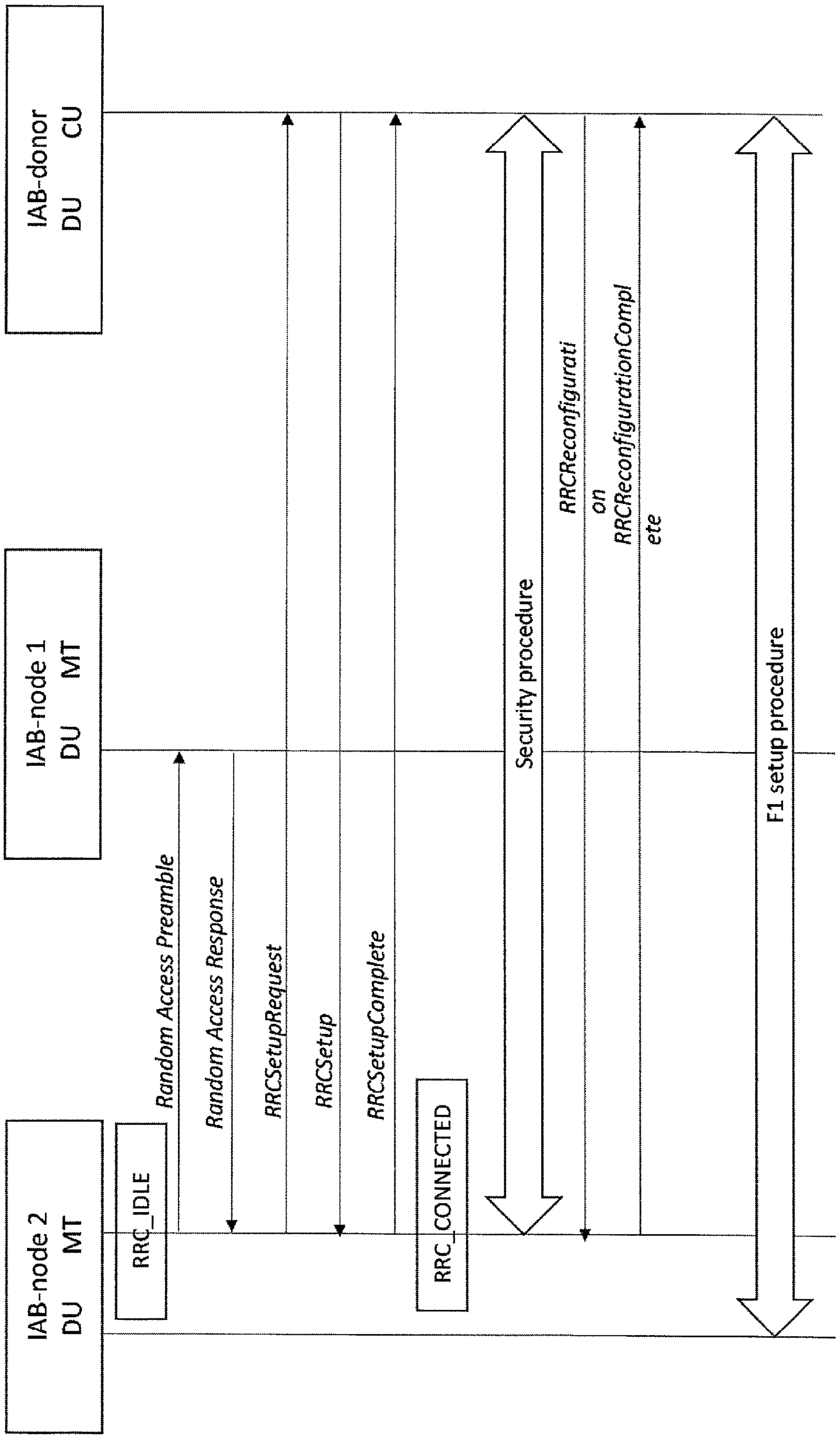
FIG. 6B depicts an example message sequence for IAB-node to establish an RRC connection with an IAB-donor, followed by the F1 setup procedure.

FIGS. 6A and 6B are diagrams of an example flow of information transmit/receive and/or processing by IAB-node(s) and an IAB-donor according to aspects of the present embodiments.

FIG. 6A depicts an example message sequence for IAB-node 1 to establish an RRC connection, followed by F1-AP* connection. It is assumed that IAB-node 1 has been pre-configured (or configured by the network) with information that instructs how to select a cell served by the IAB-donor. As shown in the figure, IAB-node 1—in an idle state (RRC_IDLE)—may initiate an RRC connection establishment procedure by sending Random Access Preamble to the IAB-donor, which may be received and processed by the DU of the IAB-donor. Upon successful reception of Random Access Response from the IAB-donor, IAB-node 1 may send an RRCSetupRequest, followed by reception of an RRCSetup and transmission of RRCSetupComplete. At this point of the message sequence, the IAB-node 1 may enter a connected state (RRC_CONNECTED) with the IAB-donor, and may proceed with a security procedure to configure encryption/integrity protection features. The CU of the IAB-donor may further send an RRCReconfiguration to IAB-node 1, which may comprise configuration parameters to configure radio bearers (e.g., data radio bearers (DRBs) and signaling radio bearers (SRBs)). In some embodiments, the RRCReconfiguration is sent to modify an RRC connection and establish Radio Connection between a UE and the network, however, in the present embodiment, the RRCReconfiguration may also be sent to configure a connection between an IAB-node and the network. RRC Connection Reconfiguration messages may be used to, for example, establish/modify/release Radio Bearers, and/or perform handover, etc. In one embodiment, any of the RRC messages transmitted from IAB-node 1 may include information identifying the IAB-node 1 as an IAB-node (not as a UE). For example, the Donor CU may be configured with a list of node identities (e.g., IMSI or S-TMSI) that may be allowed to use the service from the donor. The information may be used by the CU in the subsequence operations, for example, to distinguish a UE from an IAB-node.

As described above, following the RRC connection establishment procedure, the DU of IAB-node 1 and IAB-donor may proceed with F1 setup procedure using the F1-APS' protocol, which may activate one or more cells served by the DU of IAB-node 1-thereby allowing other IAB nodes and/or UEs to camp on the cell. In this procedure, the Adaptation Layer for IAB-node 1 and IAB-donor may be configured and activated as well.

FIG. 6B depicts an example message sequence or flow of information for IAB-node 2 to establish an RRC connection with IAB-donor, followed by the F1 setup procedure. It is assumed in this embodiment that IAB-node 1 has already performed the process disclosed in FIG. 6A to establish an RRC and F1-AP* connection. Referring back to FIG. 3, the IAB-node 2 shown in communication via the radio interface with IAB-node 1, may be also depicted in FIG. 6B as a child node of IAB-node 1 according to aspects of the present embodiments.

Figure 7:
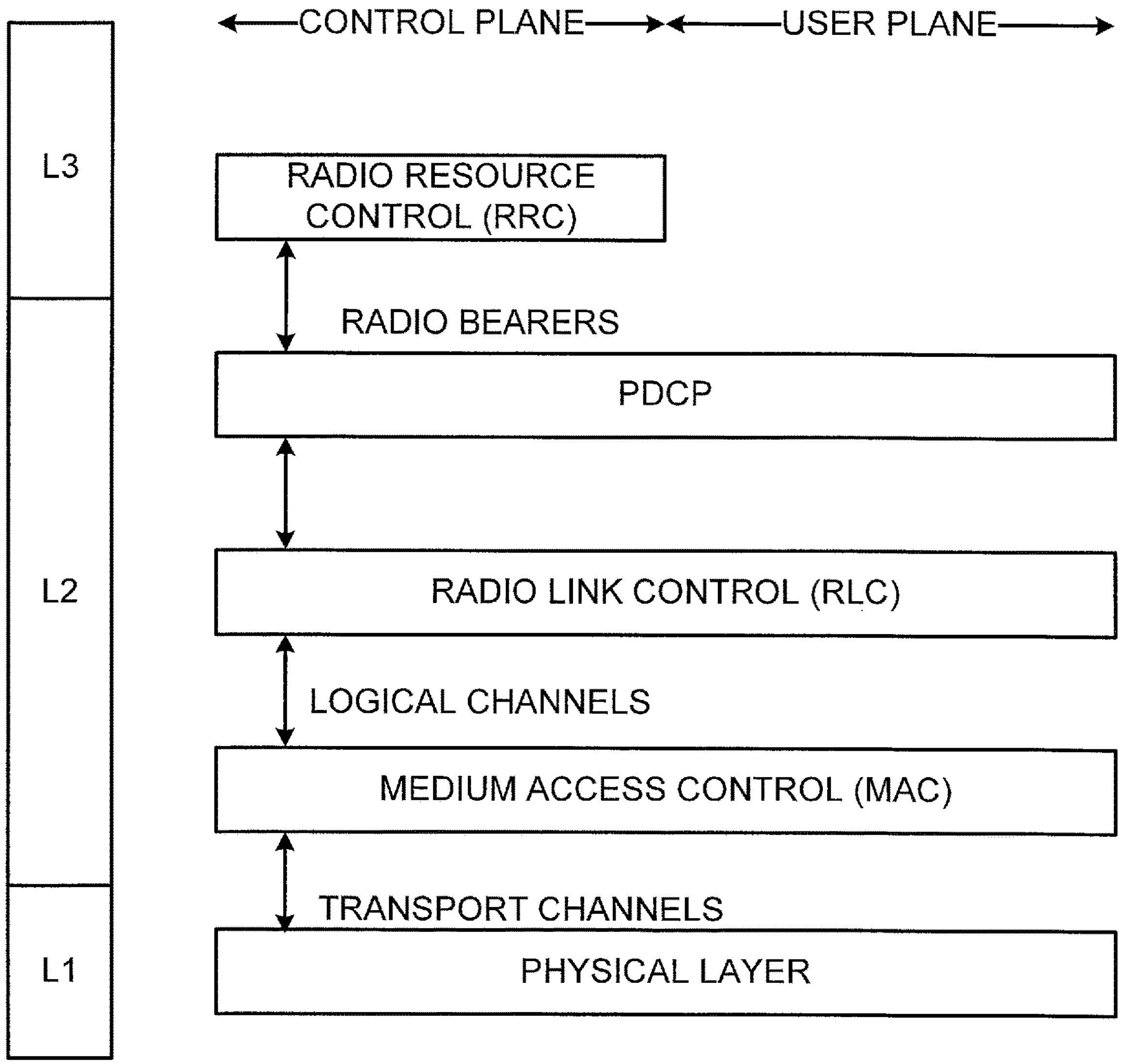
FIG. 7 is a diagrammatic view illustrating an example of a radio protocol architecture for the control and user planes in a mobile communications network.

FIG. 7 is a diagram illustrating an example of a radio protocol architecture for the control and user planes in a mobile communications network. The radio protocol architecture for the UE and/or the gNodeB may be shown with three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and/or gNodeB over the physical layer. In the user plane, the L2 layer may include a media access control (MAC) sublayer, a radio link control (RLC) sublayer, and a packet data convergence protocol (PDCP) sublayer, which are terminated at the gNodeB on the network side. Although not shown, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the IAB-nodes and/or the UE and an IAB-donor.

Figure 8:
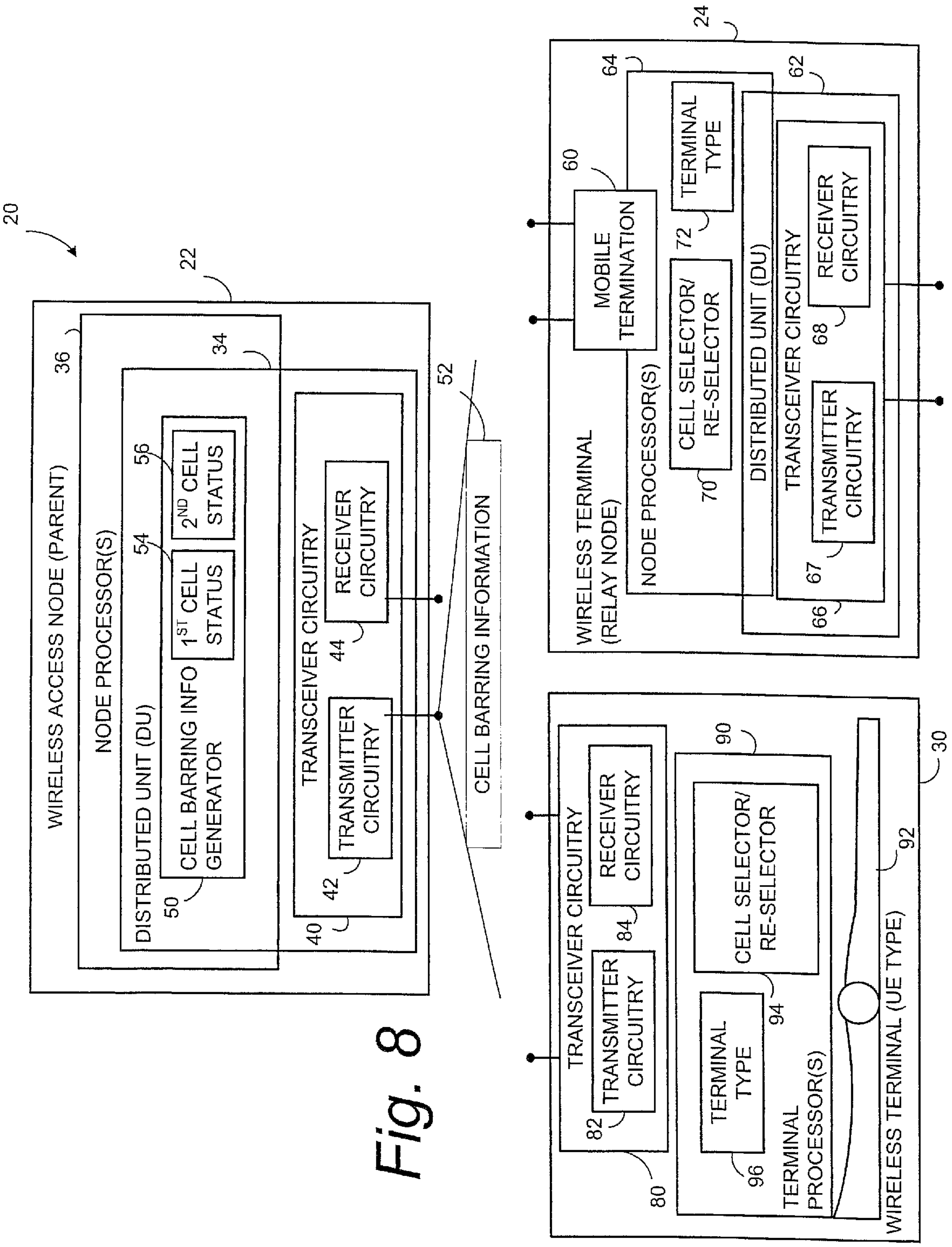
FIG. 8 is a schematic view showing a parent IAB node which transmits a cell barring information message in a wireless relay network which comprises an IAB-relay node and a user equipment.

FIG. 8 shows an example diagram of a telecommunications system 20 also known as wireless relay network 20. The wireless relay network 20 comprises wireless access node 22; a first wireless terminal which serves as an IAB-node 24, also known as relay node 24; and a second wireless terminal which serves as a user equipment 30. The wireless access node 22 may also be known and described as a parent node 22, and may be either an IAB-node or a donor IAB-node. The first wireless terminal which serves as an IAB-node 24 may also be known as a child node, e.g., a child in relation to parent IAB-node 22, or may be known as an IAB-relay node 24. The configuration of wireless nodes and terminals of FIG. 8 should be understood in the context of FIG. 1 and FIG. 2. For example, if serving as a donor IAB node, the parent IAB-node 22 may further comprise a central unit (CU) (unillustrated) to be connected to a core network. Alternatively, if serving as a relay node, the parent IAB-node 22 may further comprise a relay node mobile termination (MT) (unillustrated) to be connected to one or more grandparent nodes through which parent IAB-node 22 may be connected to a core network. Similarly, it should be understood that the IAB-relay node 24 may serve one or more unillustrated further nodes or further wireless terminals, e.g., further user equipments. It should also be understood that the wireless relay network 20 may comprise plural parent nodes 22, that each parent node 22 may serve plural IAB-relay nodes 24 and user equipments 30, and that each IAB-relay node 24 may in turn serve plural user equipments 30.

FIG. 8 further shows various components and functionalities of the nodes and terminal illustrated therein. For example, FIG. 8 shows wireless access node 22 as comprising distributed unit 34. The distributed unit 34 may be realized by, e.g., be comprised of or include, one or more processor circuits, e.g., parent node processor(s) 36. The distributed unit 34 may comprise parent node transceiver circuitry 40, which in turn may comprise parent node transmitter circuitry 42 and parent node receiver circuitry 44. The parent node transceiver circuitry 40 includes antenna(e) for the wireless transmission. Parent node transmitter circuitry 42 includes, e.g., amplifier(s), modulation circuitry and other conventional transmission equipment. Parent node receiver circuitry 44 comprises, e.g., amplifiers, demodulation circuitry, and other conventional receiver equipment.

As further shown in FIG. 8, parent node processor(s) 36 of wireless access node 22 may comprise cell barring information generator 50. The message generator 50 serves to generate, e.g., a cell barring information 52 as described herein. As mentioned above, the cell barring information 52 includes information comprising at least first cell status information 54 and second cell status information 56.

As shown in FIG. 8 the IAB-node 24, also known as wireless relay node 24, in an example embodiment and mode comprises relay node mobile termination unit 60 and relay node distributed unit 62. The relay node mobile termination unit 60 and relay node distributed unit 62 may be realized by, e.g., by comprised of or include, one or more processor circuits, e.g., relay node processor(s) 64. The one or more relay node processor(s) 64 may be shared by relay node mobile termination unit 60 and relay node distributed unit 62, or each of relay node mobile termination unit 60 and relay node distributed unit 62 may comprise one or more relay node processor(s) 64. The relay node distributed unit 62 may comprise relay node transceiver circuitry 66, which in turn may comprise relay node transmitter circuitry 67 and relay node receiver circuitry 68. The relay node transceiver circuitry 66 includes antenna(e) for the wireless transmission. Relay node transmitter circuitry 67 may include, e.g., amplifier(s), modulation circuitry and other conventional transmission equipment. Relay node receiver circuitry 68 may comprise, e.g., amplifiers, demodulation circuitry, and other conventional receiver equipment.

FIG. 8 further shows that IAB-node 24A may comprise cell selector/re-selector 70 and terminal type memory 72. Both cell selector/re-selector 70 and terminal type memory 72 may be realized or comprised by relay node processor(s) 64. The terminal type memory 72 serves to inform the relay node 24 that it is an IAB-node or a relay node-type of wireless terminal, rather than a UE-type of wireless terminal.

FIG. 8 shows user equipment 30 as comprising, in an example, non-limiting embodiment and mode, terminal transceiver circuitry 80. The transceiver circuitry 80 in turn may comprise terminal transmitter circuitry 82 and terminal receiver circuitry 84. The terminal transceiver circuitry 80 includes antenna(e) for the wireless transmission. The terminal transmitter circuitry 82 may include, e.g., amplifier(s), modulation circuitry and other conventional transmission equipment. The terminal receiver circuitry 84 may comprise, e.g., amplifiers, demodulation circuitry, and other conventional receiver equipment. FIG. 8 further shows user equipment 30 as also comprising node processor circuitry, e.g., one or more terminal processor(s) 90, and interfaces 92, including one or more user interfaces. Such user interfaces may serve for both user input and output operations, and may comprise (for example) a screen such as a touch screen that can both display information to the user and receive information entered by the user. The user interfaces 92 may also include other types of devices, such as a speaker, a microphone, or a haptic feedback device, for example.

In an example, non-limiting embodiment and mode shown in FIG. 8, the user equipment 30 may include cell selector/re-selector 94 and terminal type memory 96. The cell selector/re-selector 94 serves to inform the wireless terminal 30 that it is a UE-type of wireless terminal, rather than an IAB-node or a relay node-type of wireless terminal.

The wireless relay network 20 of FIG. 8 comprising the parent node 22, IAB-relay node 24, and user equipment 30 provides a generic context for describing various example embodiments and modes of the threshold. The example embodiments and modes, although discussed separately, may include features or aspects that may be combined with other example embodiments and modes, or even entirely combined with other example embodiments and modes.

In some configurations, the DU of each IAB-node/donor, e.g., the distributed unit 34 of parent node 22 and the relay node distributed unit 62 of IAB-relay node 24, may broadcast information necessary to be discovered by UEs and/or other child IAB-nodes. Such information may comprise synchronization signals, master information block (MIB)

and one or more system information blocks (SIBs). The SIBs may further comprise an essential SIB (e.g. SIB1) and other SIBs (e.g. SIB2, SIB3, . . . etc.). As used herein, an “essential SIB” is a type of SIB that may carry information necessary for camping and initial access, whereas the other SIBs may carry all other information, such as information about neighbor cells.

When the wireless relay network 20 detects a congestion (or any other reasons), the network 20 may desire to restrict usage of the network resource usage from some UEs and/or IAB-nodes. In some configurations, such restrictions may be achieved by a cell barring, or “cell reservations”.

In a cellular network, the cell barring may be implemented by including barring status in a broadcast signal from base stations. Any wireless terminal in the coverage of a cell served by such a base station may first acquire the broadcast signal and examine the barring status. If the barring status indicates that the cell is restricted, e.g., barred, the wireless terminal may consider that this cell is not suitable for camping and look for other cells. Otherwise, the terminal may camp on the cell.

For example, in the 5G cellular system, a gNB may broadcast information for cell barring/reservations (3GPP TS 38.331). The information for cell barring/reservations which is broadcast may include, for example, an information element cell cellBarred which is included in a Master System Information Block in the example manner shown in Table 1; an information element cellAccessrelatedInfo which is included in a SIB1 message in the example manner shown in Table 2 and having example content shown in Table 3; and an information element PLMN-IdentityInfoList which is included in the information element cellAccessrelatedInfo and which has content as shown in Table 4.

TABLE 1

MIB:

```
-- ASN1START
-- TAG-MIB-START
MIB ::=                         SEQUENCE {
  systemFrameNumber               BIT STRING (SIZE (6)),
  subCarrierSpacingCommon         ENUMERATED
                                  {scs15or60,scs30or120},
  ssb-SubcarrierOffset            INTEGER (0..15),
  dmrs-TypeA-Position             ENUMERATED {pos2, pos3},
  pdcch-ConfigSIB1                PDCCH-ConfigSIB1,
  cellBarred                      ENUMERATED {barred, notBarred},
  intraFreqReselection            ENUMERATED {allowed, notAllowed),
  spare                           BIT STRING (SIZE (1))
}
-- TAG-MIB-STOP
-- ASN1STOP
```

TABLE 2

SIB1 message

```
-- ASN1START
-- TAG-SIB1-START
SIB1 ::= SEQUENCE {
  cellSelectionInfo          SEQUENCE {
  q-RxLevMin                 Q-RxLevMin,
  q-RxLevMinOffset             INTEGER (1..8)                 OPTIONAL, -- Need R
  q-RxLevMinSUL                Q-RxLevMin                     OPTIONAL, -- Need R
  q-QualMin                    Q-QualMin                      OPTIONAL, -- Need R
  q-QualMinOfset               INTEGER (1..8)                 OPTIONAL, -- Need R
  }                                                             OPTIONAL, -- Need S
  cellAccessRelatedInfo        CellAccessRelatedInfo,
  connEstFailureControl        ConnEstFailureControl              OPTIONAL, -- Need R
  si-SchedulingInfo            SI-SchedulingInfo                  OPTIONAL, -- Need R
  servingCellConfigCommon      ServingCellConfigCommonSIB           OPTIONAL, -- Need R
  ims-EmergencySupport         ENUMERATED {true}                    OPTIONAL, -- Need R
  eCallOverIMS-Support       ENUMERATED {true} r                  OPTIONAL, -- Cond Absent
  ue-TimersAndConstants          UE-TimersAndConstants            OPTIONAL, -- Need R
  uac-BarringInfo                SEQUENCE {
    uac-BarringForCommon             UAC-BarringPerCatList          OPTIONAL, -- Need S
    uac-BarringPerPLMN-List          UAC-BarringPerPLMN-List        OPTIONAL, -- Need S
    uac-BarringInfoSetList         UAC-BarringInfoSetList,
    uac-AccessCategory1-SelectionAssistanceInfo CHOICE {
      plmnCommon                       UAC-AccessCategory1 -SelectionAssistanceInfo,
      individualPLMNList                                  SEQUENCE(SIZE(2..maxPLMN))OF
UAC-AccessCategory1-SelectionAssistanceInfo
    }                                    OPTIONAL
  }                                      OPTIONAL, -- Need R
  useFullResumeID                ENUMERATED {true}                OPTIONAL, -- Need N
  lateNonCriticalExtension       OCTET STRING                       OPTIONAL,
  nonCriticalExtension         SEQUENCE{ }                          OPTIONAL
}
UAC-AccessCategory1-SelectionAssistanceInfo ::= ENUMERATED {a, b, c}
-- TAG-SIB1-STOP
-- ASN1STOP
```

TABLE 3

CellAccessRelatedInfo information element

```
-- ASN1START
-- TAG-CELL-ACCESS-RELATED-INFO-START
CellAccessRelatedInfo:= SEQUENCE {
  plmn-IdentityList      PLMN-IdentityInfoList,
  cellReservedForOtherUse ENUMERATED{true}OPTIONAL,-- Need R
  ...
}
-- TAG-CELL-ACCESS-RELATED-INFO-STOP
-- ASN1STOP
--
```

TABLE 4

| PLMN-IdentityInfoList information element |
|---|

```
-- ASN1START
-- TAG-PLMN-IDENTITY-LIST-START
PLMN-IdentityInfoList:= SEQUENCE (SIZE (1..maxPLMN)) OF PLMN-IdentityInfo
PLMN-IdentityInfo ::= SEQUENCE {
   plmn-IdentityList   SEQUENCE (SIZE (1..maxPLMN)) OF PLMN-Identity,
   trackingAreaCode   TrackingAreaCode   OPTIONAL,   -- Need R
   ranac              RAN-AreaCode       OPTIONAL,   -- Need R
   cellIdentity                          CellIdentity,
   cellReservedForOperatorUse ENUMERATED{reserved, notReserved},
   ...
}
-- TAG-PLMN-IDENTITY-LIST-STOP
-- ASN1STOP
```

In some example embodiments and modes, when camping on a cell, a terminal such as user equipment 30 or an IAB-node such as IAB-relay node 24 may acquire MIB and SIB1 formatted as shown above in Table 1 and Table 2, respectively, and may proceed to processing the information related to cell barring/reservations. In some configurations, the UE 30 or the IAB-node 24 may follow the procedure or listing specified in 3GPP TS 38.304, which is also shown in Table 5. The procedure described and shown in Table 5 may also be referred to as "listing 1", and specifically includes a procedure for a "barred cell" which involves an end portion of the listing which begins with an includes the last non-indented line thereof.

TABLE 5

| 3GPP TS 38.304 Procedure/Listing 1 |
|---|

Cell status and cell reservations are indicated in the MIB or SIB1 message
TS 38.331 [3] by means of three fields:
cellBarred (IE type: "barred" or "not barred")
Indicated in MIB message. In case of multiple PLMNs indicated in SIB1, this field is common for all PLMNs
cellReservedForOperatorUse (IE type: "reserved" or "not reserved")
Indicated in SIB1 message. In case of multiple PLMNs indicated in SIB1, this field is specified per PLMN.
cellReservedForOtherUse (IE type: "true")
Indicated in SIBI message. In case of multiple PLMNs indicated in SIB1, this field is common for all PLMNs.
When cell status is indicated as "not barred" and "not reserved"
for operator use and not "true" for other use,
All UEs shall treat this cell as candidate during the cell selection and cell reselection procedures.
When cell status is indicated as "true" for other use,
The UE shall treat this cell as if cell status is "barred".
When cell status is indicated as "not barred" and "reserved"
for operator use for any PLMN and not "true" for other use,
UEs assigned to Access Identity 11 or 15 operating in their HPLMN/EHPLMN shall treat this cell as candidate during the cell selection and reselection procedures if the field
ceUResewedForOperatorUse for that PLMN set to "reserved".
UEs assigned to an Access Identity in the range of 0 to 10 and 12 to 14 shall behave as
if the cell status is "barred" in case the cell is "reserved for operator use" for
the registered PLMN or the selected PLMN.
NOTE 1: Access Identities 11, 15 are only valid for use in the HPLMN/EHPLMN; Access Identities 12, 13, 14 are only valid for use in the home country as specified in 3 GPP
TS 22.261 [12]. When cell status "barred" is indicated or to be treated as if the
cell status is "barred",
[procedure for a "barred" cell]
The UE is not permitted to select/reselect this cell, not even for emergency calls.
The UE shall select another cell according to the following rule:
If the cell is to be treated as if the cell status is "barred" due to being unable
to acquire the MIB or the SIB1:
the UE may exclude the barred cell as a candidate for cell selection/
reselection for up to 300 seconds.
the UE may select another cell on the same frequency if the selection criteria are fulfilled.
else
If the field intraFreqReselection in MIB message is set to "allowed", the UE may select
another cell on the same frequency if re-selection criteria are fulfilled;
The UE shall exclude the barred cell as a candidate for cell selection/reselection
for 300 seconds.
If the field intraFreqReselection in MIB message is set to "not allowed" the UE shall
not re-select a cell on the same frequency as the barred cell;
The UE shall exclude the barred cell and the cells on the same frequency as a candidate
for cell selection/reselection for 300 seconds.

In some configurations, the Access Identities may be defined in 3GPP TS 22.261 as shown in Table 6.

TABLE 6

Access Identities

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

(NOTE 1):
Access Identity 1 is used to provide overrides according to the subscription information in UEs configured for MPS. The subscription information defines whether an overide applies to UEs within one of the following categories:
a) UEs that are configured for MPS;
b) UEs that are configured for MPS and are in the PLMN listed as most preferred PLMN of the country where the UE is roaming in the operator-defined PLMN selector list or in their HPLMN or in a PLMN that is equivalent to their HPLMN;
c) UEs that are configured for MPS and are in their HPLMN or in a PLMN that is equivalent to it.
(NOTE 2):
Access Identity 2 is used to provide overrides according to the subscription information in UEs configured for MCS. The subscription information defines whether an overide applies to UEs within one of the following categories:
a) UEs that are configured for MCS;
b) UEs that are configured for MCS and are in the PLMN listed as most preferred PLMN of the country where the UE is roaming in the operator-defined PLMN selector list or in their HPLMN or in a PLMN that is equivalent to their HPLMN;
c) UEs that are configured for MCS and are in their HPLMN or in a PLMN that is equivalent to it.
(NOTE 3):
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

Embodiment 1

Figure 9:
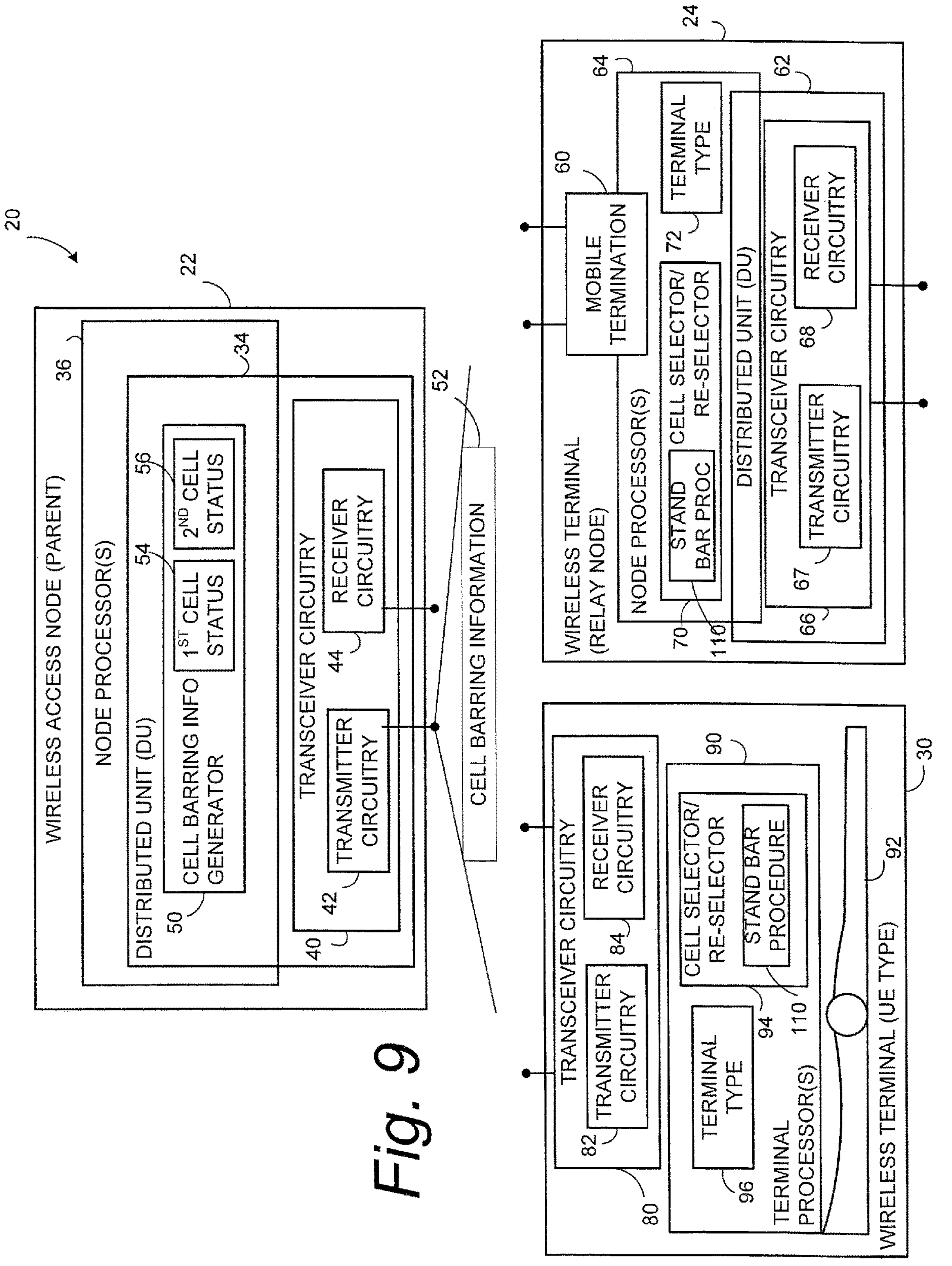
FIG. 9 is a schematic view of a wireless relay network which in which an IAB-relay node and a user equipment may execute a same or standard barring procedure.

FIG. 9 shows an example wireless relay network 20 including parent node 22, IAB-relay node 24, and user equipment 30 as shown in FIG. 8. Elements and functionalities of the nodes and terminals of FIG. 9 are essentially the same as those of FIG. 8 unless otherwise specified or otherwise clear from the context. In the example embodiment and mode of FIG. 9, unless otherwise specified the IAB-relay node 24 and the user equipment 30 both perform the same cell barring procedure, e.g., the same procedure is performed by both IAB-relay node 24 and user equipment 30 when the cell barring information message 52 indicates that the respective IAB-relay node 24 or user equipment 30 is barred for the cell in which the cell barring information message 52 is transmitted by parent node 22. FIG. 9 depicts that same barring procedure which may be executed by IAB-relay node 24 and user equipment 30 as standard barring procedure 110. As used herein, "standard" is intended to mean a barring procedure that applies to and/or is to be used by both to IAB-relay nodes and user equipments.

Thus, in the example embodiment of FIG. 9, the UE and the IAB-node may perform a same procedure, such as the procedure shown in Table 5 as an example. Thus, when the UE 30 is barred, the IAB-node 24 may be also barred.

There may be some exceptions to the general rule of both IAB-relay node 24 and user equipment 30 performing the standard barring procedure 110. A first exception in a case in which the information element cellReservedForOperatorUse (see Table 5) is "reserved" for some of the PLMNs, and the UE and the IAB-node camp on different PLMNs. In this case, a node (UE or IAB-node) that selects one of the "reserved" PLMNs may be barred, while the other that selects a PLMN not "reserved" may camp on the cell.

A second exception is a case in which the IAB-node is configured with Access Identity 11 or 15 (see Table 6). In this case, when selecting one of the "reserved" PLMNs, the UE (configured with Access Identity other than 11 or 15) may be barred while the IAB-node may not be barred.

Embodiment 2

In a second example generic embodiment and mode and its sub-embodiments described herein, an example wireless relay network 20 includes parent node 22, IAB-relay node 24, and user equipment 30 as shown in FIG. 8. Elements and functionalities of the nodes and terminals of the second example embodiments and modes and the sub-modes are again essentially the same as those of FIG. 8 unless otherwise specified or otherwise clear from the context. IN the second example embodiment and mode a parent node (e.g. eNB, gNB, IAB-node, or IAB-donor) may restrict UEs and/or other IAB-nodes camping on a cell served by the parent node in finer granularity. Specifically, the cell may be configured (or preconfigured) with one of the barring modes of Table 7.

TABLE 7

| CELL BARRING MODES |
|---|
| Barring mode 1: allowing both UEs' and IAB-nodes' camping |
| Barring mode 2: allowing UEs' but barring IAB-nodes' camping |
| Barring mode 3: barring UEs' but allowing IAB-nodes' camping |
| Barring mode 4: barring both UEs' and IAB-nodes' camping |

During a cell selection/reselection process, a UE 30 or the MT relay node mobile termination unit 60 of an IAB-node 24 may determine whether a cell allows camping, e.g., the cell is considered as a candidate for cell selection/reselection, based on the current barring mode of the cell.

Embodiment 2-1

Figure 10:
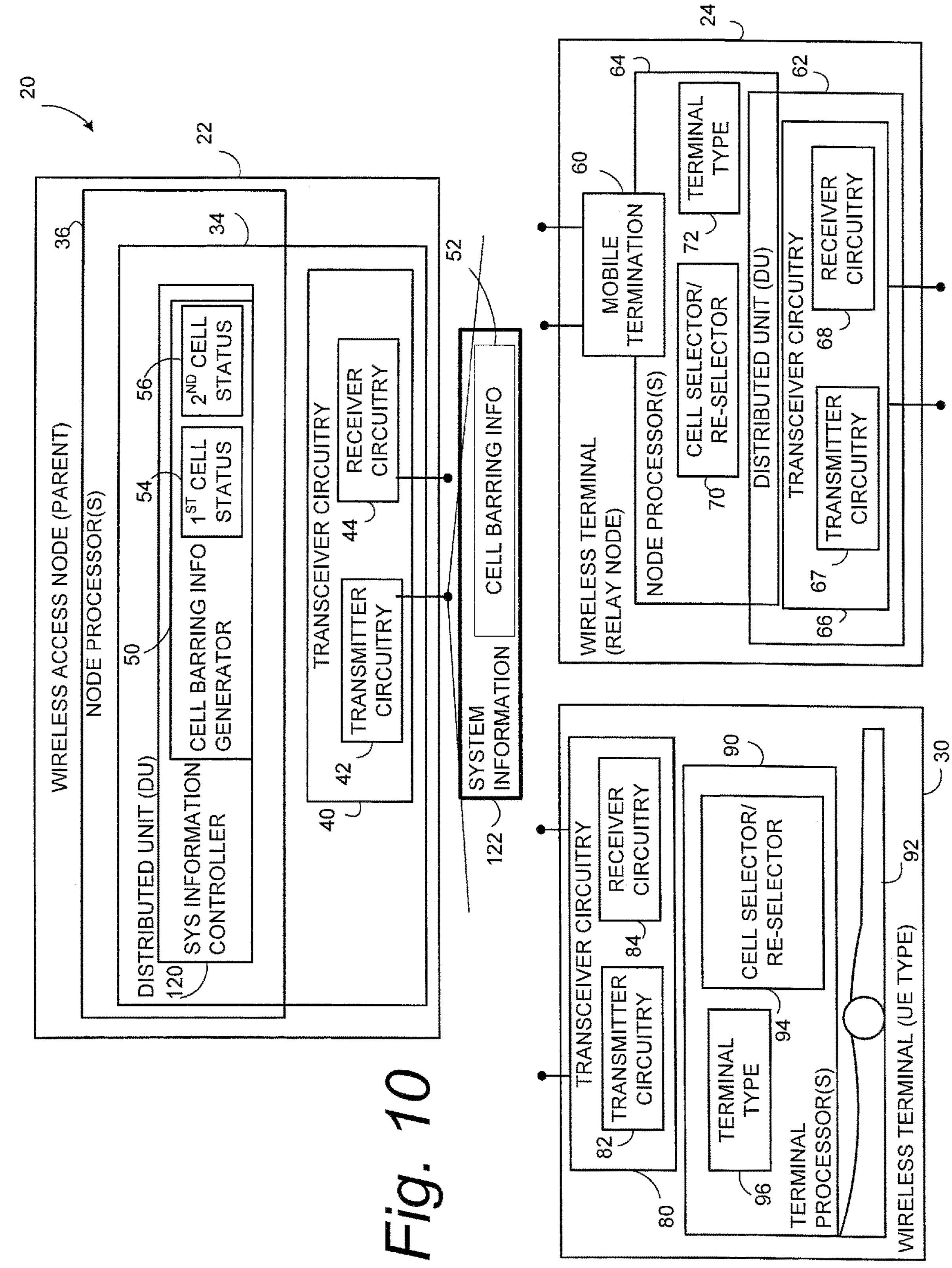
FIG. 10 is a schematic view of a wireless relay network comprising a parent node, an IAB-relay node, and user equipment and in which cell barring information may be included in system information.

FIG. 10 shows an example wireless relay network 20 including parent node 22, IAB-relay node 24, and user equipment 30 in which cell barring information message 52 may be included in system information. Elements and functionalities of the nodes and terminals of FIG. 10 are essentially the same as those of FIG. 8 unless otherwise specified or otherwise clear from the context. In particular, in the example embodiment and mode of FIG. 10 the cell barring information generator 50 of parent node 22 may comprise or be included in system information controller 120. The system information controller 120 generates system information 122, which may take the form of one or more system information blocks (SIB) as described herein.

Figure 11:
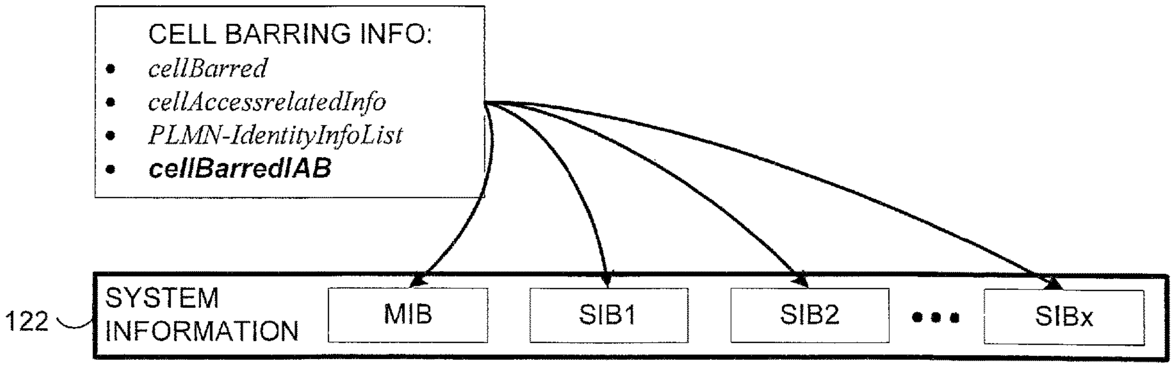
FIG. 11 is a diagrammatic view showing an example embodiment and mode in which the cell barring information may be transmitted in one or more system information blocks and in which an information element such as CellBarredIAB may be included.

In one configuration, the barring mode, e.g., the cell barring information, in part or in whole, may be broadcasted by the parent node using one or more fields, parameters or information elements in the system information. FIG. 11 shows how an example embodiment and mode in which the cell barring information may be transmitted in one or more system information blocks (SIB), such as in one or more of a Master Information Block, in SIB1, or in one or more other system information blocks (SIBs), the other system information blocks being indicated as blocks SIB2 . . . SIBx in FIG. 11. The fact that FIG. 11 shows arrows from the cell barring information to each of the MIB, SIB1, and other SIBs does not necessarily mean that the cell barring information is distributed to or included in each such system information block, but only that the cell barring information may be included in one or more system information blocks, either to one system information block or any combination of system information blocks.

FIG. 11 further shows that, in a non-limiting example, the system information may include, in some of the system information blocks (MIB, SIB1 or other SIB(s)), the one or more information elements or fields of the type discussed earlier as being pertinent to cell barring, as well as a further field of a type herein for convenience named cellBarredIAB and having an example content illustrated in Table 8. As shown in FIG. 11, the cell barring information may include the earlier-described information elements or elements such as cellBarred (see Table 1), cellAccessrelatedInfo (see Table 2 and Table 3); and PLMN-IdentityInfoList (see Table 4). Generally, the information element cellBarred is included in the Master Information Block (MIB).

TABLE 8

| cellBarredIAB INFORMATION ELEMENT |
|---|
| cellBarredIAB ENUMERATED {barred, notBarred),<br>-cellBarredIAB (IE type: "barred" or "not barred")<br>This field indicates if the cell is barred for MTs of IAB-nodes.<br>This field is ignored by UEs. |

Accordingly, the information element cellBarredIAB may be configured independently from the fields disclosed in Embodiment 1, e.g., independently of cellBarred, cellAccessrelatedInfo; and PLMN-IdentityInfoList. A wireless terminal, with a terminal type being either a UE or a relay node, e.g., a user equipment 30 or a relay node mobile termination unit 60 of an IAB-node 24, may determine which barring fields/parameters to use, depending on its terminal type. For example, in a case that the terminal type is a relay node, the relay node mobile termination unit 60 of the IAB-node 24 may ignore cellBarred in MIB, which is applicable only to UEs (not to IAB-nodes) and may use cellBarredIAB instead to determine the cell status (barred or not barred). Meanwhile, in a case that the terminal type is a UE such as user equipment 30, the UE may behave as disclosed in Embodiment 1: use cellBarred to determine the cell status. In either case, if the cell status "barred" is indicated, the procedure (procedure for a "barred" cell) in Listing 1 of Table 5 may be performed.

In some example configurations, the user equipment 30 may ignore or may not recognize cellBarredIAB, if in fact the user equipment 30 receives the cellBarredIAB information element. In another configuration, the UE may not even attempt to receive the system information block where cellBarredIAB is included.

FIG. 10 thus shows a wireless access node 22 of a radio access network (RAN) 20 that communicates over a radio interface with at least one wireless terminal. A wireless terminal in communication with parent node 22 possesses a terminal type, such terminal type being either a user equipment (UE) terminal type or a relay node terminal type. The parent node 22 comprises parent node transmitter circuitry 42 which is configured to transmit cell barring information to the wireless terminal. The parent node 22 of FIG. 10 further comprises system information controller 120, which in turn comprises cell barring information generator 50 and which may be formed by or comprise, e.g., be included in parent node processor(s) 36. The cell barring information generator 50 generates or configures the cell barring information to indicate (1) first cell status 54 dedicated for the wireless terminal of the terminal type being a UE and (2) second cell status 56 dedicated for the wireless terminal of the terminal type being a relay node. Each of the first cell status and the second cell status are configured to enable a wireless terminal to determine whether or not camping on a cell served by the wireless access node is allowed (not barred) or not allowed (barred).

Figure 12:
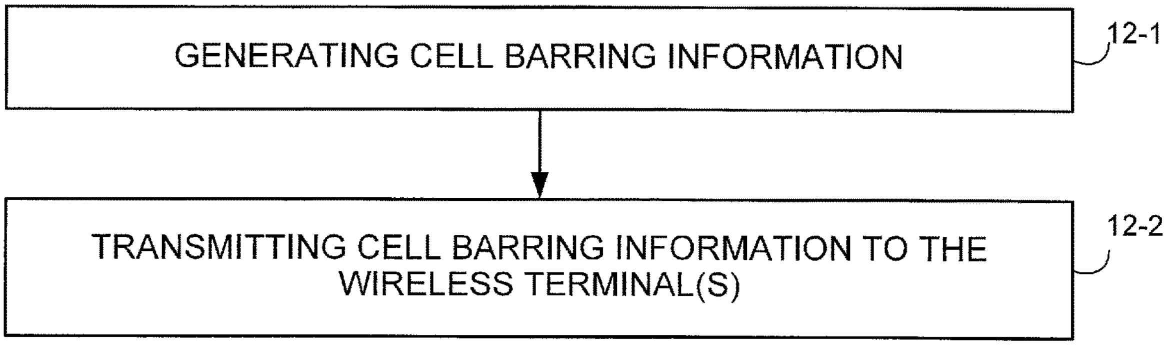
FIG. 12 is a flowchart showing example, basic, representative steps or acts performed by a parent node of FIG. 10.

FIG. 12 shows example, basic, representative steps or acts performed by the parent node 22 of FIG. 10. Act 12-1 comprises generating cell barring information. As indicated above, the cell barring information indicates first barring status dedicated for the wireless terminal of the terminal type being a UE and second barring status dedicated for the wireless terminal of the terminal type being a relay node, the barring status being used to determine whether or not camping on a cell served by the wireless access node is allowed (not barred) or not allowed (barred). Act 12-2 comprises transmitting cell barring information to the wireless terminal(s), e.g., to one or both of IAB-relay node 24 and user equipment 30.

FIG. 10 further shows a wireless terminal of a radio access network (RAN) that communicates over a radio interface with a wireless access node. In fact, FIG. 10 shows two wireless terminals: IAB-relay node 24 and user equipment 30. Each wireless terminal possesses a terminal type as being either a user equipment (UE) terminal type (in the case of user equipment 30) or a relay node terminal type (as in the case of IAB-relay node 24). Regardless of terminal type, the wireless terminal comprises: receiver circuitry and processor circuitry. For example, IAB-relay node 24 comprises relay node mobile termination unit 60 as receiver circuitry and relay node processor(s) 64; user equipment 30 comprises terminal receiver circuitry 84 and terminal processor(s) 90. The receiver circuitry is configured to receive the cell barring information from the wireless access node. The processor circuitry is configured to determine, based on the cell barring information, whether or not the wireless terminal treats a cell served by the wireless access node as a candidate during cell selection and cell reselection procedure. Such determination of candidacy may be performed, for example, by the cell selector/re-selector 70 of IAB-relay node 24 and the terminal type memory 96 of user equipment 30. The cell barring information indicates first cell status dedicated for the wireless terminal of the terminal type being a UE and second cell status dedicated for the wireless terminal of the terminal type being a relay node. Each of the first cell status and the second cell status may be used to determine whether or not camping on a cell served by the wireless access node is allowed (not barred) or not allowed (barred). Moreover, the processor circuitry uses one of the first barring status or the second barring status based on the terminal type.

Figure 13:
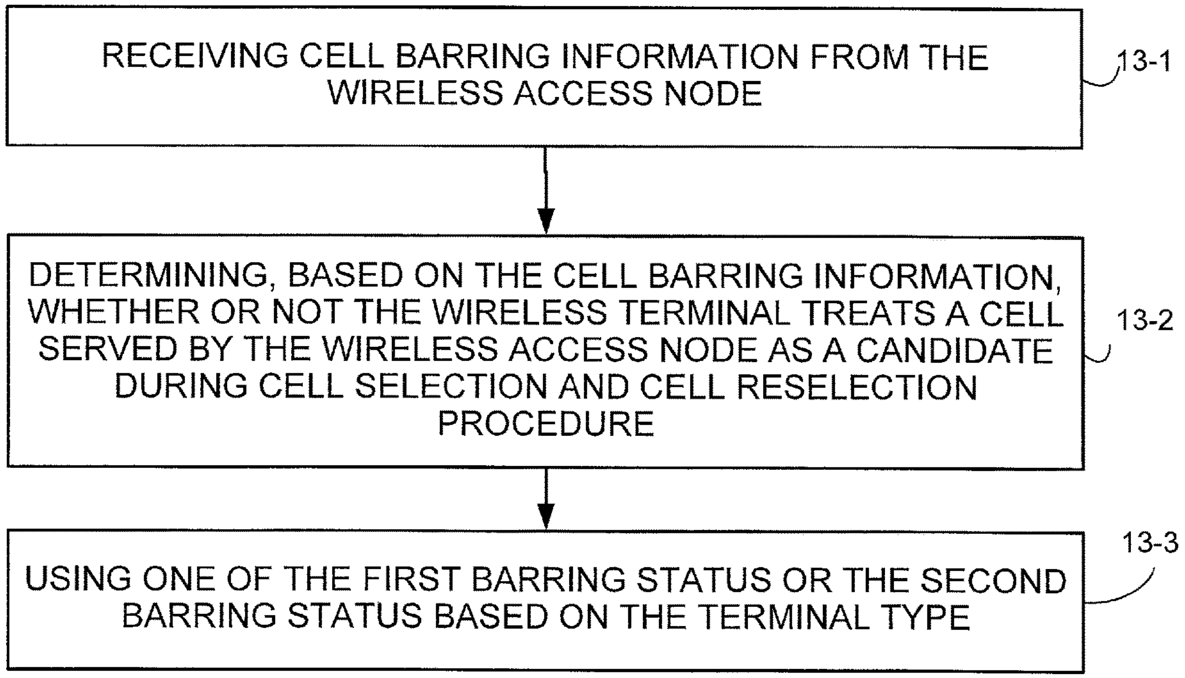
FIG. 13 is a flowchart showing example, basic, representative steps or acts performed by a wireless terminal of FIG. 10.

FIG. 13 shows example, basic, representative steps or acts performed by a wireless terminal of FIG. 10, e.g., either by IAB-relay node 24 or user equipment 30. Act 13-1 comprises receiving cell barring information from the wireless access node 22. As indicated above, the cell barring information indicates first barring status dedicated for the wireless terminal of the terminal type being a UE and second barring status dedicated for the wireless terminal of the terminal type being a relay node, the barring status being used to determine whether or not camping on a cell served by the wireless access node is allowed (not barred) or not (barred). Act 13-2 comprises determining, based on the cell barring information, whether or not the wireless terminal treats a cell served by the wireless access node as a candidate during cell selection and cell reselection procedure. Act 13-3 comprises using one of the first barring status or the second barring status based on the terminal type. Usage of the first barring status or second barring status may comprise using the barring status to make a cell selection or re-selection.

Thus, in an example configuration, the first cell status information 54 may be obtained from the information element cellBarred and the second cell status information 56 may be obtained from the information element cellBarredIAB. In such a configuration, the barring modes (1) to (4) disclosed in Table 7 above may be achieved in the manner shown in Table 9.

TABLE 9

| CELL BARRING MODES: FIRST EXAMPLE IMPLEMENT A TION |
|---|
| Barring mode 1: cellBarred = notBarred, cellBarredIAB = notBarred |
| Barring mode 2: cellBarred = notBarred, cellBarredIAB = Barred |
| Barring mode 3: cellBarred = Barred, cellBarredIAB = notBarred |
| Barring mode 4: cellBarred = Barred, cellBarredIAB = Barred |

It should be noted that, in a case that a node does not support IAB relaying functionality, e.g., in a case in which the node is not configured to be a parent node of other IAB nodes, the node may set "barred" to cellBarredIAB, in order to prevent other IAB-nodes from camping on the cell served by such node.

Furthermore, in one example configuration cellBarredIAB may be optionally present in the system information block(s). If not present, the relay node mobile termination unit 60 of the IAB-node that receives the system information block(s) may treat the cell as the cell status is "barred".

Embodiment 2-2

Figure 14:
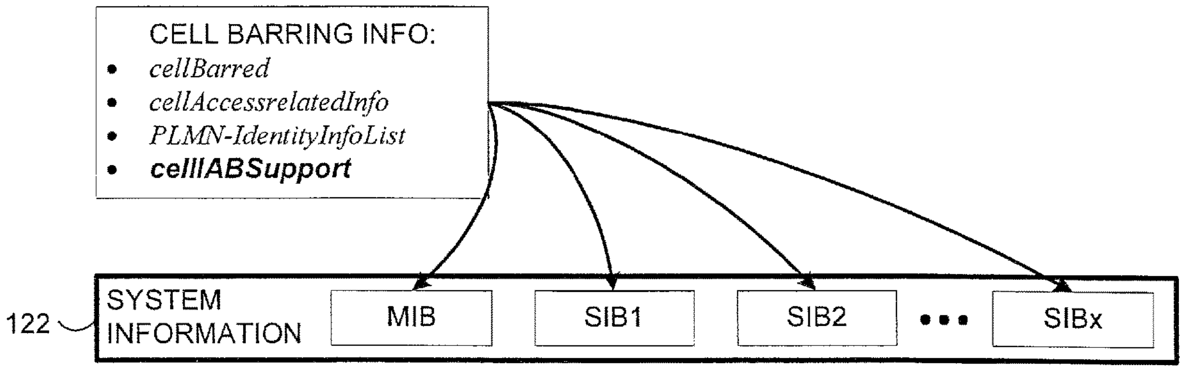
FIG. 14 is a diagrammatic view showing an example embodiment and mode in which the cell barring information may be transmitted in one or more system information blocks and in which an information element such as CellIABSupport may be included.

Embodiment 2-2 is a sub-embodiment of Embodiment 2, and in a sense is logically equivalent to sub-embodiment 2-1. Elements and functionalities of the nodes and terminals of sub-embodiment 2-2 are essentially the same as those of FIGS. 8 and 10 unless otherwise specified or otherwise clear from the context. However, the sub-embodiment 2-2 employs in the cell barring information a parameter different from the cellBarredIAB of sub-embodiment 2-1. Specifically, and as shown in FIG. 14, instead of the aforementioned parameter cellBarredIAB, for the sub-embodiment the parameter cellIABSupport may be carried in MIB and/or some of the system information blocks (e.g., iab-Support field in SIB1, per 3GPP TS 38.331). The parameter or information element cellIABSupport is illustrated and described by Table 10.

TABLE 10

| cellIABSupport INFORMATION ELEMENT |
|---|
| cellIABSupport ENUMERATED {supported, notSupported},<br>- cellIABSupport (IE type: "supported" or "not supported")<br>This field indicates if the cell supports IAB relaying functionality.<br>This field is ignored by UEs. |

Accordingly, the information element or field cellIABSupport may be configured independently from the fields disclosed in the previous embodiments. A wireless terminal, with a terminal type being either a UE 30 or a relay node (a relay node mobile termination unit 60 of an IAB-node 24), may determine which barring fields/parameters to use, depending on its terminal type. For example, in a case that the terminal type is a relay node 24, the relay node mobile termination unit 60 of the IAB-node 24 may ignore cellBarred in MIB and use cellIABSupport to determine if the IAB-node 24 is allowed to camp on the cell. If cellIABSupport is "supported" (e.g., the iab-Support field is present), the IAB-node 24 may consider the cell as a candidate. If cellIABSupport is "notSupported" (e.g., the iab-Support field is absent), the IAB-node may treat the cell as if the cell status is "barred". On the other hand, in a case that the terminal type is a UE 30, the UE 30 may behave as disclosed in Embodiment 1: use cellBarred to determine the cell status. In either case, if the cell status "barred" is indicated or to be treated as if the cell status is "barred", the procedure or Listing 1 (procedure for a "barred" cell) of Table 5 may be performed.

The acts of FIG. 12 for the parent node 22 of FIG. 10 are executed for the parent node 22 of this sub-embodiment 2-2, and likewise the acts of FIG. 13 for the wireless terminal(s) of FIG. 10 are applicable and executed for the wireless terminal(s) of the this sub-embodiment 2-2, it being understood that the barring and/or candidacy of the wireless terminal may be determined for IAB-relay node 24 with reference to cellIABSupport of the sub-embodiment 2-2 rather than the information element cellBarredIAB of sub-embodiment 2-1.

In some configurations of the sub-embodiment 2-2, the UE 30 may ignore or may not recognize the information element cellIABSupport, if the user equipment 30 in fact receives information element cellIABSupport. In another configuration of the sub-embodiment 2-2, the UE may not attempt to receive the system information block where cellIABSupport is included.

Thus, in an example configuration for the sub-embodiment 2-2, the barring modes (1) to (4) disclosed in Table 7 may be achieved using the information element cellIABSupport in the manner of Table 11.

TABLE 9

| CELL BARRING MODES: SECOND EXAMPLE IMPLEMENTATION |
|---|
| Barring mode 1: cellBarred = notBarred, cellIABSupport = supported |
| Barring mode 2: cellBarred = notBarred, cellIABSupport = notSupported |
| Barring mode 3: cellBarred = Barred, cellIABSupport = supported |
| Barring mode 4: cellBarred = Barred, cellIABSupport = notSupported |

Furthermore, in one example configuration the information element cellIABSupport may be optionally present in the system information block(s). If not present, the relay node mobile termination unit 60 of the IAB-node 24 that receives the system information block(s) may consider cellIABSupport=notSupported. Alternatively, in another configuration, the relay node mobile termination unit 60 of the IAB node 24 may treat the absence of cellIABSupport in the system information block(s) as "Supported".

Embodiment 2-3

Figure 15:
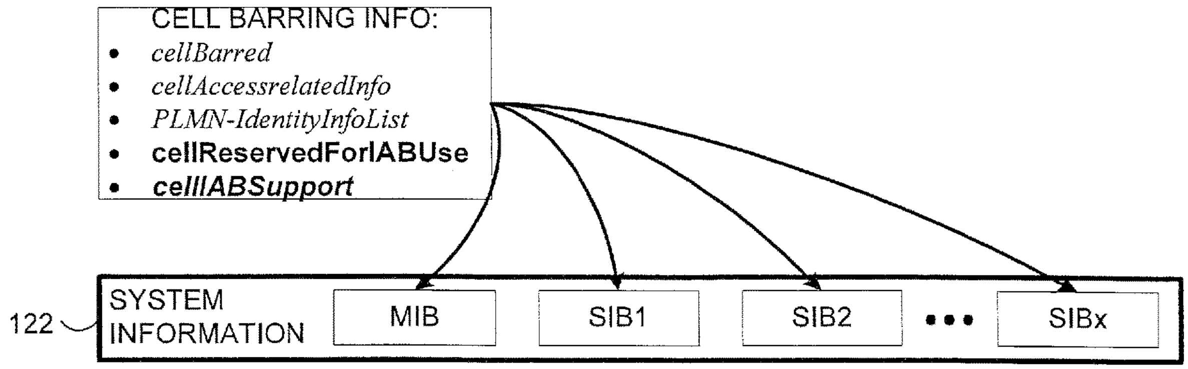
FIG. 15 is a diagrammatic view showing an example embodiment and mode in which the cell barring information may be transmitted in one or more system information blocks and in which an information element such as cellReservedForIABUse may be included.

Embodiment 2-3 is a sub-embodiment of Embodiment 2, and in a sense is logically equivalent to sub-embodiment 2-1 and sub-embodiment 2-2. Elements and functionalities of the nodes and terminals of sub-embodiment 2-2 are essentially the same as those of FIGS. 8 and 10 unless otherwise specified or otherwise clear from the context. However, the sub-embodiment 2-2 employs in the cell barring information a set of parameters different from the cellBarredIAB of sub-embodiment 2-1 or the solitary use of cellIABSupport of sub-embodiment 2-2. In particular, sub-embodiment 2-3 employs in the cell barring information a field or information element which indicates that the cell is reserved for IAB-nodes. That is, in addition to the field cellBarred (disclosed, e.g., in Listing 1 and Table 5), the sub-embodiment 2-3 may employ two fields or information elements cellReservedForIABUse and cellIABSupport shown in Table 12. Inclusion and use of the two fields cellReservedForIABUse and cellIABSupport is illustrated in FIG. 15.

TABLE 12

| INFORMATION ELEMENTS: RESERVATION FOR IAB USE |
|---|
| cellReservedForIABUse ENUMERATED {true} OPTIONAL, -- Need R<br>cellIABSupport ENUMERATED (supported, notSupported),<br>- cellReservedForIABUse (IE type: "true")<br>Indicated in SIB1 message. In case of multiple PLMNs indicated in SIB1, this field is common for all PLMNs.<br>This field indicates if the cell is reserved for IAB-nodes.<br>- cellIABSupport (IE type: "supported" or "not supported")<br>This field indicates if the cell supports IAB relaying functionality.<br>This field is ignored by UEs. |

The field cellReservedForIABUse may indicate that the cell is reserved for IAB-nodes, e.g., that only IAB-nodes are allowed to camp. In one example configuration, this field cellReservedForIABUse is identical to cellReservedForOtherUse disclosed on Embodiment 1. In another example configuration, this field cellReservedForIABUse is a separate field. The field cellIABSupport is the field disclosed in Embodiment 2-2. Similar to the previous embodiments, each of these fields of sub-embodiment 2-3 may be included in one or more of the system information blocks (MIB, SIB1, or other SIB(s)), as depicted by way of example in FIG. 15.

In sub-embodiment 2-3, the information element cellBarred in MIB may apply to both UEs 30 and IAB-nodes 24. That is, if cellBarred=barred, camping is barred for UEs 30 as well as IAB-nodes 24. Otherwise, the UEs/IAB-nodes may proceed to examining cellReservedForIABUse. If cellReservedForIABUse is true, the cell is reserved for IAB-nodes and therefore the UE 30 may treat this cell as if it is barred, while the relay node mobile termination unit 60 of the IAB-node 24 may consider this cell as a candidate. The information element cellReservedForIABUse being "true" may also means that the cell supports the IAB relaying functionality and thus the field cellIABSupport may not be present (absent or omitted). If cellReservedForIABUse is "false" or not present, then the UE 30 may consider the cell as a candidate while the MT of the IAB-node may further examine cellIABSupport and consider the cell as a candidate only when cellIABSupport="supported", otherwise it may treat the cell as if it is barred.

Subject to the more detailed description provided above, the acts of FIG. 12 for the parent node 22 of FIG. 10 are executed for the parent node 22 of this sub-embodiment 2-3, and likewise the acts of FIG. 13 for the wireless terminal(s) of FIG. 10 are applicable and executed for the wireless terminal(s) of the this sub-embodiment 2-3, it being understood that the barring and/or candidacy of the wireless terminal may be determined for IAB-relay node 24 with reference to cellReservedForIABUse and cellIABSupport of the sub-embodiment 2-3.

Thus, in an example configuration for the sub-embodiment 2-3, the barring modes (1) to (4) of Table 7 may be achieved in the example manner of Table 13.

TABLE 13

| CELL BARRING MODES: THIRD EXAMPLE IMPLEMENTATION |
|---|
| Barring mode 1: cellBarred = notBarred,<br>celllReservedForIABUse = not present, cellIAB Support = supported<br>Barring mode 2: cellBarred = notBarred,<br>celllReservedForIABUse = not present. cellIABSupport = notSupported<br>Barring mode 3: cellBarred = notBarred,<br>celllReservedForIABUse = true,<br>cellIABSupport = supported (optionally present)<br>Barring mode 4: cellBarred = Barred |

Embodiment 3

Figure 16:
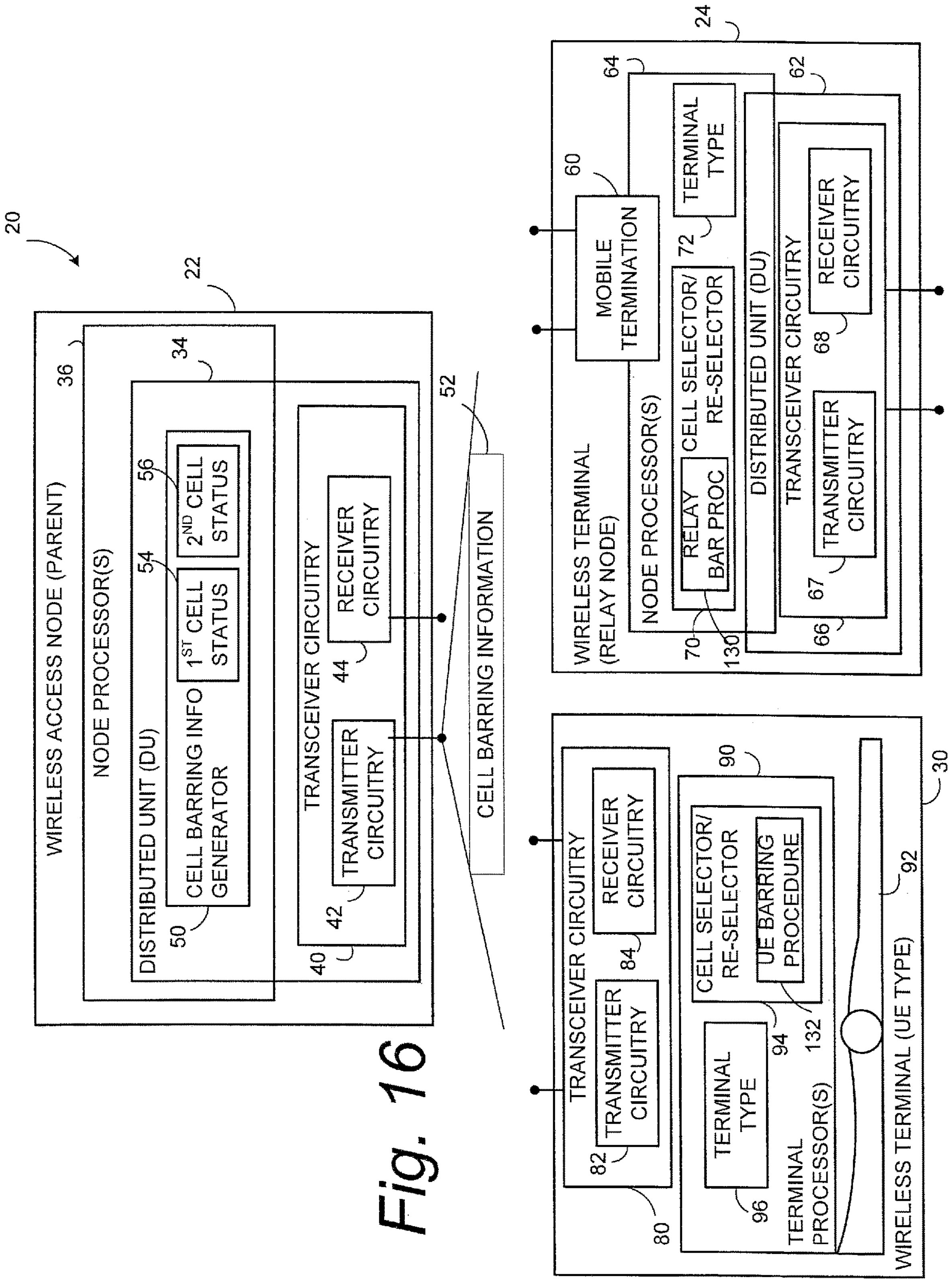
FIG. 16 is a schematic view of a wireless relay network which in which an IAB-relay node and a user equipment may execute different standard barring procedures.

FIG. 16 shows an example wireless relay network 20 including parent node 22, IAB-relay node 24, and user equipment 30 as shown in FIG. 8 and FIG. 10. Elements and functionalities of the nodes and terminals of FIG. 16 are essentially the same as those of FIG. 8 and FIG. 10 unless otherwise specified or otherwise clear from the context. In the example embodiment and mode of FIG. 16, unlike the example embodiment and mode of FIG. 9, the IAB-relay node 24 and the user equipment 30 perform different cell barring procedures, or perform an essentially same cell barring procedure in a different manner for at least some different effect.

For example, in embodiment 3 and the system of FIG. 16, the relay node mobile termination unit 60 of an IAB-node 24 may perform the procedure for a "barred" cell in a manner distinct from a UE performing the procedure for a "barred" cell. To this end, FIG. 16 shows relay node mobile termination unit 60 of IAB-relay node 24, which may include relay node processor(s) 64 and cell selector/re-selector 70, as performing relay barring procedure 130 which may bar the IAB-relay node 24 from the cell, while the cell selector/re-selector 94 of user equipment 30 performs a different cell barring procedure, e.g., UE barring procedure 132, which may bar the user equipment 30 from the cell. As used herein, a "different" cell barring procedure may be the same cell barring procedure but implemented differently at different types of wireless terminals.

For example, Listing 1 of Table 5 specifies that the UE 30 shall exclude the barred cell as a candidate for cell selection/reselection for 300 seconds. While this may still apply to UEs 30 in executing the UE barring procedure 132, the relay node mobile termination unit 60 of the IAB-node 24 may use a different time duration (other than 300 seconds) for the exclusion of the barred cell as a candidate when executing the relay barring procedure 130. The different time duration may be shorter or longer than 300 seconds, or may be infinity (permanently barred). The different time duration may be pre-configured, configured by network via dedicated signaling or configured by broadcast via system information (MIB, SIB1 or other SIB(s)). Other examples may include treating the cell as if intraFreqReselection=allowed (or not allowed) regardless of its value in MIB.

Features of this Embodiment 3 may be combined with features of other example embodiments and modes described herein. For example, the operation and mode of embodiment 3 may be applied to Embodiment 2-1, Embodiment 2-2, and/or Embodiment 2-3.

Embodiment 4

Figure 17:
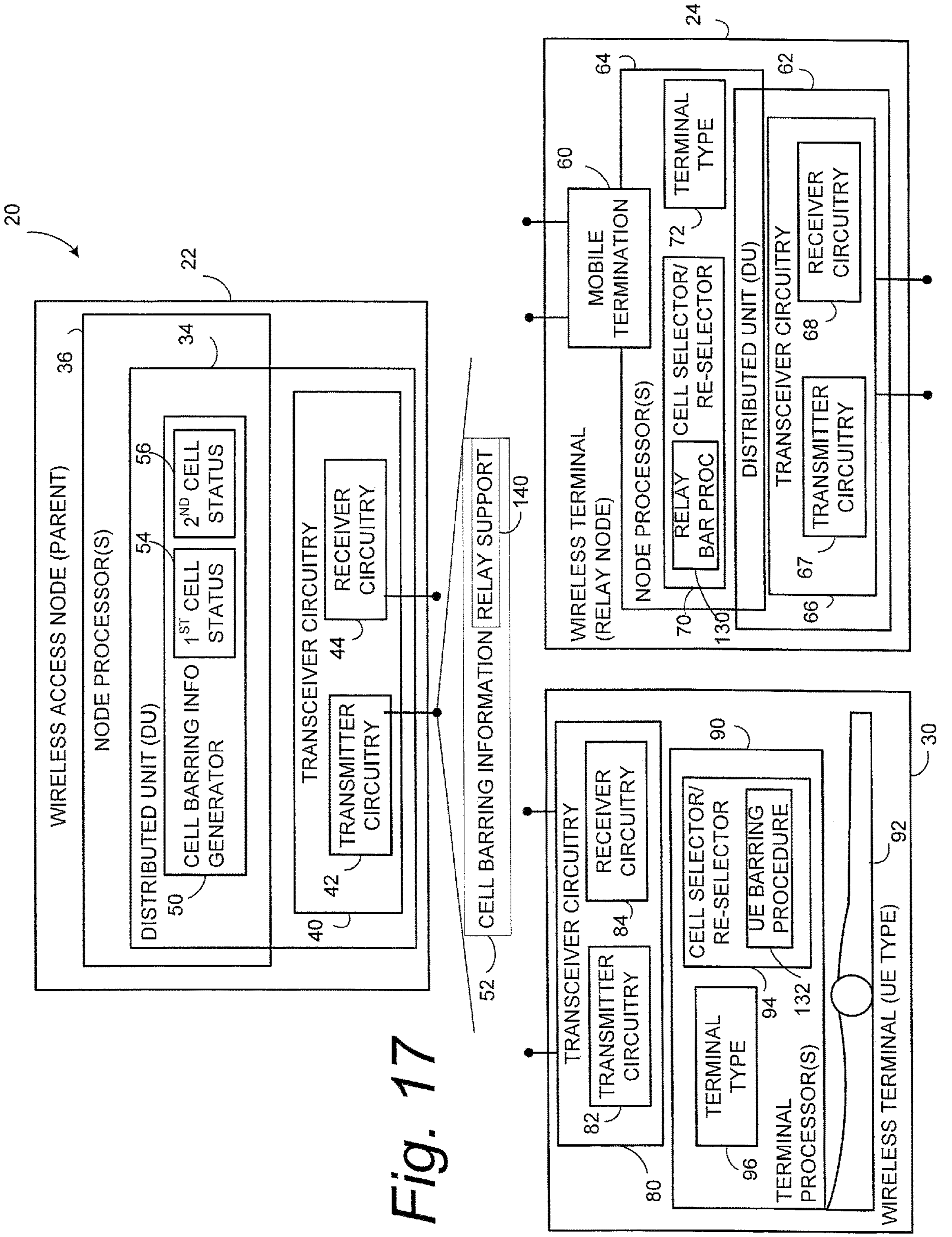
FIG. 17 is a schematic view of a wireless relay network which in which cell barring information may include a field indicating whether the cell supports relaying functionality required by a wireless terminal.

FIG. 17 shows an example wireless relay network 20 including parent node 22, IAB-relay node 24, and user equipment 30 as shown in FIG. 8 and FIG. 10. Elements and functionalities of the nodes and terminals of FIG. 16 are essentially the same as those of the figures of previously described example embodiments and modes unless otherwise specified or otherwise clear from the context. In the example embodiment and mode of FIG. 17, the cell barring information may include a field indicating whether the cell is currently supporting relaying functionality required by a wireless terminal. For example, FIG. 17 shows the cell barring information 52 comprises relay support field or information element 140. The relay support field 140 may be generated by the cell barring information generator 50 as is other cell barring information.

In embodiment and FIG. 17, the parent IAB node 22 may broadcast information, in addition to the fields previously disclosed in the previous example embodiments and modes, to indicate IAB service availability information. In some configurations, the IAB service availability information may reflect the parent node's connectivity to an IAB-donor through one or more wireless backhaul links, and thus may vary temporarily. As one exemplary implementation, the system information (in MIB, SIB1, or other SIB(s)) may include the field or information element cellServiceAvailable shown and described in Table 14

TABLE 14

| cellServiceAvailable INFORMATION ELEMENT | |
|---|---|
| cellServiceAvailable | ENUMERATED {available, notAvailable}, |

If the field cellServiceAvailable indicates that the IAB service is available, the UE 30 or the relay node mobile termination unit 60 of an IAB-node 24 may follow one or some of the previously disclosed embodiments. If the field cellServiceAvailable indicates the IAB service is not available, in one configuration the UE 30 or the relay node mobile termination unit 60 of an IAB-node 24 may treat this cell as if it is barred. In this case, similar to the operation and mode disclosed in Embodiment 2-3, the UE 30 or the relay node mobile termination unit 60 of the IAB-node 24 may apply a different time duration for barring (typically a shorter duration). In another configuration, if the IAB service is not available, the UE 30 or the relay node mobile termination unit 60 of the IAB-node IAB-relay node 24 may consider this cell as a candidate with a lower priority and may camp on this cell only when it is not able to find other higher priority cells.

Thus, in Embodiment 4, the cell barring information may comprise first status, second status and third status. The first status may represent cell barring status commonly applied to the wireless terminal of any terminal type, such as the information element cellBarred. The second status may indicate whether or not the cell is reserved for the wireless terminal of the terminal type being a relay node, such as (for one example) cellBarredIAB or cellIABSupport. The third status may indicate whether the cell supports relaying functionality required by the wireless terminal of the terminal type being a relay node, e.g., cellServiceAvailable which herein is also known as relay support field 140.

Embodiment 5

In some wireless relay networks a node serving a cell may notify terminals camping on the cell upon a change in the content of the system information in the cell (available on BCCH). This act is also referred as system information change notification. For example, as specified in 3GPP TS 36.331, in the LTE radio access network utilizes Paging Message for the notification. As another example, as specified in 3GPP TS 38.331, the 5G radio access network broadcasts Short Message on Physical Downlink Control Channel (PDCCH). The Short Message of 3GPP TS 38.331 is formatted as shown in Table 15

TABLE 15

3GPP TS 38.331 Short messages on PDCCH

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-[8] | Not used in this release of the specification, and shall be ignored by UE if received. |

As explained above, in some configurations of the IAB-based relay network, the system information may comprise fields, parameters, information elements and/or SIBs dedicated for IAB-nodes. "Dedicated" to IAB-nodes means not used by UEs 30, e.g., by UE-type wireless terminal s). The fields, cellBarredIAB, cellIABSupport, cellIReservedForIABUse or cellServiceAvailable, disclosed in the aforementioned embodiments respectively indicate information regarding cell barring, cell reservation, IAB support, and IAB service availability, and are examples of such fields that are dedicated for IAB nodes and which may be included in transmitted system information. If the node serving the cell were to broadcast the system information change notification due to a change made on such a field to all wireless terminals in the cell, it would result in unnecessary system information acquisition by UE-type terminals 30 since the operation of UE-type terminals 30 is essentially impervious to such fields.

Accordingly, embodiment 5 includes several sub-embodiments of wireless relay networks 20 in which transmission of system information change notifications are governed in accordance with pertinence to IAB-node information, e.g., whether and to what extent the system information change involves a system information dedicated to IAB-type nodes. It should be understood that the operation and mode disclosed in the sub-embodiments of embodiment 5 may be applicable not only to the case where Short Message is used for broadcasting system information change notifications, but also to the case where Paging Message, or any other message is used.

Embodiment 5-1

Figure 18:
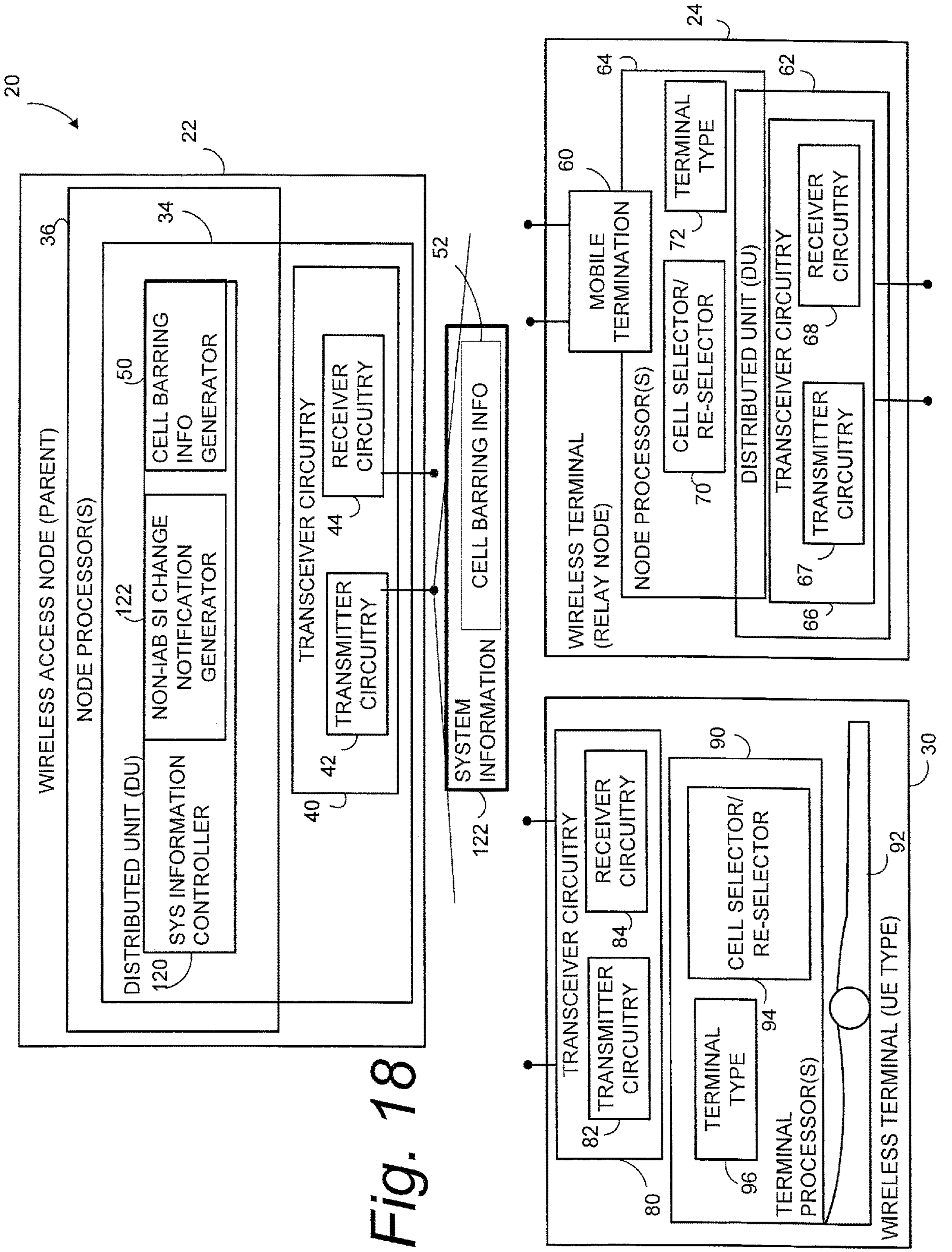
FIG. 18 is a schematic view of a wireless relay network which in an access node does not send out a system information change notification when changed system information involves system information dedicated to an IAB relay type node.

FIG. 18 shows another example wireless relay network 20 including parent node 22, IAB-relay node 24, and user equipment 30 as shown in FIG. 8 and FIG. 10, for example. Elements and functionalities of the nodes and terminals of FIG. 18 are essentially the same as those of the figures of previously described example embodiments and modes unless otherwise specified or otherwise clear from the context.

In Embodiment 5-1, a change made on the fields, parameters, information elements and/or SIBs dedicated for IAB-nodes may not result in system information change notification. For instance, upon changing the value of cellBarredIABI, cellIABSupport, cellIReservedForIABUse or cellServiceAvailable, the node serving the cell may suppress, e.g., not transmit, broadcast of the Short Message. In this regard, for the example wireless relay network 20 of FIG. 18, the system information controller 120 of parent node 22 further includes or works in conjunction with a system information change notification generator 122. When the system information controller 120 determines that the system information to be broadcast from parent node 22 is to be changed, the system information controller 120 generally causes system information change notification generator 122 to generate a system information change notification to alert or inform wireless terminals in the cell served by parent node 22 of the impending or actual change. The system information change notification typically takes the form of an indication other than system information, such as a message or indication on a control channel, such as PDCCH, for example. However, in Embodiment 5-1, if the detected change in system information involves IAB-node dedicated system information, the system information controller 120 overrules or negates any generation of a system information change notification by system information change notification generator 122, or overrules or negates transmission of any system information change notification generated by system information change notification generator 122. Therefore, the system information change notification generator 122 is shown as being a non-IAB system information change notification generator 122, since only system information change notifications which do not involve IAB-node specific system information changes may be transmitted by parent node 22.

Although not shown as such, the system information controller 120 may also include the first cell status information 54 and second cell status information 56 as shown, for example, in FIG. 8 and FIG. 10.

Thus, the transmitter circuitry 42 of parent node 22 of Embodiment 5-1 and FIG. 18 is configured to transmit, to the wireless terminal, system information and a notification message, the notification message indicating that a change is made on the content of the system information. However, in a case that the system information comprises information dedicated to the wireless terminal of the terminal type being a relay node and a change is made on the information dedicated to the wireless terminal of the terminal type being a relay node, the change does not result in the transmitter circuitry transmitting the notification message.

Figure 19:
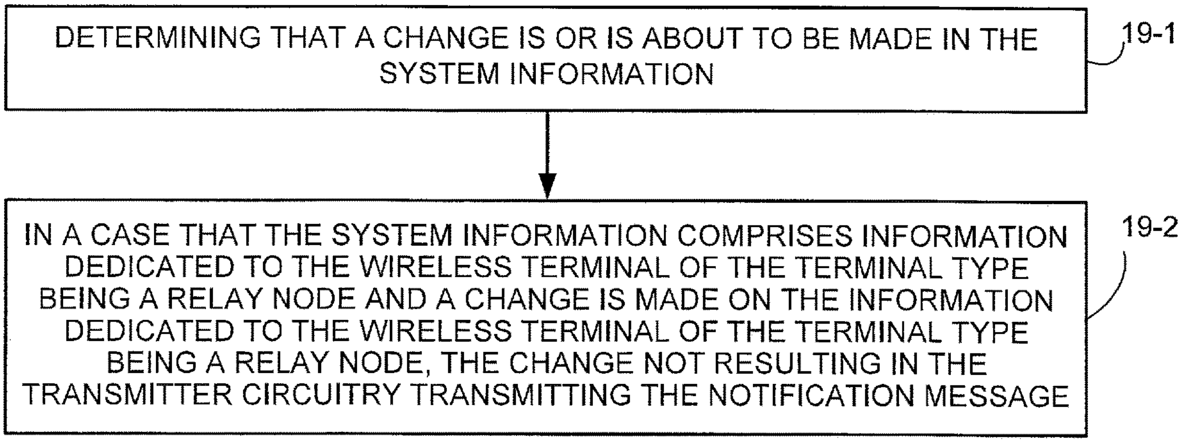
FIG. 19 is a flowchart showing example, basic, representative steps or acts performed by a parent node of FIG. 18.

FIG. 19 illustrates example, representative acts or steps performed by the parent node 22 of FIG. 18 for example Embodiment 5-1. Act 19-1 comprises the system information controller 120 determining that a change is or is about to be made in the system information transmitted from the parent node 22. Act 19-2 comprises, in a case that the system information comprises information dedicated to the wireless terminal of the terminal type being a relay node and a change is made on the information dedicated to the wireless terminal of the terminal type being a relay node, the change not resulting in the transmitter circuitry transmitting the notification message.

Embodiment 5-2

Figure 20:
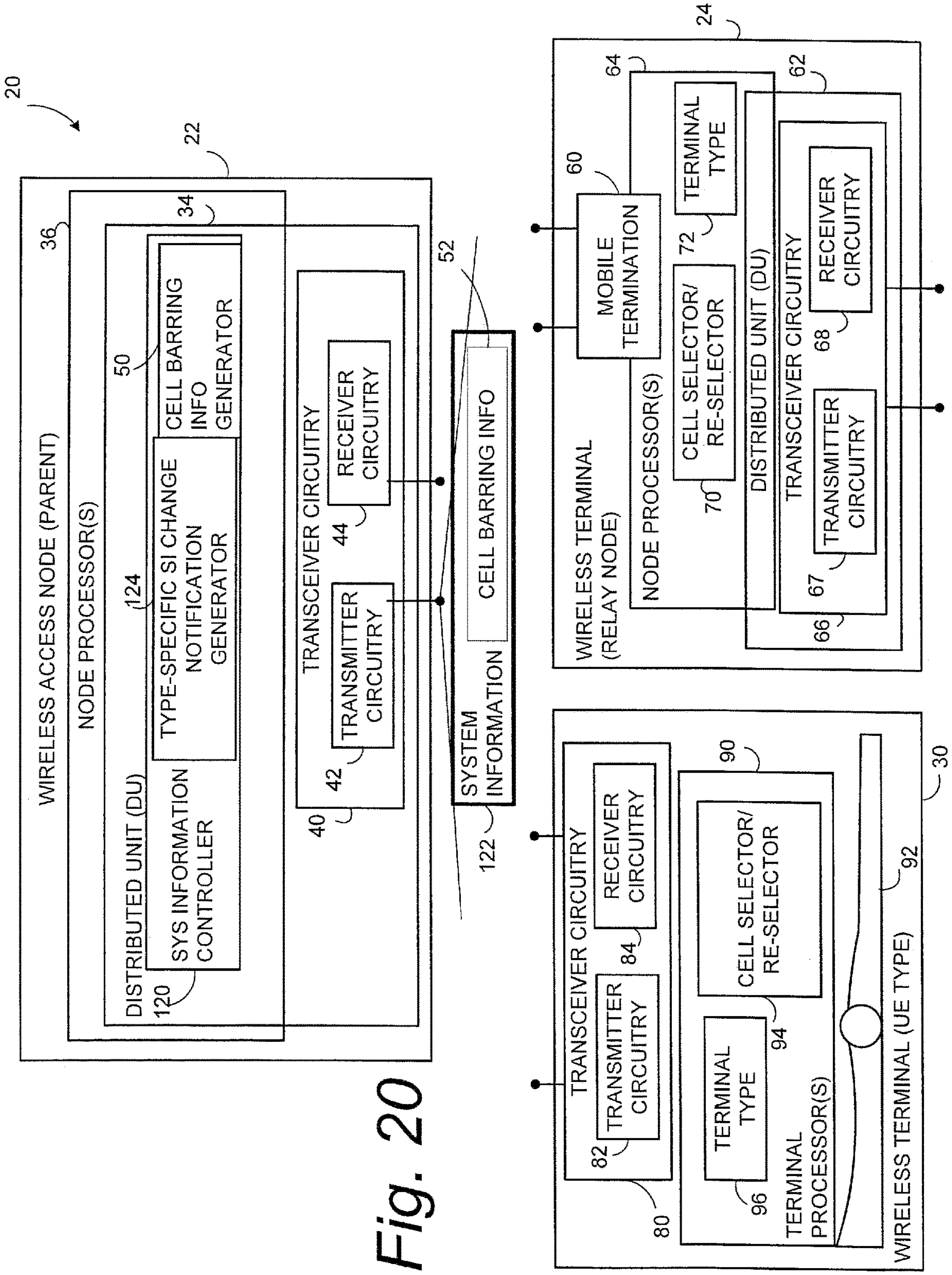
FIG. 20 is a schematic view of a wireless relay network which in an access node may include in a system information change notification a designated information element which may be used to notify a change in the system information relevant to a specific type of terminal.

FIG. 20 shows another example wireless relay network 20 including parent node 22, IAB-relay node 24, and user equipment 30 as shown in FIG. 8 and FIG. 10, for example. Elements and functionalities of the nodes and terminals of FIG. 20 are essentially the same as those of the figures of previously described example embodiments and modes unless otherwise specified or otherwise clear from the context.

In example Embodiment 5-2 and FIG. 20, either alternatively, or additionally, a designated information element in the notification may be used to notify a change in the system information relevant to a specific type of terminal. For this purpose, the system information controller 120 of FIG. 20 is shown as comprising type-specific system information change notification generator 124. For example, in example embodiment 5-2 and the system of FIG. 20, one or more bits in the Short Message disclosed in Table 15 may indicate a change on the system information relevant only to the relay node mobile termination unit 60 of an IAB-node 24. Table 16 shows an example implementation of such type-specific system information change notification.

TABLE 16

Short messages with Type-Specific SI Change Notification

| Bit | Short message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | systemInfoModificationForIAB<br>If set to 1: indication of a BCCH modification relevant to MT of IAB nodes. |
| 4-[8] | Not used in this release of the specification, and shall be ignored by UE if received. |

Thus, the example embodiment 5-2 and FIG. 20 encompasses an access node which comprises transmitter circuitry configured to transmit, to the wireless terminal, system information and a notification message, wherein the notification message indicates a change is made on the content of the system information. In a case that the system information comprises information dedicated to the wireless terminal of the terminal type being a relay node, the notification message is further used to indicate whether or not a change is made on the information dedicated to the wireless terminal of the terminal type being a relay node. Such an indication may be provided by bit 3 of the short message of Table 16, for example.

For the example embodiment 5-2, both user equipment 30 and IAB-relay node 24 receive the short message of Table 16, e.g., in a physical downlink control channel (PDCCH) message. The user equipment 30, which is not concerned with changes in system information that affect only IAB wireless terminals, e.g., not concerned with IAB-dedicated system information, need only look at bit 1 and bit 2 in order to ascertain whether the system information change notification affects the user equipment 30. Thus, for the example embodiment 5-2 the system information may comprise one or more first system information blocks (SIBs) and the notification message may comprise one or more first bits, such as bit 1 and bit 2 of Table 16. Each of such first bits may be associated with a first SIB or a group of first SIBs, and each of the first bits may indicate whether or not a change is made on the associated first SIB(s).

An IAB-relay node 24, on the other hand, should look at least at bit 3 of the short message of Table 16 in order to determine if the system information change notification is relevant for IAB-relay node type wireless terminals. In other words, when the information dedicated to the wireless terminal of the terminal type being a relay node comprises one or more information elements included in one or more first SIBs, the notification message may further comprises at least one second bit, such as bit 3 of Table 16, which indicates that a change is made on the one or more information elements included in one or more first SIBs.

Figure 21:
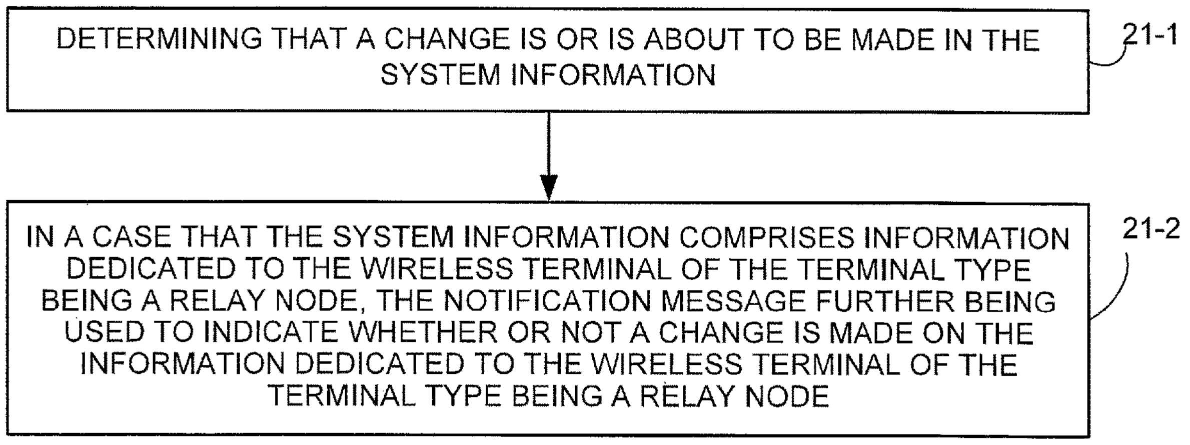
FIG. 21 is a flowchart showing example, basic, representative steps or acts performed by a parent node of FIG. 20.

FIG. 21 illustrates example, representative acts or steps performed by the parent node 22 of FIG. 20 for example Embodiment 5-2. Act 21-1 comprises the system information controller 120 determining that a change is or is about to be made in the system information transmitted from the parent node 22. Act 20-2 comprises, in a case that the system information comprises information dedicated to the wireless terminal of the terminal type being a relay node, the notification message further being used to indicate whether or not a change is made on the information dedicated to the wireless terminal of the terminal type being a relay node.

In one example implementation or configuration of embodiment 5-2 and FIG. 20, at least one bit in the Short Message, e.g. bit 3 of Table 16, may indicate changes on specific IAB-related fields, parameters and/or information elements included in one or more SIBs. Such specific IAB-related fields, parameters and/or information elements may include, for example, the aforementioned fields cellBarredIAB, cellIABSupport, cellIReservedForIABUse or cellServiceAvailable. The specific IAB-related fields, parameters and/or information elements included in one or more SIBs that are affected by or involved in a system information change notified by bit 3 may be pre-defined or pre-configured. For example, it may be pre-defined in the wireless terminal that bit 3 indicating a change in system information means a change in a particular one of the above-mentioned IAB-related fields.

In another implementation or configuration of embodiment 5-2 and FIG. 20, one or more SIBs may be dedicated for IAB. IAB-dedicated SIBs may herein be known as "second SIBs", which are in contrast to "first SIB(s)" which are not dedicated to IAB. In such example implementation, one or more bits of the short message of Table 16 may indicate changes on the content of such IAB-dedicated SIBs. In an example implementation, various bits of the short message of Table 16 may be associated with one or more SIBs dedicated for IAB, indicating a change on the associated SIBs. For example, a new such as bit 4 may indicate that a first group of one or more IAB-dedicated SIBs are affected by a system information change; another new bit such as bit 5 may indicate that a second group of one or more IAB-dedicated SIBs are affected by a system information change; and so forth. The particular IAB-dedicated SIBs comprising each such group or associated with each bit of the short message of Table 16 may be pre-configured at the IAB-relay node 24 or configured by the network.

Thus, it should be understood that the system information comprises one or more second SIBs dedicated to the wireless terminal of the terminal type being a relay node including at least a part of the information dedicated to the wireless terminal of the terminal type being a relay node, and the notification message may comprise one or more third bits, each of the third bits being associated with the one or more second SIBs dedicated to the wireless terminal of the terminal type being a relay node, each of the third bits indicating whether or not a change is made on the associated second SIBs.

Again, although not shown as such, the system information controller 120 may also include the first cell status information 54 and second cell status information 56 as shown, for example, in FIG. 8 and FIG. 10.

Embodiment 5-3

Figure 22:
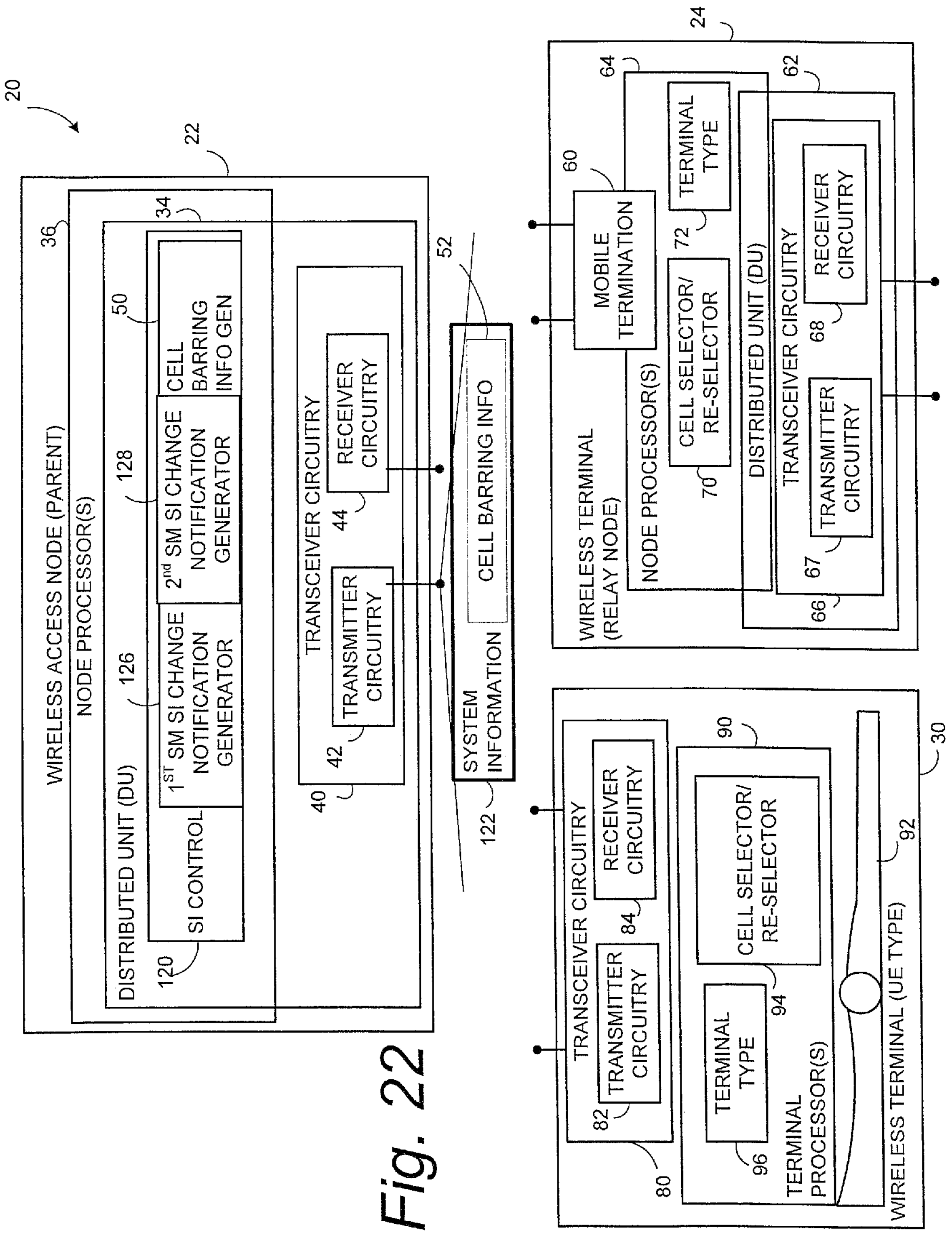
FIG. 22 is a schematic view of a wireless relay network which in an access node may include in system information change notification including both a first system information change notification and a second system information change notification.

FIG. 22 shows another example wireless relay network 20 including parent node 22, IAB-relay node 24, and user equipment 30 as shown in FIG. 8 and FIG. 10, for example. Elements and functionalities of the nodes and terminals of FIG. 22 are essentially the same as those of the figures of previously described example embodiments and modes unless otherwise specified or otherwise clear from the context.

In example Embodiment 5-3 and FIG. 22, additionally, or alternatively, the notification of a change on the IAB-related fields, parameters, information elements and/or the SIBs dedicated for IAB may be carried in a second notification message transmitted separately (independently) from the aforementioned notification message, e.g., in addition to the Short Message of Table 16. The Short Message of Table 16 may now be referred to as a "first notification message". The wireless relay network 20 of FIG. 22 shows system information controller 120 as thus comprising a first short message (SM) system information change notification generator 126 and a second short message (SM) system information change notification generator 128. The second short message system information change notification generated by second short message system information change notification generator 128 may be transmitted on one or more of the downlink physical channels, which may be in the same or in a different physical channel that the first notification message (generated by first short message system information change notification generator 126) may use.

In one example configuration or implementation, the second notification message generated by second short message system information change notification generator 128 may be received by the relay node mobile termination unit 60 of the IAB-node 24 and may be ignored by the UE 30.

In some example configurations or implementations, the first notification massage generated by first short message system information change notification generator 126 may be used to notify a change made on information (fields, parameters, information elements and/or SIBs) in the system information common for UEs and IAB-nodes, whereas the second notification message generated by second short message system information change notification generator 128 may be used to notify a change made on information in the system information dedicated to IAB-nodes. Upon receiving the first notification message, the UE or the relay node mobile termination unit 60 of the IAB-node 24 may attempt to reacquire the affected (changed) SIBs indicated by the first notification message. Meanwhile, only the relay node mobile termination unit 60 of the IAB-node 24 may receive the second notification message and may attempt to reacquire the affected (changed) SIBs indicated by the second notification message.

It should thus be understood that the parent node 22 of FIG. 22 comprises a transmitter circuitry configured to transmit, to the wireless terminal, system information and a system information change notification. The system information comprises first information and second information, the first information being used for the wireless terminal of any terminal type, the second information being dedicated to the wireless terminal of the terminal type being a relay node. Further, in the example embodiment 5-3 and system of FIG. 22 the system information change notification comprises a first notification message and a second notification message. The first notification message is used to indicate a change made on the first information; the second notification message is used to indicate a change made on the second information.

Both the user equipment 30 and IAB-relay node 24 of the example embodiment 5-3 and of FIG. 22 comprise receiver circuitry configured to receive, from an access node, system information and a system information change notification. The receiver circuitry of IAB-relay node 24 may comprise relay node mobile termination unit 60; the receiver circuitry of user equipment 30 may comprise terminal receiver circuitry 84. The system information comprises first information and second information. The first information is used for the wireless terminal of any terminal type; the second information is dedicated to the wireless terminal of the terminal type being a relay node. A system information change notification received by the receiver circuitry may comprise a first notification message, which was generated by first short message system information change notification generator 126, or a second notification message, which was generated by second short message system information change notification generator 128. The first notification message is used to indicate a change made on the first information; the second notification message is used to indicate a change made on the second information. The processor of the receiving wireless terminal, the terminal processor(s) 90 of user equipment 30 or the relay node processor(s) 64 of TAB-relay node 24, may then use the respective first short message system information change notification or the second short message system information change notification to prepare for reception of the system information which includes the changed system information to which the wireless terminal was alerted by the respective system information change notification message, and then to receive the changed system information.

Figure 23:
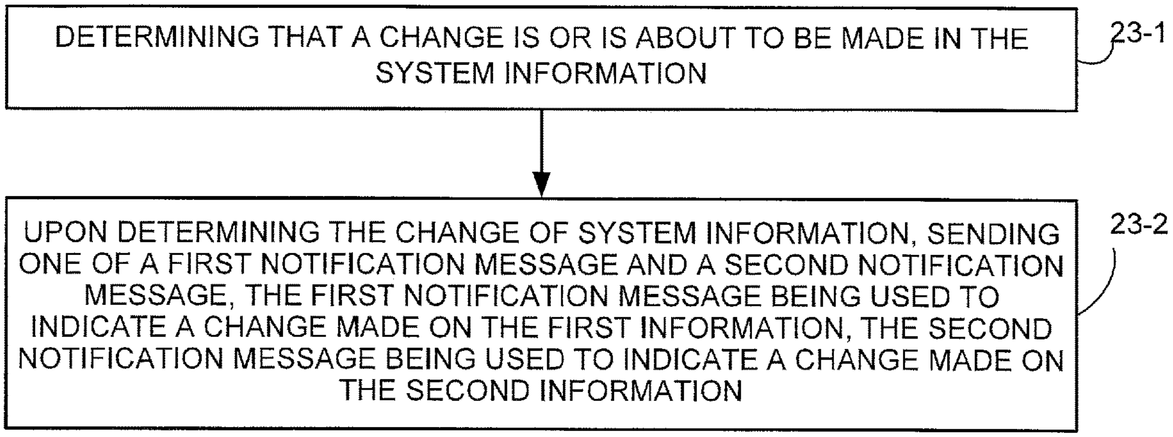
FIG. 23 is a flowchart showing example, basic, representative steps or acts performed by a parent node of FIG. 22.

FIG. 23 illustrates example, representative acts or steps performed by the parent node 22 of FIG. 22 for example Embodiment 5-3. As understood from the foregoing, the parent node 22 of FIG. 22 is capable of generating system information and a system information change notification. The system information comprising first information and second information, the first information being used for the wireless terminal of any terminal type, the second information being dedicated to the wireless terminal of the terminal type being a relay node. Act 23-1 comprises the system information controller 120 determining that a change is or is about to be made in the system information transmitted from the parent node 22. Act 23-2 comprises, upon determining the change of system information, sending one of a first notification message and a second notification message, the first notification message being used to indicate a change made on the first information, the second notification message being used to indicate a change made on the second information.

Figure 24:
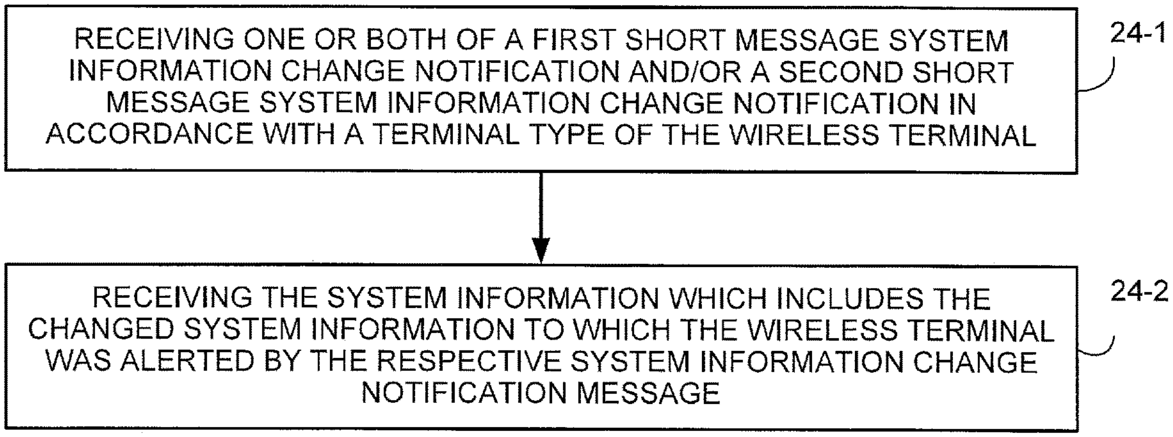
FIG. 24 is a flowchart showing example, basic, representative steps or acts performed by a wireless terminal of FIG. 22.

FIG. 24 illustrates example, representative acts or steps performed by a wireless terminal, e.g., either user equipment 30 or TAB-relay node 24, of FIG. 24 for example Embodiment 5-3. Act 24-1 comprises receiving one or both of a first short message system information change notification and/or a second short message system information change notification in accordance with a terminal type of the wireless terminal. A user equipment 30 type wireless terminal may receive only a first short message system information change notification (generated by first short message system information change notification generator 126 of parent node 22); whereas a TAB-relay node 24 may receive either the first short message system information change notification (generated by first short message system information change notification generator 126) or a second short message system information change notification (generated by second short message system information change notification generator 128). Act 24-2 comprises receiving the system information which includes the changed system information to which the wireless terminal was alerted by the respective system information change notification message.

Again, although not shown as such, the system information controller 120 may also include the first cell status information 54 and second cell status information 56 as shown, for example, in FIG. 8 and FIG. 10.

Embodiment 6

In a case that a parent IAB-node detects a radio link failure (RLF) on its upstream link (towards an IAB-donor) and fails to recover the RLF, such RLF-detecting parent IAB-node may send a backhaul (BH) RLF indication to downstream child IAB-nodes/UEs. The BH RLF indication may be transmitted on Backhaul Adaptation Protocol (BAP), per 3GPP TS 38.340, physical layer signaling, Medium Access Control (MAC), or any other protocol layer. In this situation, additionally or alternatively, the parent node may set cell barring status to "barred" for the cell(s) served by the parent node, in order to prevent child IAB-nodes/UEs from camping on the affected cell(s).

A change of barring status may be reflected in a change in system information, which may need to be informed to child IAB-nodes/UEs. Table 17-1 is a listing or description of an example operation for system information updates, per 3GPP TS 38.300 and TS 38.331.

TABLE 17-1

| EXAMPLE OPERATION FOR SYSTEM INFORMATION UPDATES |
|---|
| Change of system information (e.g. MIB, SIB1 or other SIBs except SIBs related to Earthquake and Tsunami Warning System (ETWS) and Commercial Mobile Alert Service (CMAS), such as SIB6, SIB7 and SIB8) may only occur at specific radio frames. Herein, the beginning of such a specific radio frame is referred as a modification period boundary, and a time period between two adjacent modification period boundaries is referred as a modification period. System information may be transmitted a number of times with the same content within a modification period, as defined by its scheduling. The modification period is configured by system information. |
| When the network changes (some of the) system information, it may first notify the UEs about this change, i.e. this may be done throughout a modification period. In the next modification period, the network may transmit the updated system information. Upon receiving a change notification, the UE may acquire the new system information from the start of the next modification period. The UE may apply the previously acquired system information until the UE acquires the new system information. |
| The modification period boundaries may be defined by System Frame Number (SFN) values for which SFN mod m = 0, where m is the number of radio frames comprising the modification period. The modification period is configured by system information (e.g. SIB1). The UE may receive indications about SI modifications and/or PWS notifications using Short Message transmitted with P-RNTI over DCI. Repetitions of SI change indication may occur within preceding modification period. |

TABLE 17-1-continued

| EXAMPLE OPERATION FOR SYSTEM INFORMATION UPDATES |
|---|
| UEs in RRC_IDLE or in RRC_INACTIVE may monitor for SI change indication in its own<br>paging occasion every discontinuous reception (DRX) cycle. UEs in RRC_CONNECTED may monitor for SI change indication in any paging occasion at least once per modification<br>period if the UE is provided with common search space on the active bandwidth part (BWP) to monitor paging.<br>ETWS or CMAS capable UEs in RRC_IDLE or in RRC_INACTIVE may monitor for indications about PWS notification in its own paging occasion every DRX cycle. ETWS or<br>CMAS capable UEs in RRC_CONNECTED may monitor for indication about PWS notification in any paging occasion at least once every default paging cycle if the UE is provided with common search space on the active BWP to monitor paging.<br>For Short Message reception in a paging occasion, the UE monitors the PDCCH monitoring occasion(s) for paging.<br>If the UE receives a Short Message, the UE may:<br>1> if the UE is ETWS capable or CMAS capable, the etwsAndCmasIndication bit of Short<br>Message is set, and the UE is provided with searchSpaceOtherSystemInformation on the active BWP:<br>2> immediately re-acquire the SIB1;<br>2> if the UE is ETWS capable and si-SchedulingInfo includes scheduling information for<br>SIB6:<br>3> acquire SIB6 immediately;<br>2> if the UE is ETWS capable and si-SchedulingInfo includes scheduling information for<br>SIB7:<br>3> acquire SIB7 immediately;<br>2> if the UE is CMAS capable and si-SchedulingInfo includes scheduling information for<br>SIB8:<br>3> acquire SIB8 immediately;<br>1> if the systemInfoModification bit of Short Message is set:<br>2> apply the SI acquisition procedure (to acquire MIB, SIB1 and/or other SIB(s) except<br>SIB6, SIB7 and SIB8) from the start of the next modification period. |

Figure 25:
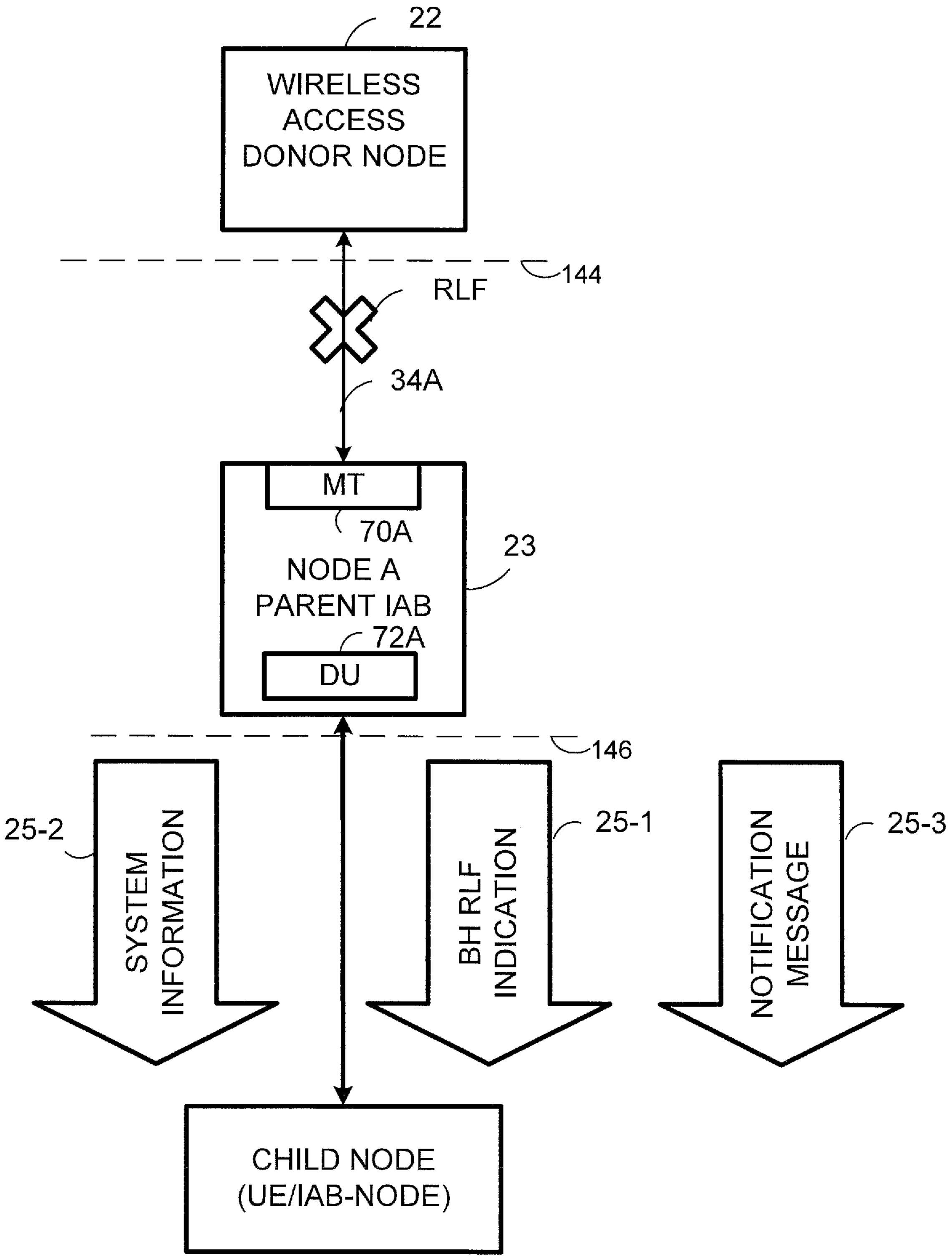
FIG. 25 is a diagrammatic view showing an example situation wherein a parent node, Node A or IAB parent node 23, fails to recover from a radio link failure (RLF).

FIG. 25 shows an example situation wherein a parent node, Node A or IAB parent node 23, fails to recover from a radio link failure (RLF). FIG. 25 shows the radio link failure (RLF) as occurring over a first radio interface 144 between IAB parent node 23 and donor IAB node 22. However, the radio link failure (RLF) may occur on a link that is upstream from IAB parent node 23 and between IAB parent node 23 and the donor node 22. As shown by arrow 25-2, IAB parent node 23 may transmit the BH RLF indication to a Child Node, the Child node being connected with Donor node 22 via IAB parent node 23. The child node may be another IAB node or a UE. Before, after, or upon transmitting the BH RLF indication, IAB parent node 23 may change the cell barring status in the system information that is broadcasted by IAB parent node 23. For example, IAB parent node 23 may change the aforementioned “cellBarred” information element in MIB to “barred”. IAB parent node 23 Node A may also change other related indication(s), such as cellIABSupport to “notSupported”. Arrow 25-2 in FIG. 25 shows IAB parent node 23 sending the system information with the changed cell barring status to the child node. FIG. 25 further shows that all of the BH RLF indication, the system information, and the notification over a second radio interface 146 between IAB parent node 23 and the child node.

When IAB parent node 23 changes such cell barring status, as shown by arrow 25-3 the IAB parent node 23 may transmit a notification message, e.g., a Short Message, wherein an information element such as systemInformationModification is set in the modification period preceding the modification period where the cell barring status gets updated. According to the operation described above, the child IAB-node/UE in RRC_IDLE/RRC_INACTIVE may receive the Short Message during its DRX cycle, may wait for the next modification period boundary, and then may proceed to acquiring MIB, SIB1 and/or other SIB(s).

In the operation discussed above relative to FIG. 25, however, the Child Node (which may be either an IAB-node or a UE) that receives the notification message or “Short Message” will not know that the cell is barred until it waits for the next modification period boundary and reacquire the system information. For example, in the 5G cellular system, the duration of a modification period could range from 640 ms to 40.96 s. Unlike a normal cell barring, where the serving cell maintains a connection to the network, the cell barring caused by a backhaul RLF requires immediate attentions since Node A (a parent IAB-node) has already lost the connection to its donor. This Embodiment 6 enables child IAB-nodes/UEs to react to the cell barring in a prompt manner.

According to the sixth embodiment, a notification message may comprise an information element indicating whether a change occurring on one or more MIB/SIB(s), but not on ETWS/CMAS SIBs, is effective immediately or not.

In one implementation, as shown in the Table 18, the notification message, e.g., the Short Message, may comprise an indication or information element such as systemInfoModificationImmediate. The notification message is illustrated as notification message 158 in FIG. 26 described below.

TABLE 18

| EXAMPLE NOTIFICATION MESSAGE | |
|---|---|
| Bit | Short message |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | systemInfoModificationForIAB<br>If set to 1: indication of a BCCH modification relevant to MT of IAB nodes. |
| 4 | systemInfoModificationImmediate<br>If set to 1: indication of an immediate BCCH modification. |
| 5-[8] | Not used in this release of the specification, and shall be ignored by UE if received. |

Figure 26:
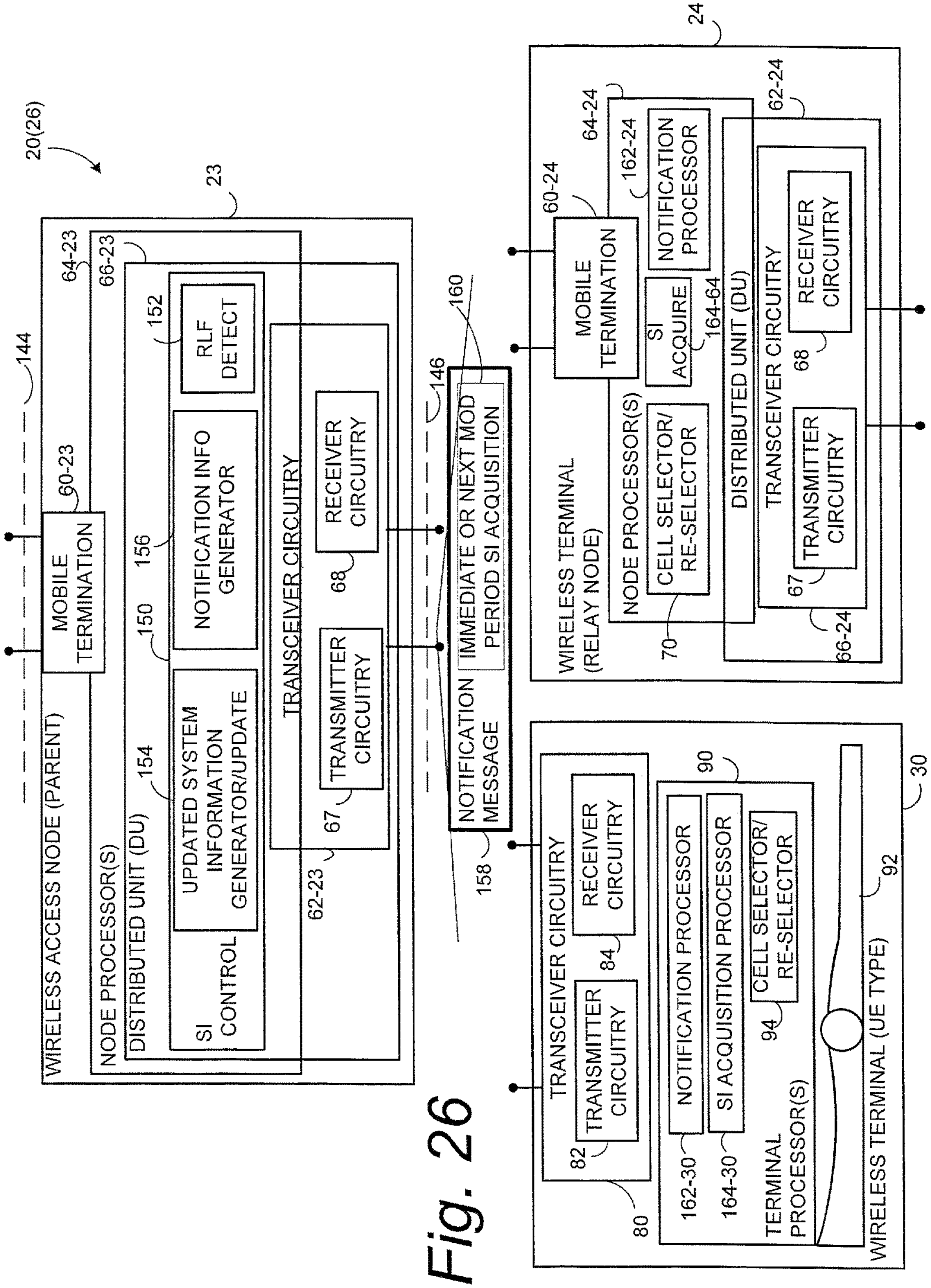
FIG. 26 is a schematic view of a wireless relay network wherein an IAB parent node which detects or is advised of a radio link failure (RLF) sends a notification message to advise one or more child nodes whether the child nodes are to perform an acquisition procedure either immediately or to wait to a next modification period.

FIG. 26 shows an example diagram of a telecommunications system 20(26) also known as wireless relay network 20(26). The wireless relay network 20(26) comprises a wireless access node 23 which is a child to another IAB node such as donor IAB node 22 shown in FIG. 25 and in other embodiments. The wireless relay network 20(26) also comprises a first wireless terminal which is an IAB node which serves as relay node 24; and a second wireless terminal which serves as a user equipment 30. Thus wireless access node which serves as an IAB-node 23 is child node to node 22, but is a parent IAB node in relation to other IAB nodes, such as, for example, first wireless terminal IAB node 24 and second wireless terminal UE 30. The number and types of child IAB nodes for which IAB parent node 23 is a parent may vary, and indeed may be only one of an IAB node 24 and a UE 30. The configuration of nodes and terminals of FIG. 26 should be understood in the context of FIG. 1 and FIG. 2. For example, each of IAB parent node 23 and IAB node 24 may comprise a mobile termination (MT) and a distributed unit (DU). The mobile termination (MT) of IAB parent node 23 is shown as mobile termination 60-23; while the mobile termination (MT) of IAB node 24 is shown as mobile termination 60-24. Similarly, the distributed unit (DU) of IAB parent node 23 is shown as distributed unit 62-23; while the distributed unit (DU) of IAB node 24 is shown as distributed unit 62-24.

FIG. 26 further shows various components and functionalities of the nodes and terminal illustrated therein. For example, FIG. 26 shows that for each of IAB parent node 23 and IAB node 24 the mobile termination unit 60 and distributed unit 62 may be realized by, e.g., by comprised of or include, one or more processor circuits, e.g., IAB node processor(s) 64. For the case of IAB parent node 23 the node processor is shown as node processor(s) 64-23; in the case of IAB node 24 the node processor is shown as node processor(s) 64-24. For both IAB parent node 23 and IAB node 24 the respective distributed units 62-23 and 62-24 may comprise node transceiver circuitry 66, which in turn may comprise node transmitter circuitry 67 and node receiver circuitry 68. The node transceiver circuitry 66 includes antenna(e) for the wireless transmission. The node transmitter circuitry 67 may include, e.g., amplifier(s), modulation circuitry and other conventional transmission equipment. Relay node receiver circuitry 68 may comprise, e.g., amplifiers, demodulation circuitry, and other conventional receiver equipment.

FIG. 26 shows user equipment 30 as comprising, in an example, non-limiting embodiment and mode, terminal transceiver circuitry 80. The transceiver circuitry 80 in turn may comprise terminal transmitter circuitry 82 and terminal receiver circuitry 84. The terminal transceiver circuitry 80 includes antenna(e) for the wireless transmission. The terminal transmitter circuitry 82 may include, e.g., amplifier(s), modulation circuitry and other conventional transmission equipment. The terminal receiver circuitry 84 may comprise, e.g., amplifiers, demodulation circuitry, and other conventional receiver equipment. FIG. 26 further shows user equipment 30 as also comprising node processor circuitry, e.g., one or more terminal processor(s) 90, and interfaces 92, including one or more user interfaces. Such user interfaces may serve for both user input and output operations, and may comprise (for example) a screen such as a touch screen that can both display information to the user and receive information entered by the user. The user interfaces 92 may also include other types of devices, such as a speaker, a microphone, or a haptic feedback device, for example.

FIG. 26 further shows that the node processor(s) 64-23 of IAB parent node 23 comprises system information controller 150. The system information controller 150 is shown in turn as comprising radio link failure (RLF) detector 152; system information generator/updater 154; and notification generator 156. As also shown in FIG. 26, the notification generator 156 serves to generate notification message 158 which includes notification information 160. The notification information 160 included in notification message 158 indicates whether system information is to be acquired by a child IAB node either immediately or, on the other hand, at a next modification boundary.

FIG. 26 illustrates different aspects of the node processor(s) 64-24 of IAB node 24. In particular, node processor(s) 64-24 of IAB node 24 are shown as comprising cell selector/re-selector 94; notification processor 162-24; and system information acquisition processor 164-24. FIG. 26 also shows that terminal processor(s) 90 of wireless terminal or UE 30 may comprise similar units or functionalities as shown for the node processor(s) 64-24 of IAB node 24, e.g., cell selector/re-selector 94; notification processor 162-30; and system information acquisition processor 164-30. The system information acquisition processors 164-24 and 164-30 serve to analyze, interpret, and cause action to be taken upon the notification information 160 received in the notification message 158. Such action may comprise the system information acquisition processors 164-24 and 164-30 performing a system information acquisition procedure and/or the respective cell selector/re-selector 94, selector/re-selector 70 performing a cell selection or re-selection procedure.

It should be understood that the node processor(s) 64-23; the node processor(s) 64-24; and terminal processor(s) 90 typically perform and execute many other operations and procedures in addition to those described herein. For simplicity only operations and procedures germane to aspects of this sixth embodiment are described.

From the foregoing and remaining discussion, it is understood that the IAB parent node 23 an integrated access and backhaul (IAB) parent node comprising a first radio interface 144 and a second radio interface 146. The first radio interface is configured to establish a radio resource control (RRC) connection with a donor node, such as donor IAB node 22. The second radio interface is configured to serve a cell to communicate with a wireless terminal. The wireless terminal may a user equipment (UE) 30 or a child IAB node 24. The IAB parent node 23 comprises processor circuitry, such as node processor(s) 64-23 and transmitter circuitry, such as node transmitter circuitry 67 included in distributed unit 66-23. The node processor(s) 64-23, e.g., radio link failure (RLF) detector 152, are configured to detect a radio link failure (RLF) on an upstream path to the donor node. The node processor(s) 64-23, e.g., system information generator/updater 154, are further configured to provide updated system information based on the RLF. The updated system information comprises at least one cell status indicating that the cell is not allowed to camp on (e.g., the cell is not considered as a candidate). The node processor(s) 64-23, e.g., notification generator 156, are further configured to generate a notification message. The notification message comprises notification information configured to indicate whether the wireless terminal is to initiate an acquisition procedure to acquire the system information (a) immediately (e.g., in a current modification period), or (b) after a next modification period boundary. The transmitter circuitry, e.g., node transmitter circuitry 67, is configured to transmit using the second interface, to the wireless terminal, both the notification message and the updated system information.

Figure 27:
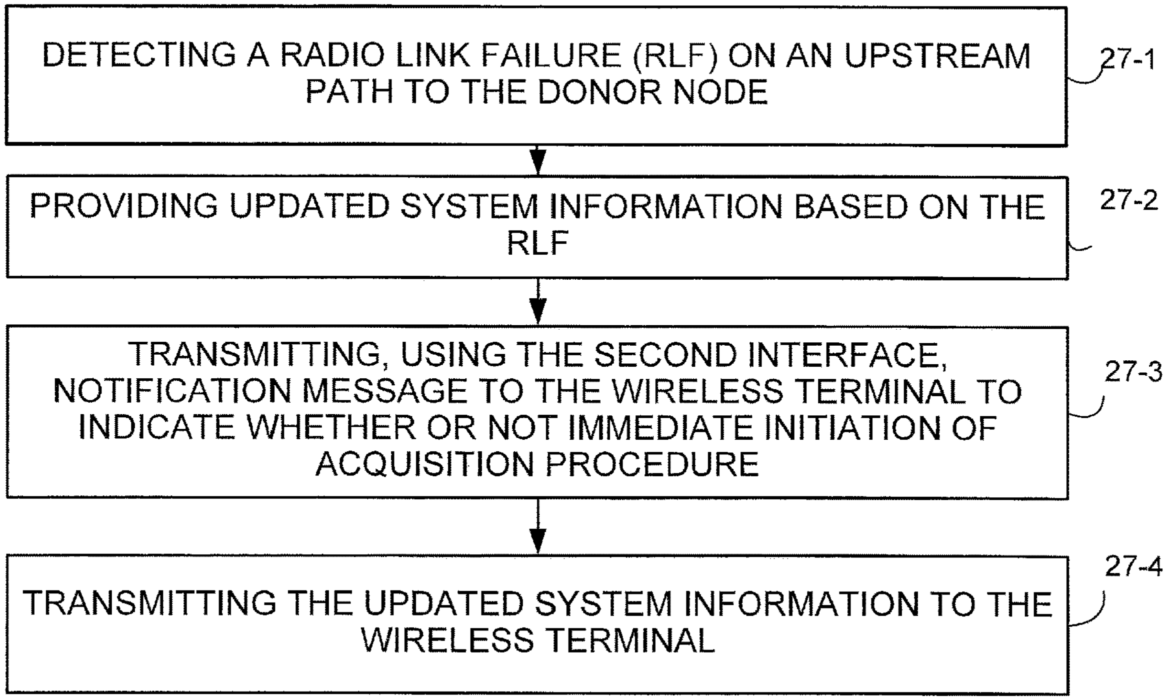
FIG. 27 is a flowchart showing example, basic, representative steps or acts performed by an IAB parent node of FIG. 26 according to a first perspective.

FIG. 27 shows basic, representative example acts or steps that may be performed by the IAB parent node 23 of FIG. 26 in an example mode. Act 27-1 comprises detecting a radio link failure (RLF) on an upstream path to the donor node. Act 27-2 comprise providing updated system information based on the RLF. As indicated above, the updated system information comprises at least one cell status indicating that the cell is not allowed to camp on. Act 27-3 comprises transmitting, using the second interface, to the wireless terminal a notification message. The notification message comprises notification information indicating whether the wireless terminal initiates an acquisition procedure to acquire the system information (a) immediately, or (b) after a next modification period boundary. Act 27-4 comprises transmitting the updated system information to the wireless terminal, e.g., to the child node.

From the foregoing and remaining discussion, it is understood that the child node or wireless terminal may be an IAB node in the form of IAB node 24 or a UE 30. In either form the wireless terminal or child IAB node communicates with an integrated access and backhaul (IAB) parent node, e.g., IAB parent node 23, over the second radio interface 146. The wireless terminal comprises receiver circuitry and processor circuitry. When the child node is an IAB node 24, for example, the receiver circuitry may take the form of mobile termination 60-24 and the processor circuitry may take the form of node processor(s) 64-24 as shown in FIG. 26. On the other hand, when the child node is a UE 30, the receiver circuitry may take the form of receiver 84 and the processor circuitry may take the form of terminal processor(s) 90 as shown in FIG. 26. In either the case of the child node being the IAB node 24 or the UE 30, the receiver circuitry is configured to receive the notification message 158. The processor circuitry is configured, when camping on a cell served by the IAB parent node, to obtain from the notification message information indicating whether to initiate an acquisition procedure (a) immediately or (b) after a next modification period boundary. The obtaining of the notification information may be performed by notification processor 162-24 in the case of IAB node 24 and by notification processor 162-30 in the case of UE 30. The processor circuitry is further configured to initiate, based on the notification message, an acquisition procedure to acquire system information, the system information comprising at least one cell status. The at least one cell status indicating whether or not the cell is allowed to camp on. Initiation of the acquisition procedure may be performed by system information acquisition processor 164-24 in the case of IAB node 24 and by system information acquisition processor 164-30 in the case of UE 30. The processor circuitry is further configured to initiate, based on the at least one cell status, a cell selection procedure. Initiation of the cell selection procedure may be performed by cell selection 70 in the case of IAB node 24 and by cell selector 94 in the case of UE 30.

Figure 28:
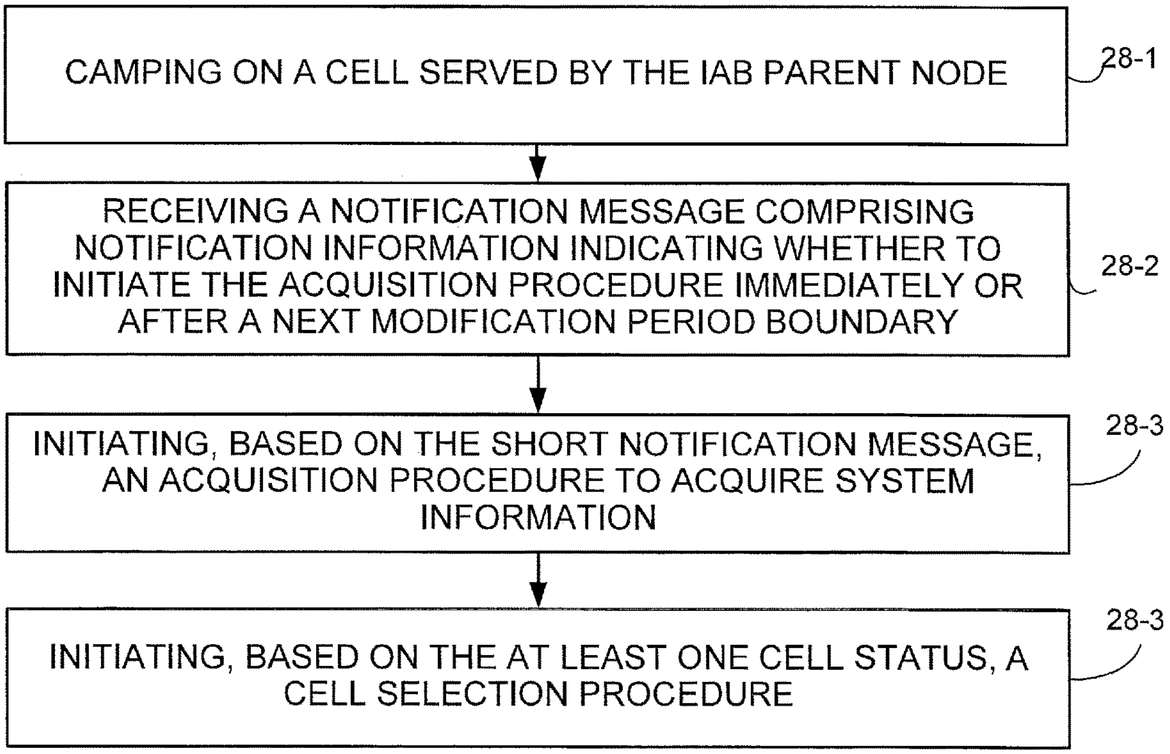
FIG. 28 is a flowchart showing example, basic, representative steps or acts performed by a child node of FIG. 26 according to a first perspective.

FIG. 28 shows basic, representative example acts or steps that may be performed by the child node of FIG. 26, e.g., either IAB node 24 or node processor 30(55), in an example mode. Act 28-1 comprises camping on a cell served by the IAB parent node. Act 28-2 comprises receiving a notification message comprises notification information indicating whether to initiate the acquisition procedure immediately or after a next modification period boundary. Act 28-3 comprises initiating, based on the notification message, an acquisition procedure to acquire system information. The system information comprises at least one cell status, the at least one cell status indicating whether or not the cell is allowed to camp on. Act 28-4 comprises initiating, based on the at least one cell status, a cell selection procedure, Thus, in the sixth example embodiment and mode, as illustrated for example by FIGS. 26-30, when a parent IAB-node, such as IAB parent node 23 in FIG. 25, fails to recover an RLF on its upstream, or when it receives the Backhaul RLF indication from one of its parent nodes, the parent IAB-node 23 may immediately, e.g., without waiting for the next modification period boundary, update some or all of the cell barring status fields, such as cellBarred in MIB and cellIABSupport in SIB1, and start transmitting the notification message 158, e.g, the Short Message, using downlink control information, DCI, with both systemInfoModification and systemInfoModificationImmediate set to 1. The modified MIB and/or SIB1 may be broadcasted from the next transmission opportunity, without waiting for the next modification period boundary.

Meanwhile, upon receiving the notification message 158 or Short Message with both systemInfoModification and systemInfoModificationImmediate set to 1, Child Node in FIG. 25, whether an IAB node 24 or UE 30, may immediately, e.g., without waiting for the next modification period boundary, initiate a system information acquisition procedure to acquire MIB, SIB1 and/or other SIB(s), except the ETWS/CMAS SIBs. During the acquisition procedure, if one of the barring status fields applicable to the Child Node indicates that the cell is barred, such as cellBarred in MIB and cellIABSupport in SIB1, the Child Node may initiate a cell selection procedure to attempt to camp on another cell. For example, if the Child Node is a UE, then the Child Node may follow the status indicated by cellBarred in MIB, and may additionally follow possibly other status, such as cellReservedForOperatorUse and cellReservedForOtherUse in SIB 1. Meanwhile, if the Child Node is an IAB-node, the Child Node may ignore cellBarred, as disclosed in the preceding embodiment, and may follow cellIABSupport.

Figure 29:
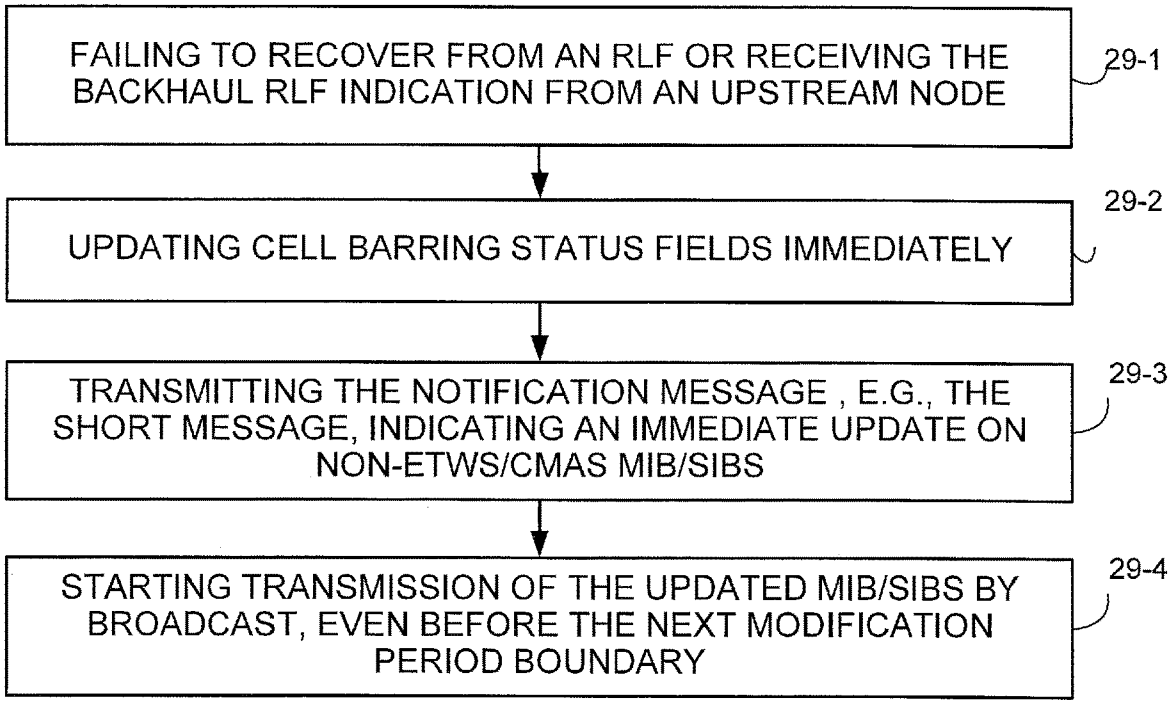
FIG. 29 is a flowchart showing example, basic, representative steps or acts performed by an IAB parent node of FIG. 26 according to a second perspective.

FIG. 29 is a flow chart showing, from a different perspective or wording than that of FIG. 27, example representative steps or acts performed by IAB parent node 23 of FIG. 25 and FIG. 26. Act 29-1 comprises failing to recover from an RLF or receiving the Backhaul RLF indication from an upstream node. Act 29-2 comprises updating cell barring status fields, such as cellBarred in MIB and cellIABSupport in SIB1, immediately. Act 29-3 comprises transmitting the notification message 158, e.g., the Short Message, indicating an immediate update on non-ETWS/CMAS MIB/SIBs. For example, the notification message 158 or Short Message may comprise systemInfoModification and systemInfoModificationImmediate, both being set to 1. Act 29-4 comprising starting transmission of the updated MIB/SIBs by broadcast, even before the next modification period boundary.

Figure 30:
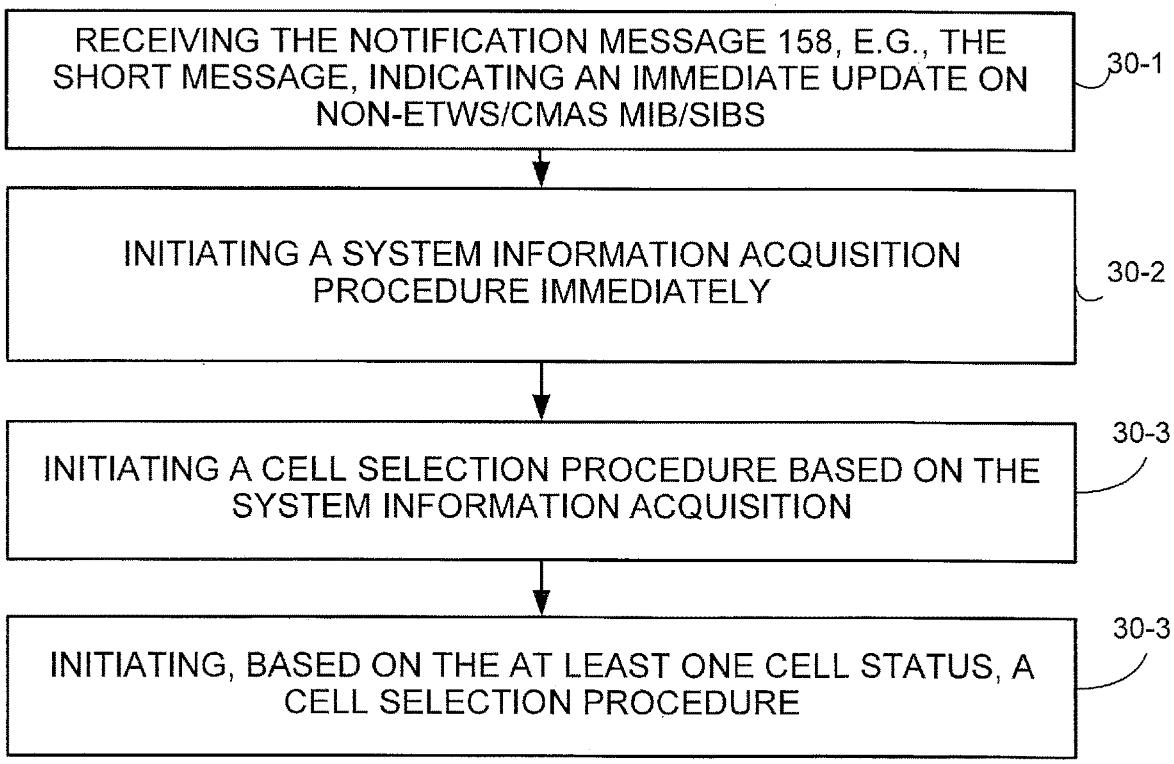
FIG. 30 is a flowchart showing example, basic, representative steps or acts performed by a child node of FIG. 26 according to a second perspective.

FIG. 30 is a flow chart showing example representative steps or acts performed by Child Node (either/both of UE 30 and IAB-node 23), from a different perspective or wording than that of FIG. 28. Act 30-1 comprises receiving the notification message 158, e.g., the Short Message, indicating an immediate update on non-ETWS/CMAS MIB/SIBs. For example, the Short Message may comprise systemInfoModification and systemInfoModificationImmediate, both being set to 1. Act 30-2 comprises initiating a system information acquisition procedure immediately. For example, Child Node may initiate the system information acquisition procedure in the current modification period, based on the reception of the Short Message indicating an immediate update on non-ETWS/CMAS MIB/SIBs. The system information acquisition procedure may comprise acquisition of MIB, followed by acquisition of SIB1 and possibly followed by acquisition of other SIB(s), except the ETWS/CMAS SIBs. Act 30-3 comprises initiating a cell selection procedure based on the system information acquisition. In Act 9-3, Child Node may initiate the cell selection procedure in a case that the acquired system information indicates that the cell is barred, or in a case that Child Node is an IAB-node and the acquired system information indicates that IAB is not supported in the cell.

Based on the implementation above, in conjunction with this sixth example embodiment and mode the aforementioned example operation for system information updates in the listing of Table 17-1 may be modified as shown in the listing of Table 17-2.

TABLE 17-1

| EXAMPLE OPERATION FOR SYSTEM INFORMATION UPDATES |
|---|
| Change of system information (e.g. MIB, SIB1 or other SIBs except SIBs related to Earthquake and Tsunami Warning System (ETWS) and Commercial Mobile Alert Service (CMAS), such as SIB6, SIB7 and SIB8) may only occur at specific radio frames. Herein, the beginning of such a specific radio frame is referred as a modification period boundary, and a time period between two adjacent modification period boundaries is referred as a modification period. System information may be transmitted a number of times with the same content within a modification period, as defined by its scheduling. The modification period is configured by system information. |
| When the network changes (some of the) system information, it may first notify the UEs about this change, i.e. this may be done throughout a modification period. In the next modification period, the network may transmit the updated system information. Upon receiving a change notification, the UE may acquire the new system information from the start of the next modification period. The UE may apply the previously acquired system information until the UE acquires the new system information. |
| The modification period boundaries may be defined by System Frame Number (SFN) values for which SFN mod m = 0, where m is the number of radio frames comprising the modification period. The modification period is configured by system information (e.g. SIB1). The UE may receive indications about SI modifications and/or PWS notifications using Short Message transmitted with P-RNTI over DCI. Repetitions of SI change indication may occur within preceding modification period. |
| UEs in RRC_IDLE or in RRC_INACTIVE may monitor for SI change indication in its own paging occasion every discontinuous reception (DRX) cycle. UEs in RRC_CONNECTED may monitor for SI change indication in any paging occasion at least once per modification period if the UE is provided with common search space on the active bandwidth part (BWP) to monitor paging. |
| ETWS or CMAS capable UEs in RRC_IDLE or in RRC_INACTIVE may monitor for indications about PWS notification in its own paging occasion every DRX cycle. ETWS or CMAS capable UEs in RRC_CONNECTED may monitor for indication about PWS notification in any paging occasion at least once every default paging cycle if the UE is provided with common search space on the active BWP to monitor paging. |
| If the Short Message indicates that an immediate BCCH modification, UEs in RRC_IDLE or in RRC_INACTIVE shall acquire the new system information immediately. |
| For Short Message reception in a paging occasion, the UE monitors the PDCCH monitoring occasion(s) for paging. |
| If the UE receives a Short Message, the UE may: |
| 1> if the UE is ETWS capable or CMAS capable, the etwsAndCmasIndication bit of Short Message is set, and the UE is provided with searchSpaceOtherSystemInformation on the active BWP: |
| 2> immediately re-acquire the SIB1; |
| 2> if the UE is ETWS capable and si-SchedulingInfo includes scheduling information for SIB6: |
| 3> acquire SIB6 immediately; |
| 2> if the UE is ETWS capable and si-SchedulingInfo includes scheduling information for SIB7: |
| 3> acquire SIB7 immediately; |
| 2> if the UE is CMAS capable and si-SchedulingInfo includes scheduling information for SIB8: |
| 3> acquire SIB8 immediately; |
| 1 > if the systemInfoModification bit of Short Message is set: |
| 2> if the systemInfoModificationImmediate bit of Short Message is set: |
| 3> apply the SI acquisition procedure (to acquire MIB, SIB1 and/or other SIB(s) except SIB6, SIB7 and SIB8) immediately. |
| 2> else |
| 3> apply the SI acquisition procedure (to acquire MIB, SIB1 and/or other SIB(s) except SIB6, SIB7 and SIB8) from the start of the next modification period. |

It should be understood that IAB parent node 23 of FIG. 25 and FIG. 26 may also transmit the Backhaul RLF indication downstream in parallel with Act 29-1 to Act 29-4. If the Child Node in FIG. 25 and FIG. 26 is an IAB-node, it may receive the Backhaul RLF indication before receiving the Short Message and may be able to take necessary actions without relying on the system information update. However, in a case that the Backhaul RLF indication is implemented as a backhaul adaptation protocol, BAP, signaling, a child UE, i.e. the Child Node in FIG. 25 and FIG. 26 is a UE, may not be able to receive the Backhaul RLF indication, since BAP will not be implemented in UEs. The notification message 158 or Short Message with an indication of an immediate MIB/SIB change, as disclosed herein, makes it possible for UEs to react to a backhaul RLF in a prompt manner.

In the implementation of the notification message 158 or Short Message described above, the two bits in the Short Message, i.e. the systemInfoModification bit and the systemInfoModificationImmediate bit are used to specify an action of the recipient (e.g. Child Node in FIG. 25 and FIG. 26) as Table 19-1.

TABLE 19-1

| systemInfoModification | systemInfoModificationImmediate | Action |
|---|---|---|
| set (1) | set (1) | Acquire non-EWTS/CMAS system information immediately |
| set (1) | not set (0) | Acquire non-EWTS/CMAS system information after the next modification period boundary |
| not set (0) | set (1) | N/A (not to be used) |
| not set (0) | not set (0) | No action |

Alternatively, Table 19-2 is different logic which may be implemented instead of Table 19-1, wherein systemInfoModificationImmediate bit itself may indicate an immediate change of non-EWTS/CMAS system information.

TABLE 19-2

| systemInfoModification | systemInfoModificationImmediate | Action |
|---|---|---|
| any (ignore) | set (1) | Acquire non-EWTS/CMAS system information immediately |
| set (1) | not set (0) | Acquire non-EWTS/CMAS system information after the next modification period boundary |
| not set (0) | not set (0) | No action |

It should be noted that in a case that the notification message 158 or Short Message indicates to acquire non-EWTS/CMAS system information, the child UE/IAB-node may not need to acquire all of the non-EWTS/CMAS SIBs. Indeed, when the child UE/IAB-node acquires MIB and SIB1, it knows, from scheduling information. e.g. siSchedulingInfo in SIB1, which SIB(s) is updated. Therefore, the child UE/IAB-node may attempt to acquire the updated SIB(s).

The operation and mode disclosed in this embodiment, especially the method for instructing UEs/IAB-nodes to acquire updated system information before the next modification period boundary using a notification message, may be used not only in a case of a backhaul RLF, but also in other situations where an immediate attention for updates on MIB and/or non-ETWS/CMAS SIBs is needed.

Non-exclusive advantages and features of the technology disclosed herein thus include or encompass the following:

- The system information may provide two cell barring configurations, one specific to UEs and the other specific to IAB-nodes.
- The system information may also provide JAB service availability information.
- The UE/IAB-node may determine if the cell is a candidate for cell selection/reselection based on the configurations and the information.
- The relay network may provide a system information change notification targeted for JAB-nodes.
- During a radio link failure, a parent JAB node may transmit a short message indicating an immediate attention is needed for the cell barring configurations in the system information.

As is understood by those skilled in the art, in some telecommunications system messages, signals, and/or data are communicated over a radio or air interface using one or more “resources”, e.g., “radio resource(s)”. Each node or terminal described herein may comprise an unillustrated frame/message generator/handler which serves to handle messages, signals, and data received from other nodes, including but not limited to the BH RLF indication and the notification message 158 described herein.

Figure 31:
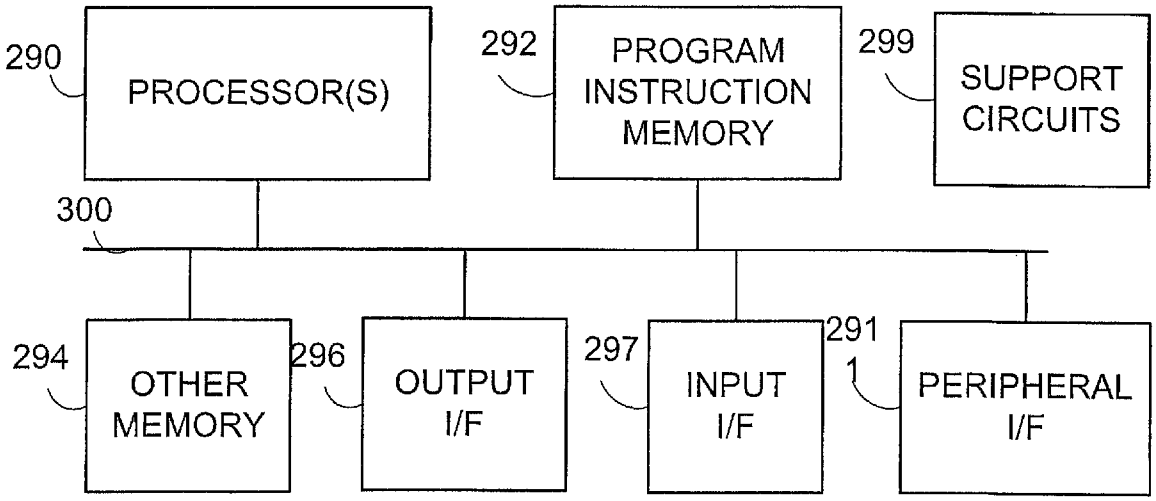
FIG. 31 is a diagrammatic view showing example elements comprising electronic machinery which may comprise a wireless terminal, a radio access node, and a core network node according to an example embodiment and mode.
Figure 32:
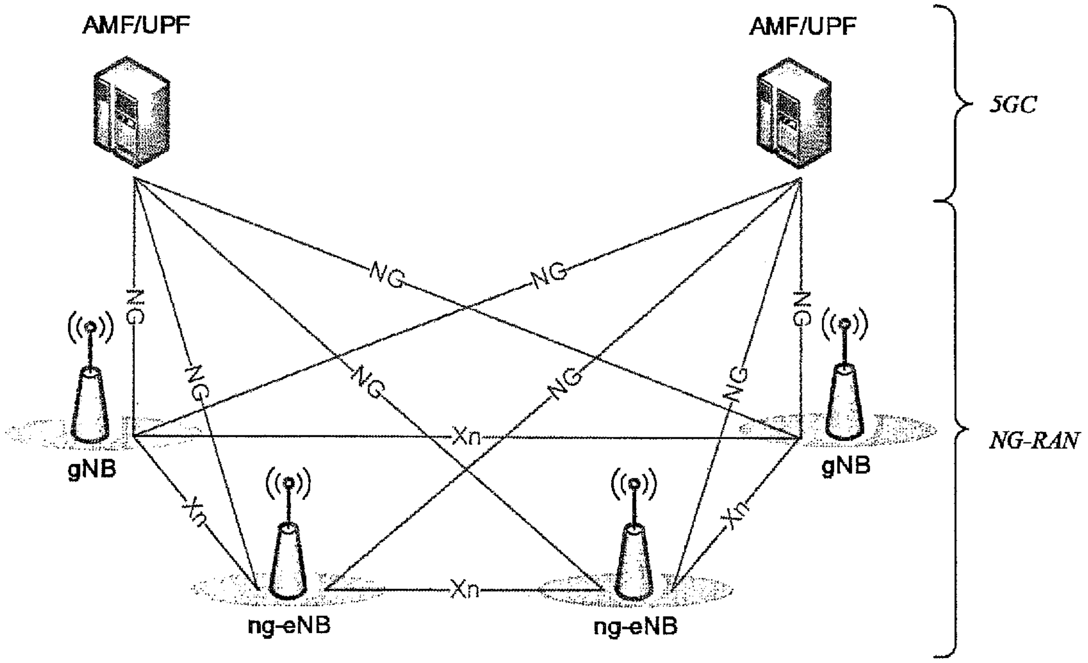
PRIOR ART Fig. 32
FIG. 32 is a diagrammatic view of overall architecture for a 5G New Radio system.

Certain units and functionalities of the systems 20 may be implemented by electronic machinery. For example, electronic machinery may refer to the processor circuitry described herein, such as node processor(s) 64-12 and 64-24 and terminal processor(s) 90. Moreover, the term “processor circuitry” is not limited to mean one processor, but may include plural processors, with the plural processors operating at one or more sites. Moreover, as used herein the term “server” is not confined to one server unit, but may encompasses plural servers and/or other electronic equipment, and may be colocated at one site or distributed to different sites. With these understandings, FIG. 31 shows an example of electronic machinery, e.g., processor circuitry, as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, node processor(s) 36, relay node processor(s) 64, and node processor(s) 90.

An memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30, parent node 22, and IAB-relay node 24 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a micro-processor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a radio access network, e.g., methods and procedures to deal with problematic issues such as governing or controlling which cells may be selected or re-selected by various types of nodes and terminals, in order to operate a wireless relay network 20 effectively and to reduce congestion in such operation.

The technology disclosed herein encompasses one or more of the following non-limiting, non-exclusive example embodiments and modes:

Example embodiment 1: An integrated access and backhaul (IAB) parent node comprising a first radio interface and a second radio interface, the first radio interface being configured to establish a radio resource control (RRC) connection with a donor node, the second radio interface being configured to serve a cell to communicate with a wireless terminal, the wireless terminal being a user equipment (UE) or a child IAB node, the IAB parent node comprising: processor circuitry configured to: detect a radio link failure (RLF) on an upstream path to the donor node; provide updated system information based on the RLF, the updated system information comprising at least one cell status indicating that the cell is not allowed to camp on; and, generate a notification message comprising notification information configured to indicate whether the wireless terminal is to initiate an acquisition procedure to acquire the system information (a) immediately, or (b) after a next modification period boundary; transmitter circuitry configured to transmit, using the second interface, to the wireless terminal: the notification message; and, the updated system information.

Example embodiment 2: The IAB parent node of Example embodiment 1, wherein in a case that the notification information indicates to initiate the acquisition procedure immediately, the notification information instructs the wireless terminal to initiate the acquisition procedure in a current modification period.

Example embodiment 3: The IAB parent node of Example embodiment 1, wherein the system information comprises a Master Information Block (MIB), a system information block type 1 (SIB1), and other SIBs excluding an Earthquake and Tsunami Warning System (ETWS) SIB(s) and Commercial Mobile Alert Service (CMAS) SIBs.

Example embodiment 4: The IAB parent node of Example embodiment 1, wherein the notification information is separate from an indication, included in the notification message, the indication indicating a change on the ETWS SIB(s) or the CMAS SIBs.

Example embodiment 5: The IAB parent node of Example embodiment 1, wherein the at least one cell status is a cell barring status indicating whether or not the cell is barred for the UE.

Example embodiment 6: The IAB parent node of Example embodiment 5, wherein the cell barring status is included in a Master Information Block (MIB).

Example embodiment 7: The IAB parent node of Example embodiment 1, wherein the at least one cell status is an IAB support status, the IAB support status indicating whether: the cell supports IAB and the cell is also considered as a candidate for the child IAB node, or the cell does not support IAB and/or the cell is barred for the child IAB node.

Example embodiment 8: The IAB parent node of Example embodiment 7, wherein the IAB support status is included in a system information block type 1 (SIB1).

Example embodiment 9: The IAB parent node of Example embodiment 1, wherein the notification information comprises a first information element indicating whether or not there is a change on the system information, and a second information element indicating whether to acquire the system information immediately or after the next modification boundary.

Example embodiment 10: The IAB parent node of Example embodiment 1, wherein the notification information comprises a first information element indicating whether or not to acquire the system information after a next modification period boundary, and a second information element indicating whether or not to acquire the system information immediately.

Example embodiment 11: The IAB parent node of Example embodiment 1, wherein the RLF is detected on the first radio interface.

Example embodiment 12: The IAB parent node of Example embodiment 1, wherein the RLF is detected based on a reception of a backhaul RLF indication message.

Example embodiment 13: A wireless terminal that communicates with an integrated access and backhaul (IAB) parent node, the wireless terminal comprising: receiver circuitry configured to receive a notification message, and; processor circuitry configured: when camping on a cell served by the IAB parent node, to obtain from the notification message information indicating whether to initiate an acquisition procedure (a) immediately or (b) after a next modification period boundary; to initiate, based on the notification message, an acquisition procedure to acquire system information, the system information comprising at least one cell status, the at least one cell status indicating whether or not the cell is allowed to camp on, and; to initiate, based on the at least one cell status, a cell selection procedure.

Example embodiment 14: The wireless terminal of Example embodiment 13, wherein in a case that the information indicates to initiate the acquisition procedure immediately, the acquisition procedure is initiated in a current modification period.

Example embodiment 15: The wireless terminal of Example embodiment 13, wherein the system information comprises a Master Information Block (MIB), a system information block type 1 (SIB1), and other SIBs excluding an Earthquake and Tsunami Warning System (ETWS) SIB(s) and Commercial Mobile Alert Service (CMAS) SIBs.

Example embodiment 16: The wireless terminal of Example embodiment 13, wherein the notification information is separate from an indication, included in the notification message, the indication indicating a change on the ETWS SIB(s) or the CMAS SIBs.

Example embodiment 17: The wireless terminal of Example embodiment 13, wherein the at least one cell status is a cell barring status indicating whether or not the cell is barred for the UE.

Example embodiment 18: The wireless terminal of Example embodiment 17, wherein the cell barring status is included in a Master Information Block (MIB).

Example embodiment 19: The wireless terminal of Example embodiment 13, wherein the at least one cell status is an IAB support status, the IAB support status indicating whether: the cell supports IAB and the cell is also considered as a candidate for the child IAB node, or the cell does not support IAB and/or the cell is barred for the child IAB node.

Example embodiment 20: The wireless terminal of Example embodiment 19, wherein the IAB support status is included in a system information block type 1 (SIB 1).

Example embodiment 21: The wireless terminal of Example embodiment 13, wherein the notification information comprises a first information element indicating whether or not there is a change on the system information, and a second information element indicating whether or not to acquire the system information immediately.

Example embodiment 22: The wireless terminal of Example embodiment 13, wherein the notification information comprises a first information element indicating whether or not to acquire the system information after a next modification period boundary, and a second information element indicating whether or not to acquire the system information immediately.

Example embodiment 23: A method for an integrated access and backhaul (IAB) parent node comprising a first radio interface and a second radio interface, the first radio interface being configured to establish a radio resource control (RRC) connection with a donor node, the second radio interface being configured to serve a cell to communicate with a wireless terminal, the wireless terminal being a user equipment (UE) or a child IAB node, the method comprising: detecting a radio link failure (RLF) on an upstream path to the donor node; providing updated system information based on the RLF, the updated system information comprises at least one cell status indicating that the cell is not allowed to camp on; transmitting, using the second interface, to the wireless terminal: a notification message comprising notification information indicating whether the wireless terminal initiates an acquisition procedure to acquire the system information (a) immediately, or (b) after a next modification period boundary, and; the updated system information.

Example embodiment 24: The method of Example embodiment 23, wherein in a case that the notification information indicates to initiate the acquisition procedure immediately, the information instructs the wireless terminal to initiate the acquisition procedure in a current modification period.

Example embodiment 25: The method of Example embodiment 23, wherein the system information comprises a Master Information Block (MIB), a system information block type 1 (SIB1), and other SIBs excluding an Earthquake and Tsunami Warning System (ETWS) SIB(s) and Commercial Mobile Alert Service (CMAS) SIBs.

Example embodiment 26: The method of Example embodiment 23, wherein the notification information is separate from an indication, included in the short message, the indication indicating a change on the ETWS SIB(s) or the CMAS SIBs.

Example embodiment 27: The method of Example embodiment 23, wherein the at least one cell status is a cell barring status indicating whether or not the cell is barred for the UE.

Example embodiment 28: The method of Example embodiment 27, wherein the cell barring status is included in a Master Information Block (MIB).

Example embodiment 29: The method of Example embodiment 23, wherein the at least one cell status is an IAB support status, the IAB support status indicating whether: the cell supports IAB and the cell is also considered as a candidate for the child IAB node, or the cell does not support IAB and/or the cell is barred for the child IAB node.

Example embodiment 30: The method of Example embodiment 29, wherein the IAB support status is included in a system information block type 1 (SIB1).

Example embodiment 31: The method of Example embodiment 23, wherein the notification information comprises a first information element indicating whether or not there is a change on the system information, and a second information element indicating whether to acquire the system information immediately or after the next modification boundary.

Example embodiment 32: The method of Example embodiment 23, wherein the notification information comprises a first information element indicating whether or not to acquire the system information after a next modification period boundary, and a second information element indicating whether or not to acquire the system information immediately.

Example embodiment 33: Example embodiment 23: The method of Example embodiment 23, wherein the RLF is detected on the first radio interface.

Example embodiment 34: The method of Example embodiment 23, wherein the RLF is detected based on a reception of a backhaul RLF indication message.

Example embodiment 35: A method for a wireless terminal that communicate with an integrated access and backhaul (IAB) parent node, the method comprising: camping on a cell served by the IAB parent node; receiving a notification message comprises notification information indicating whether to initiate the acquisition procedure immediately or after a next modification period boundary; initiating, based on the notification message, an acquisition procedure to acquire system information, the system information comprising at least one cell status, the at least one cell status indicating whether or not the cell is allowed to camp on, and; initiating, based on the at least one cell status, a cell selection procedure.

Example embodiment 36: The method of Example embodiment 35, wherein in a case that the notification information indicates to initiate the acquisition procedure immediately, the acquisition procedure is initiated in a current modification period.

Example embodiment 37: The method of Example embodiment 35, wherein the system information comprises a Master Information Block (MIB), a system information block type 1 (SIB1), and other SIBs excluding an Earthquake and Tsunami Warning System (ETWS) SIB(s) and Commercial Mobile Alert Service (CMAS) SIBs.

Example embodiment 38: The method of Example embodiment 35, wherein the notification information is separate from an indication, included in the short message, the indication indicating a change on the ETWS SIB(s) or the CMAS SIBs.

Example embodiment 39: The method of Example embodiment 35, wherein the at least one cell status is a cell barring status indicating whether or not the cell is barred for the UE.

Example embodiment 40: The method of Example embodiment 39, wherein the cell barring status is included in a Master Information Block (MIB).

Example embodiment 41: The method of Example embodiment 35, wherein the at least one cell status is an IAB support status, the IAB support status indicating whether: the cell supports IAB and the cell is also considered as a candidate for the child IAB node, or the cell does not support IAB and/or the cell is barred for the child IAB node.

Example embodiment 42: The method of Example embodiment 41, wherein the IAB support status is included in a system information block type 1 (SIB1).

Example embodiment 43: The method of Example embodiment 35, wherein the notification information comprises a first information element indicating whether or not there is a change on the system information, and a second information element indicating whether or not to acquire the system information immediately.

Example embodiment 44: The method of Example embodiment 35, wherein the notification information comprises a first information element indicating whether or not to acquire the system information after a next modification period boundary, and a second information element indicating whether or not to acquire the system information immediately.

Example embodiment 45: An integrated access and backhaul (IAB) node comprising a first radio interface and a second radio interface, the first radio interface being configured to establish a connection with a donor node, the second radio interface being configured to serve a cell to communicate with a wireless terminal, the IAB node comprising: processor circuitry configured to: detect a radio link failure (RLF) at the first radio interface; generate, based on the RLF, system information comprising at least one cell status indication indicating that the cell is barred and; generate, based on the at least one cell status indication, a notification message comprising notification information configured to instruct the wireless terminal to initiate a system information acquisition procedure immediately; transmitter circuitry configured to transmit, using the second interface, to the wireless terminal: the notification message; and the system information.

Example embodiment 46: The IAB node of Example embodiment 45, wherein the system information acquisition procedure is initiated in a current modification period.

Example embodiment 47: The IAB node of Example embodiment 45, wherein the notification information is separate from an indication indicating a change on system information blocks (SIBs) for Earthquake and Tsunami Warning System (ETWS) and a Commercial Mobile Alert Service (CMAS).

Example embodiment 48: The IAB node of Example embodiment 45, wherein the at least one cell status indication instructs the wireless terminal to initiate a cell selection procedure.

Example embodiment 49: A wireless terminal that communicates with an integrated access and backhaul (IAB) node via a cell served by the IAB node, the wireless terminal comprising: receiver circuitry configured to receive a notification message comprising notification information, the notification information instructing to initiate a system information acquisition procedure immediately; processor circuitry configured to initiate, based on the notification information, the system information acquisition procedure to acquire system information, the system information comprising at least one cell status indication indicating whether or not the cell is barred, wherein; in a case that the at least cell status indicates that the cell is barred, a cell selection procedure is initiated.

Example embodiment 50: The wireless terminal of Example embodiment 49, wherein the acquisition procedure is initiated in a current modification period.

Example embodiment 51: The wireless terminal of Example embodiment 49, wherein the notification information is separate from an indication indicating a change on system information blocks (SIBs) for Earthquake and Tsunami Warning System (ETWS) and a Commercial Mobile Alert Service (CMAS).

Example embodiment 52: The wireless terminal of Example embodiment 49, wherein the notification information further indicates that the IAB node has lost a connection to a donor node.

Example embodiment 53: A method for an integrated access and backhaul (IAB) node comprising a first radio interface and a second radio interface, the first radio interface being configured to establish a connection with a donor node, the second radio interface being configured to serve a cell to communicate with a wireless terminal, the method comprising: detecting a radio link failure (RLF) at the first radio interface; generating, based on the RLF, system information comprising at least one cell status indication indicating that the cell is barred and; generating, based on the at least one cell status indication, a notification message comprising notification information configured to instruct the wireless terminal to initiate a system information acquisition procedure immediately; transmitting, using the second interface, to the wireless terminal: the notification message; and, the system information.

Example embodiment 54: The method of Example embodiment 53, wherein the system information acquisition procedure is initiated in a current modification period.

Example embodiment 55: The method of Example embodiment 53, wherein the notification information is separate from an indication indicating a change on system information blocks (SIBs) for Earthquake and Tsunami Warning System (ETWS) and a Commercial Mobile Alert Service (CMAS).

Example embodiment 56: The method of Example embodiment 53, wherein the at least one cell status indication instructs the wireless terminal to initiate a cell selection procedure.

Example embodiment 57: A method for a wireless terminal that communicate with an integrated access and backhaul (IAB) node, the method comprising: receiving a notification message comprises notification information, the notification information instructing to initiate a system information acquisition procedure immediately; initiating, based on the notification information, a system information acquisition procedure to acquire system information, the system information comprising at least one cell status indication indicating whether or not the cell is barred, wherein; in a case that the at least cell status indicates that the cell is barred, a cell selection procedure is initiated.

Example embodiment 58: The method of Example embodiment 57, wherein the acquisition procedure is initiated in a current modification period.

Example embodiment 59: The method of Example embodiment 57, wherein the notification information is separate from an indication indicating a change on system information blocks (SIBs) for Earthquake and Tsunami Warning System (ETWS) and a Commercial Mobile Alert Service (CMAS).

Example embodiment 60: The method of Example embodiment 57, wherein the notification information further indicates that the IAB node has lost a connection to a donor node.

One or more of the following documents may be pertinent to the technology disclosed herein (all of which are incorporated herein by reference in their entirety):

| | |
|---|---|
| R2-2000277 | Cell baring indication for IAB support vivo |
| R2-2000472 | Further discussion on Backhaul RLF handling Intel |
| R2-2000479 | Parent selection at IAB nodes during Initial Setup (Text proposal) Intel Corporation |
| R2-2000482 | (TP for NR_IAB BL CR to TS 38.331) IP address configuration Qualcomm Incorporated |
| R2-2000484 | IAB access barring Qualcomm Incorporated |
| R2-2000509 | Discussion on IAB BH RLF handling ZTE, Sanechips |
| R2-2000510 | Discussion on BAP control PDU of RLF indication ZTE, Sanechips |
| R2-2000511 | Discussion on the RRC signalling for IP address allocation ZTE, Sanechips |
| R2-2000512 | Consideration on IAB node access control ZTE, Sanechips |
| R2-2000516 | Possible issues on Backhaul RLF handling Kyocera |
| R2-2000522 | Backhaul RLF Recovery Huawei, HiSilicon |
| R2-2000523 | Leftover issue for cell barring Huawei, HiSilicon |
| R2-2000529 | The impacts of IP address management of IAB node to RAN2 Huawei, HiSilicon |
| R2-2000662 | Considerations on Intra-CU indication KDDI Corporation |
| R2-2000749 | Further details on Backhaul link RLF Notification Types to Downstream Node(s) Ericsson |
| R2-2000750 | IP Address Assignment for IAB Node(s) Ericsson |
| R2-2000751 | On cell Reservations in MIB and SIB1 Ericsson |
| R2-2000752 | Draft CR to 36.304 on cell Reservations for IAB-MTs Ericsson |
| R2-2000753 | Draft CR to 38.304 on cell Reservations for IAB-MTs Ericsson |
| R2-2000754 | IAB-MT Feature Capabilities Ericsson |
| R2-2000769 | IP address configuration for IAB Samsung |
| R2-2000824 | PWS information handling in IAB Sony |
| R2-2000835 | IAB Cell Barring Sony |
| R2-2000892 | Views on Cell Barring Mechanism for IAB CATT |
| R2-2000895 | Views on RRC States of IAB nodes CATT |
| R2-20001016 | Remaining details for IAB-MT access Samsung Electronics GmbH |
| R2-20001021 | Cell selection for IAB RLF recovery Lenovo, Motorola Mobility |
| R2-20001056 | BH link failure handling Nokia, Nokia Shanghai Bell |
| R2-20001057 | Remaining aspects of F1AP transport in EN-DC Nokia, Nokia Shanghai Bell |
| R2-20001058 | Remaining aspects of IAB initial accessNokia, Nokia Shanghai Bell |
| R2-20001059 | IP address assignment for IAB nodes Nokia, Nokia Shanghai Bell |
| R2-20001061 | IAB-MT features list and capabilities Nokia, Nokia Shanghai Bell |
| R2-20001348 | Cell Selection for Backhaul RLF Recovery Futurewei Technologies |
| R2-20001523 | Access control in IAB networks LG Electronics France |
| R2-20001524 | Necessity of even earlier BH RLF notification LG Electronics France |
| R2-20001525 | BH RLF Notification Termination Layer LG Electronics France |
| R2-20001605 | Differential barring for IAB nodes and UEs Futurewei Technologies |
| R2-20001625 | F1AP related terminology in NSA IAB Samsung R&D Institute UK |
| R2-20001633 | Remaining issues on IAB RLF Samsung R&D Institute UK |
| R2-20002045 | Summary on IAB IP address configuration Samsung (rapporteur) |
| R2-20002057 | Summary of 6.1.5.2: IAB-MT Features List Ericsson |
| R2-20002058 | Summary of 6.1.5.3: SI Broadcast, cell Restrictions/Reservation and Barring, Initial Access, and Connection Setup Ericsson |
| R2-20002164 | IAB IP address allocation - Proposals for discussion and approval Samsung |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. An integrated access and backhaul (IAB) node comprising:

a first radio interface configured to establish a connection with a donor node;

a second radio interface configured to serve a cell to communicate with a wireless terminal;

processor circuitry configured to:

detect a radio link failure (RLF) at the first radio interface, generate, based on the RLF, system information comprising at least one cell status indication indicating that the cell is barred, and generate, based on the at least one cell status indication, a notification message comprising notification information; and transmitter circuitry configured to transmit, using the second interface, the notification message and the system information to the wireless terminal, wherein the notification information instructs the wireless terminal, that camps on the cell served by the second radio interface of the IAB node and that receives the notification message, to acquire, immediately after receiving the notification message, the system information from the cell.

2. The IAB node of claim 1, wherein the acquisition of the system information is initiated in a current modification period.

3. The IAB node of claim 1, wherein the notification information is separate from information, in an indication, indicating a change on system information blocks (SIBs) for an Earthquake and Tsunami Warning System (ETWS) and a Commercial Mobile Alert Service (CMAS).

4. The IAB node of claim 1, wherein the at least one cell status indication further instructs the wireless terminal to initiate a cell selection procedure.

5. A wireless terminal that communicates with an integrated access and backhaul (IAB) node via a cell served by the IAB node, the wireless terminal comprising:

receiver circuitry configured to receive a notification message comprising notification information that instructs the wireless terminal to initiate, immediately after receiving the notification information, a system information acquisition procedure to acquire system information from the cell; and processor circuitry configured to:

initiate, based on the reception of the notification information, the system information acquisition procedure to acquire the system information from the cell served by the IAB node, the system information comprising at least one cell status indication indicating whether the cell is barred, and in a case that the at least one cell status indication indicates that the cell is barred, initiate a cell selection procedure.

6. The wireless terminal of claim 5, wherein the system information acquisition procedure is initiated in a current modification period.

7. The wireless terminal of claim 5, wherein the notification information is separate from information, in an indication, indicating a change on system information blocks (SIBs) for an Earthquake and Tsunami Warning System (ETWS) and a Commercial Mobile Alert Service (CMAS).

8. The wireless terminal of claim 5, wherein the notification information further indicates that the IAB node has lost a connection to a donor node.

9. A method performed by a wireless terminal that communicates with an integrated access and backhaul (IAB) node via a cell served by the IAB node, the method comprising:

receiving a notification message comprising notification information that instructs the wireless terminal to initiate a system information acquisition procedure to acquire system information from the cell;

initiating, immediately after receiving the notification information, the system information acquisition procedure to acquire the system information from the cell served by the IAB node, the system information comprising at least one cell status indication indicating whether the cell is barred; and in a case that the at least one cell status indication indicates that the cell is barred, initiating a cell selection procedure.

* * * * *